United States Patent
Sakamoto

(10) Patent No.: US 9,563,443 B2
(45) Date of Patent: Feb. 7, 2017

(54) INFORMATION PROCESSING DEVICE, PERIPHERAL DEVICE CONTROL METHOD, AND NON-TRANSITORY COMPUTER READABLE MEDIUM STORING FILTER DRIVER FOR CONTROLLING A POWER STATE OF A PERIPHERAL DEVICE

(71) Applicant: Renesas Electronics Corporation, Kawasaki-shi, Kanagawa (JP)

(72) Inventor: Hiromitsu Sakamoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 14/802,430

(22) Filed: Jul. 17, 2015

(65) Prior Publication Data

US 2016/0055009 A1    Feb. 25, 2016

(30) Foreign Application Priority Data

Aug. 22, 2014    (JP) .................................. 2014-169502

(51) Int. Cl.
| | |
|---|---|
| *G06F 3/00* | (2006.01) |
| *G06F 1/00* | (2006.01) |
| *G06F 9/44* | (2006.01) |
| *G06F 13/38* | (2006.01) |
| *G06F 1/32* | (2006.01) |

(52) U.S. Cl.
CPC ........... *G06F 9/4411* (2013.01); *G06F 1/3215* (2013.01); *G06F 1/3287* (2013.01); *G06F 9/4418* (2013.01); *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,067,628 A | 5/2000 | Krithivas et al. | |
| 7,934,006 B2 | 4/2011 | Kato et al. | |
| 8,370,857 B2 | 2/2013 | Kamii et al. | |
| 8,386,813 B2 | 2/2013 | Kim et al. | |
| 8,799,542 B2 | 8/2014 | Seo et al. | |
| 2001/0011315 A1* | 8/2001 | Barbee | G06F 1/3203 710/107 |
| 2012/0084592 A1* | 4/2012 | Lin | G06F 1/266 713/324 |

FOREIGN PATENT DOCUMENTS

| | | |
|---|---|---|
| JP | 4720959 B2 | 7/2011 |
| JP | 4959766 B2 | 6/2012 |
| JP | 2013-016166 A | 1/2013 |

\* cited by examiner

*Primary Examiner* — David E Martinez
(74) *Attorney, Agent, or Firm* — Sughrue Mion, PLLC

(57) ABSTRACT

In an information processing device, if the power state of a peripheral device changed by a class driver is the low-power state, in which the peripheral device consumes less power than in its normal state but its operation is limited, a filter driver below the class driver suspends controlling the peripheral device in accordance with a control request from an application program without passing through the class driver until the power state of the peripheral device returns to the normal state.

13 Claims, 41 Drawing Sheets

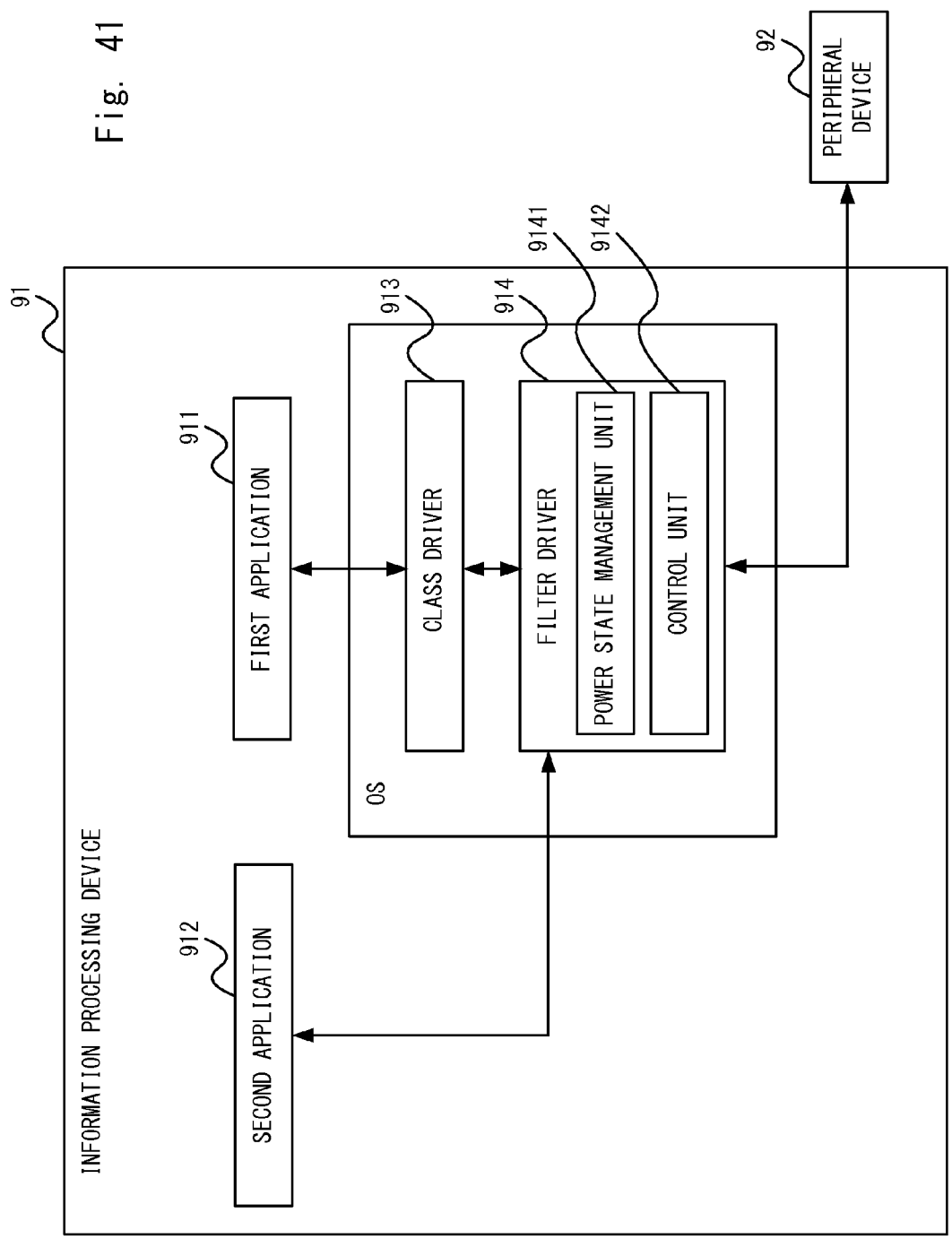

INFORMATION PROCESSING DEVICE, PERIPHERAL DEVICE CONTROL METHOD, AND NON-TRANSITORY COMPUTER READABLE MEDIUM STORING FILTER DRIVER FOR CONTROLLING A POWER STATE OF A PERIPHERAL DEVICE

CROSS-REFERENCE TO RELATED APPLICATIONS

This application is based upon and claims the benefit of priority from Japanese patent application No. 2014-169502, filed on Aug. 22, 2014, the disclosure of which is incorporated herein in its entirety by reference.

BACKGROUND

Technical Field

The present invention relates to an information processing device, a peripheral device control method, and a filter driver. For example, the invention relates to a technology that controls the power state of a peripheral device.

Background Art

Universal Serial Bus (USB) is being widely used as a general-purpose bus which connects a computer and a peripheral device to input or output data. For this reason, various types of USB-related technology are being considered.

One type is filter drivers (e.g., Japanese Unexamined Patent Application Publication No. 2013-16166, Japanese Patent No. 4720959, Japanese Patent No. 4959766, U.S. Pat. No. 6,067,628). Typically, a filter driver is inserted below a device driver and provides additional functions that the device driver does not support. Another type is Selective Suspend (e.g., U.S. Pat. No. 8,386,813). Selective Suspend is a technology that saves power by selectively putting a USB device into a suspended state (low-power state) in accordance with the operating state thereof.

SUMMARY

Selective Suspend described above is a very useful technology to save power. However, in the case of adopting Selective Suspend, when a USB device is accessed, attention must be paid to the power state of the USB device. That is, there is a problem that accessing a suspended USB device would result in an error. This problem occurs in not only USB devices but also any other types of peripheral devices which are selectively put into a suspended state.

Other problems and novel features will be apparent from the description of the present specification and the accompanying drawings.

According to one embodiment, if the power state of a peripheral device changed by a class driver is the low-power state, an information processing device suspends control of the peripheral device in accordance with a control request from an application program without passing through the class driver until the power state of the peripheral device returns to the normal state.

According to the one embodiment, it is possible to prevent access to the peripheral device from resulting in an error.

BRIEF DESCRIPTION OF THE DRAWINGS

The above and other aspects, advantages and features will be more apparent from the following description of certain embodiments taken in conjunction with the accompanying drawings, in which:

BRIEF DESCRIPTION OF THE DRAWINGS

Figure 1:
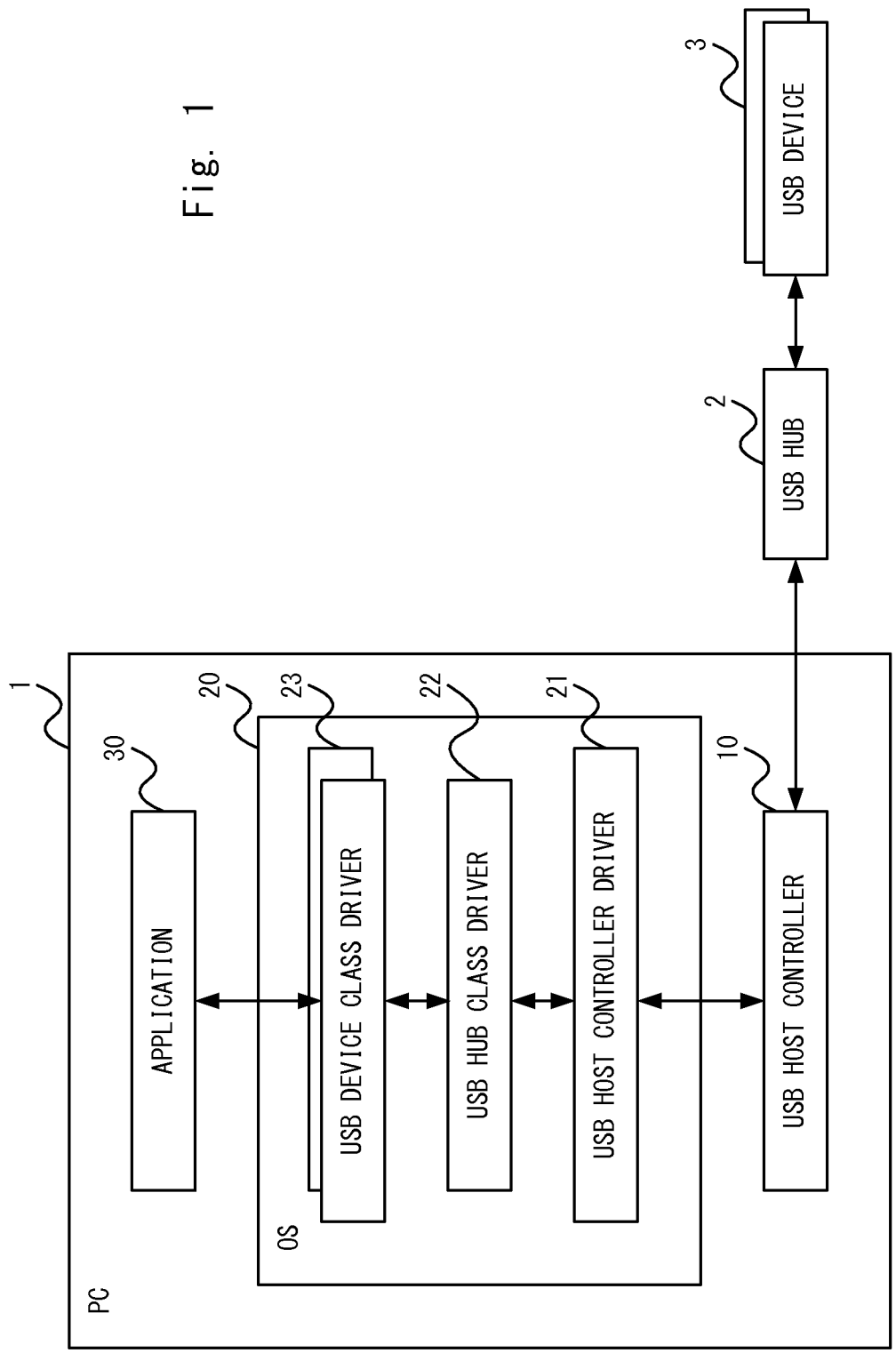
Figure 2:
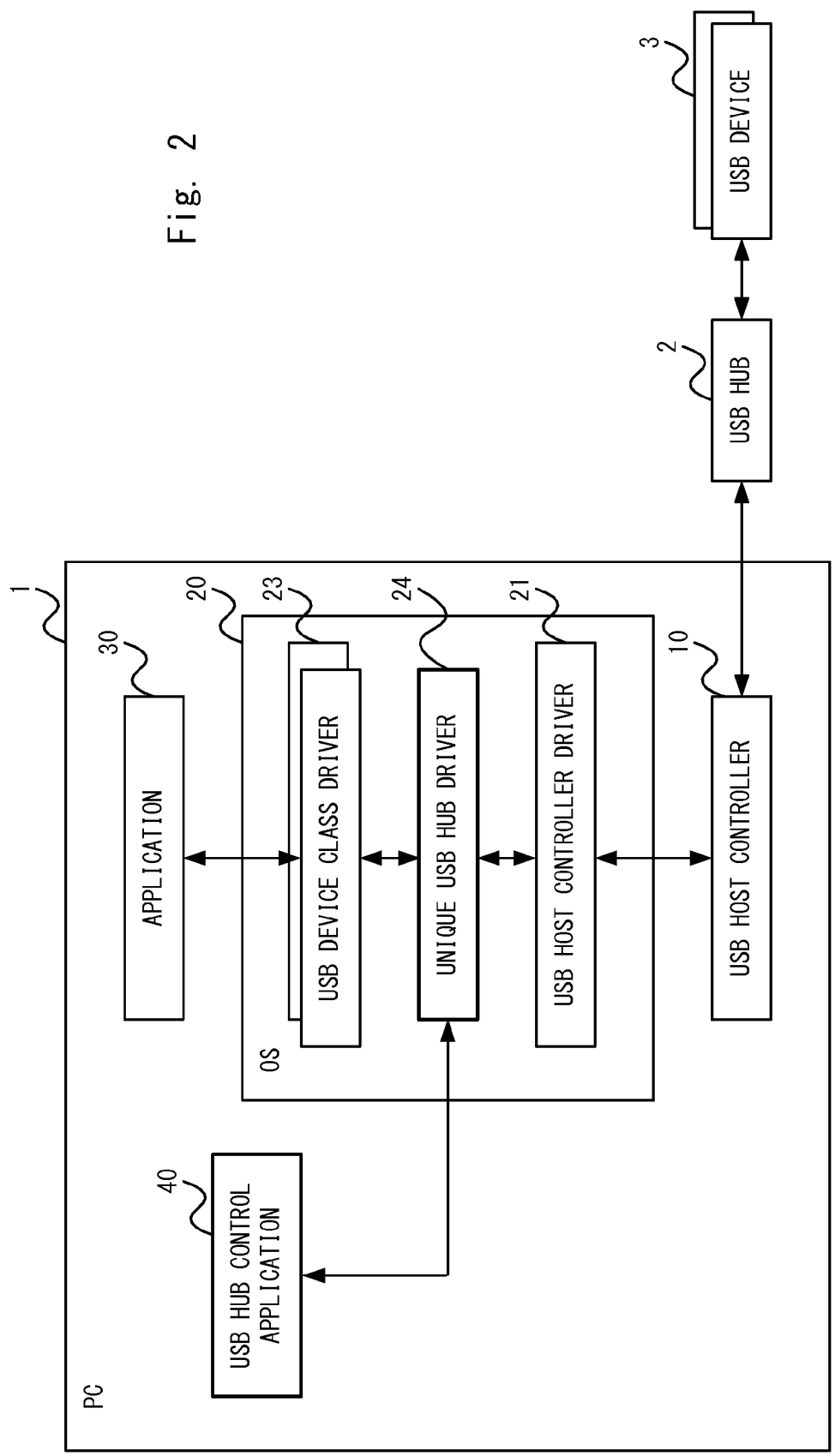
Figure 3:
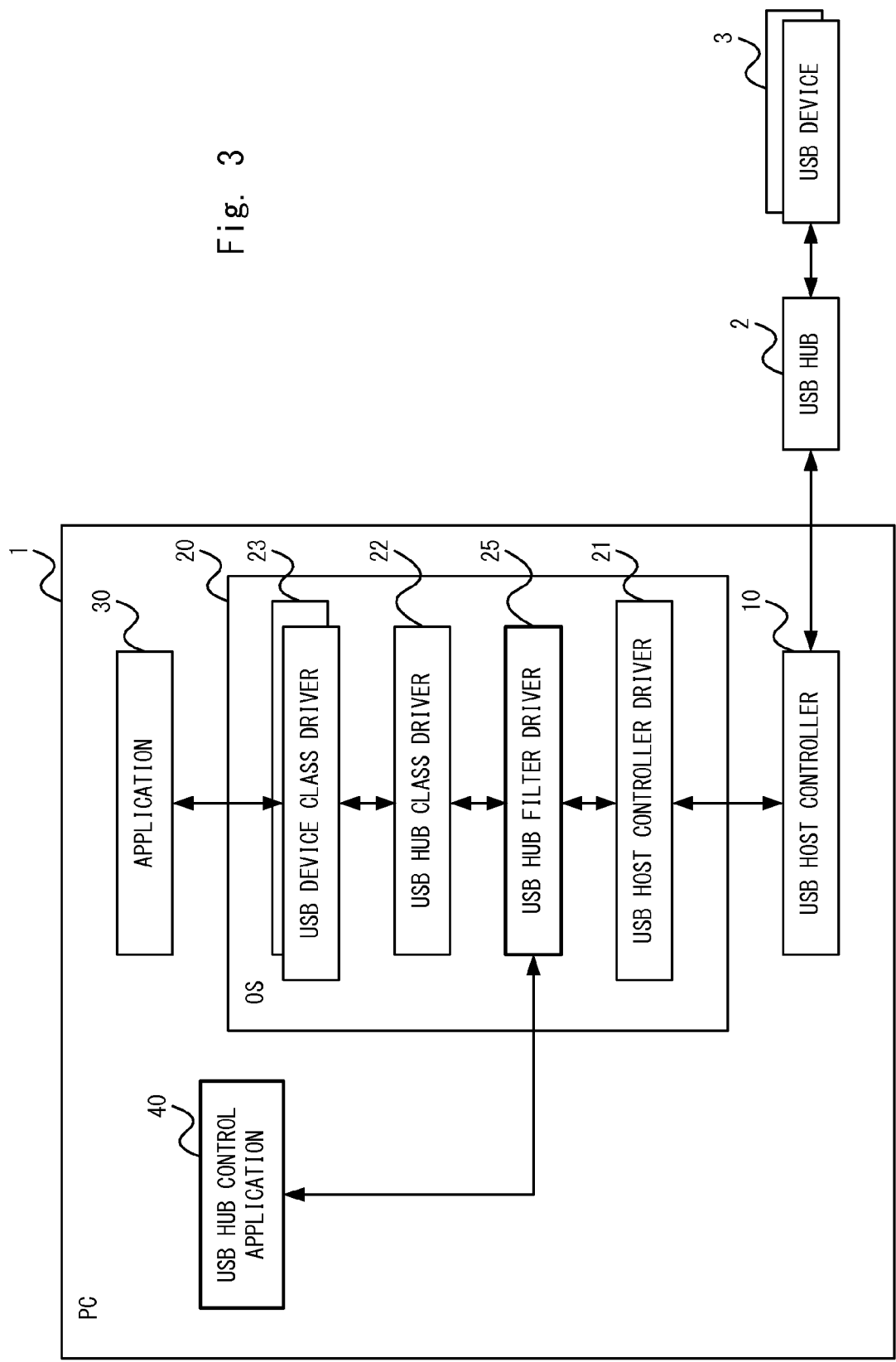
Figure 4:
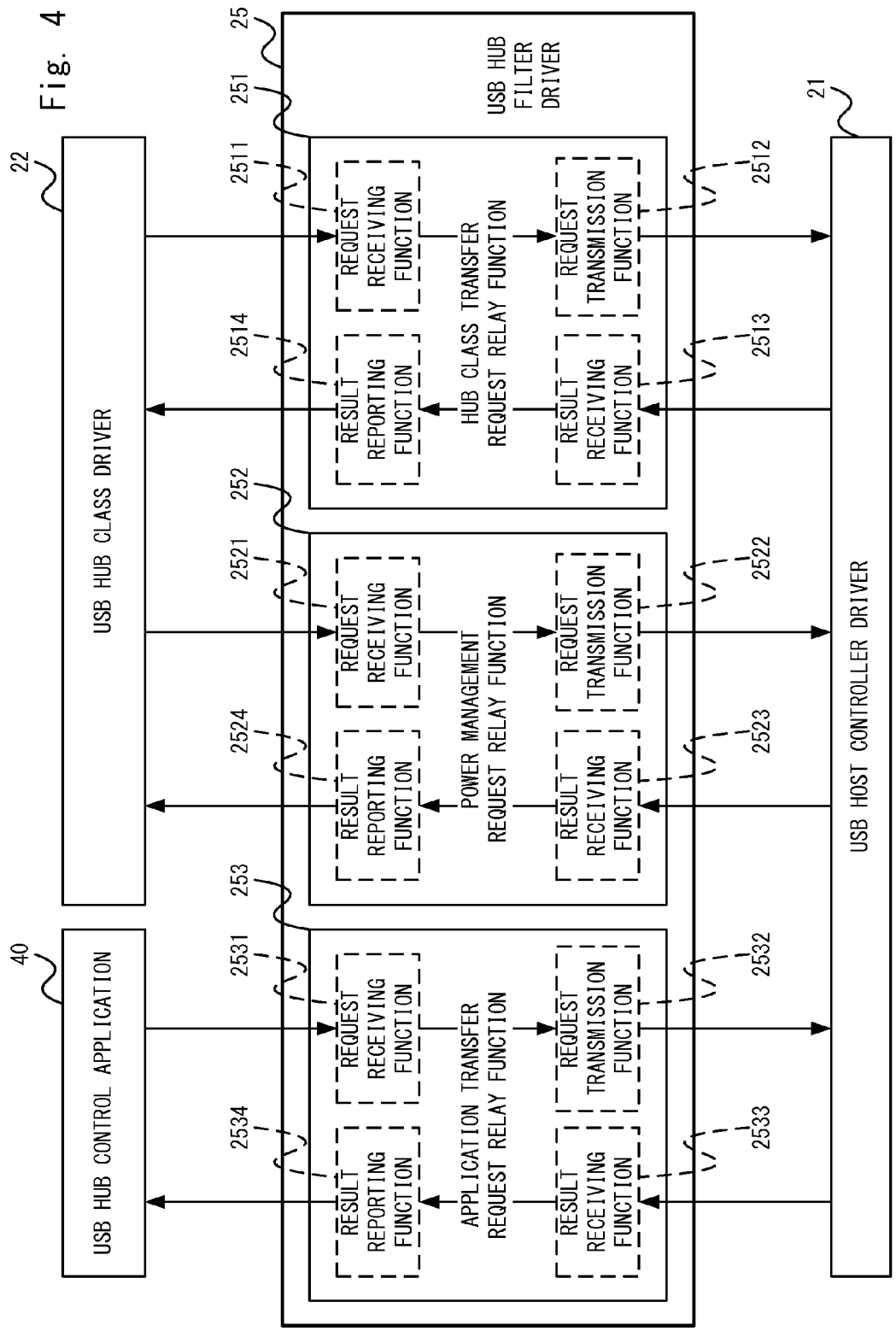
Figure 5:
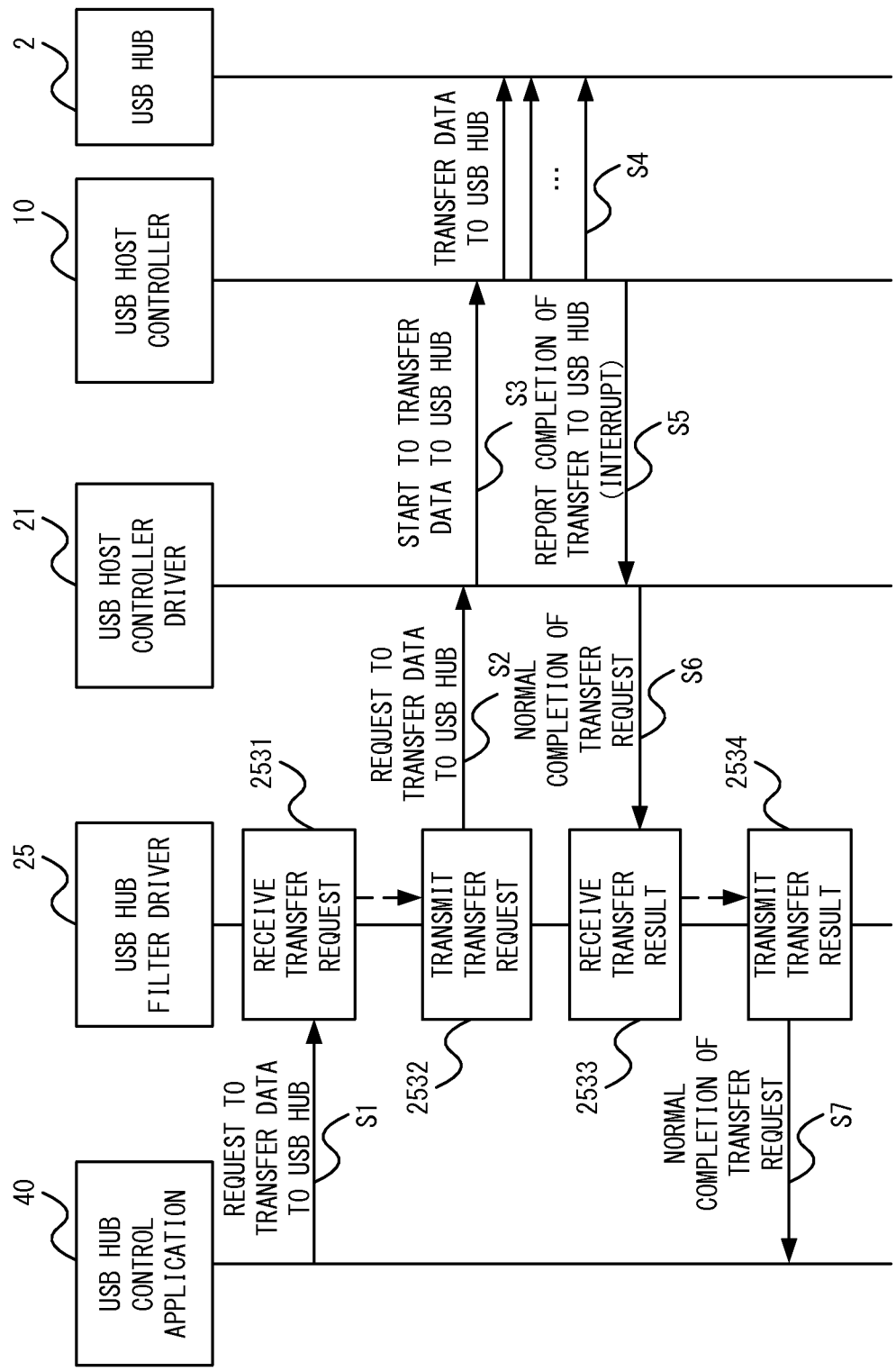
Figure 6:
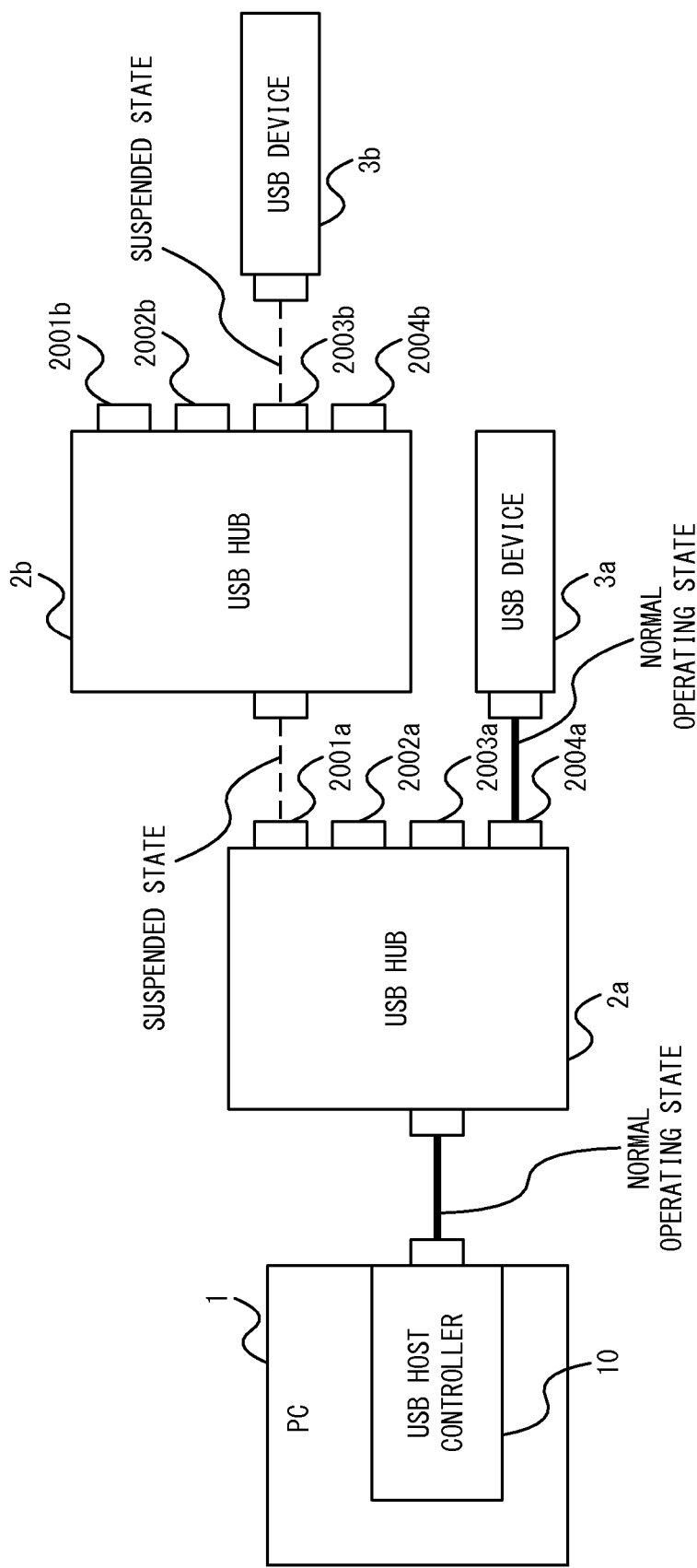
Figure 7:
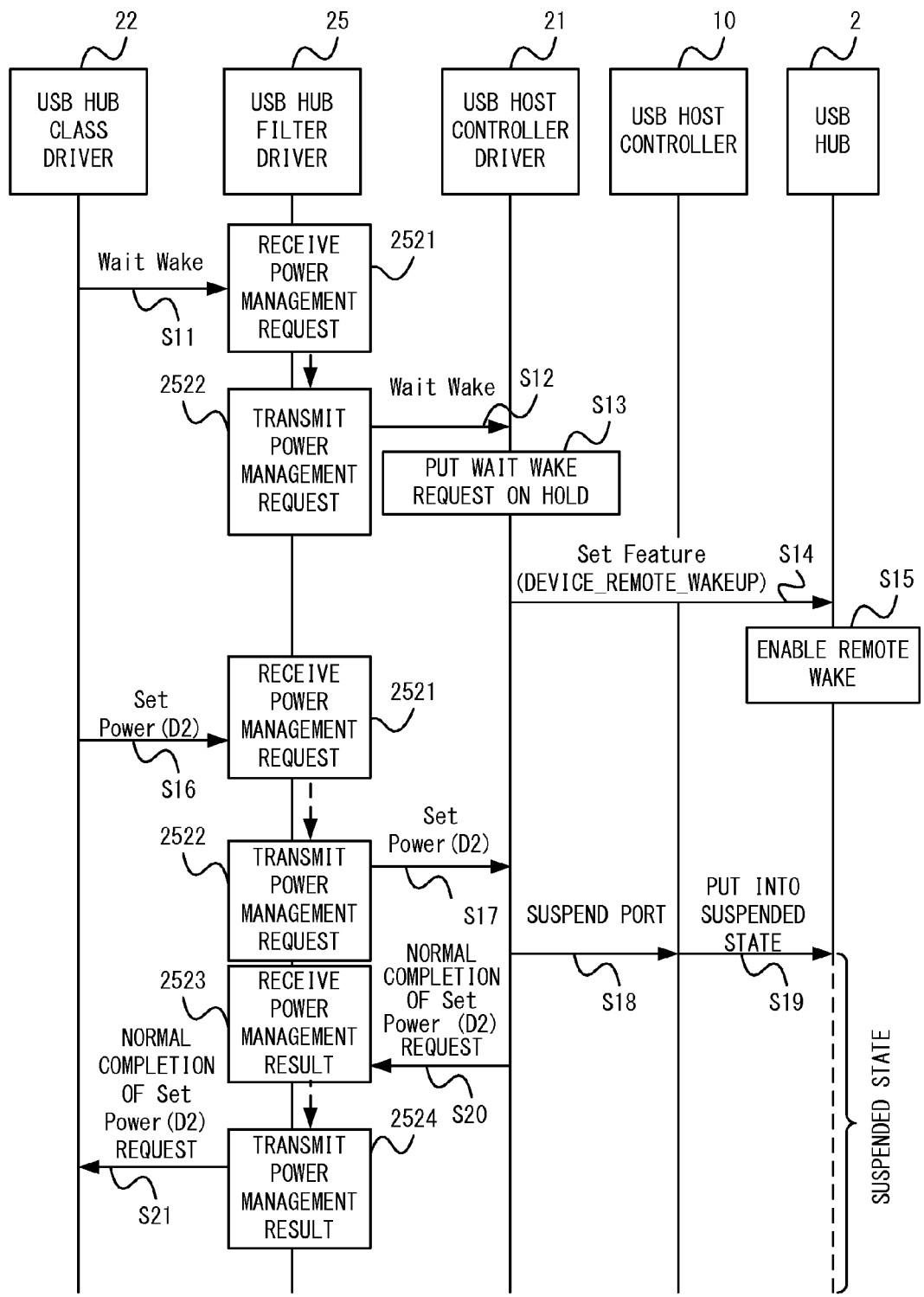
Figure 8:
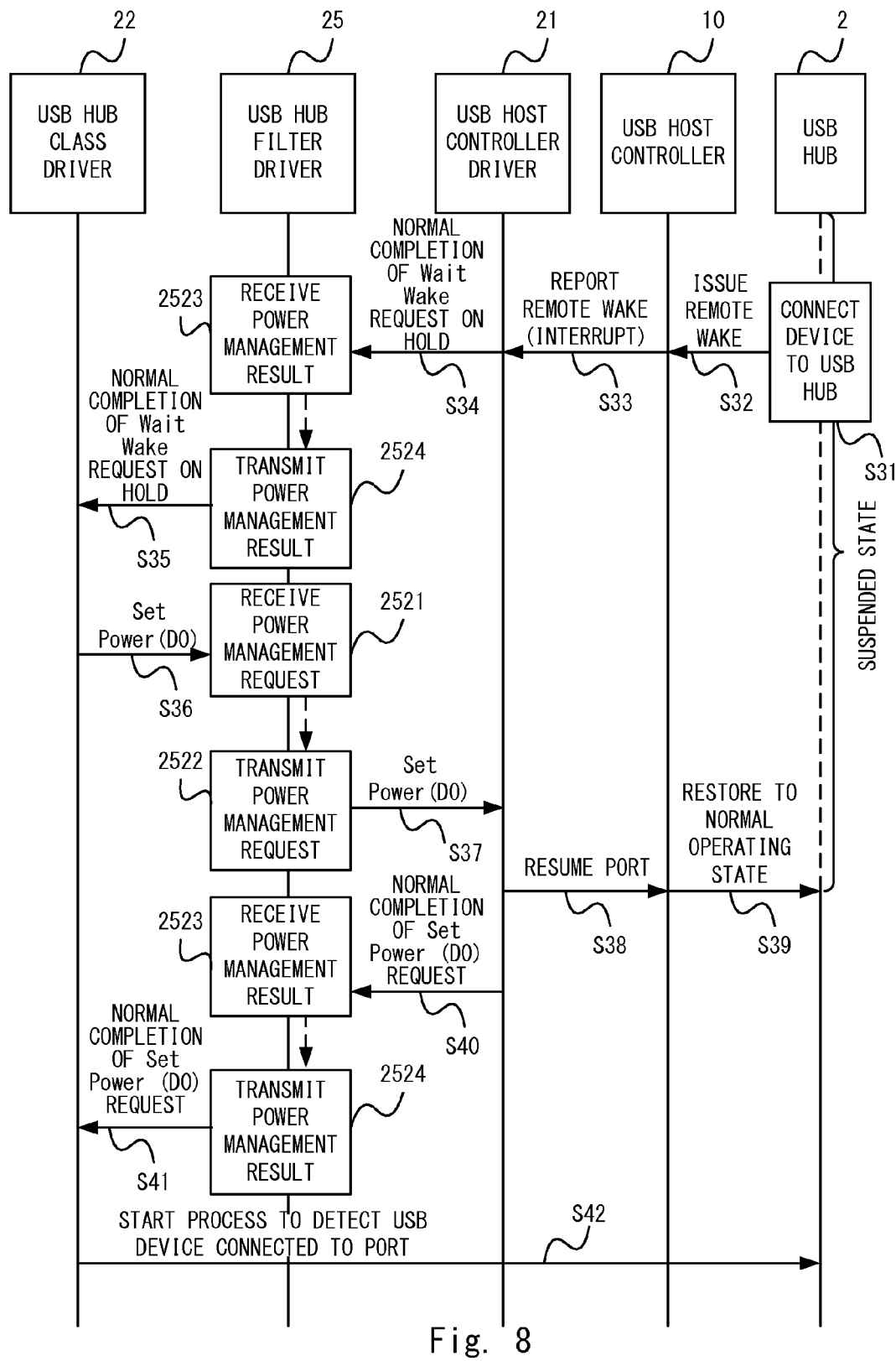
Figure 9:
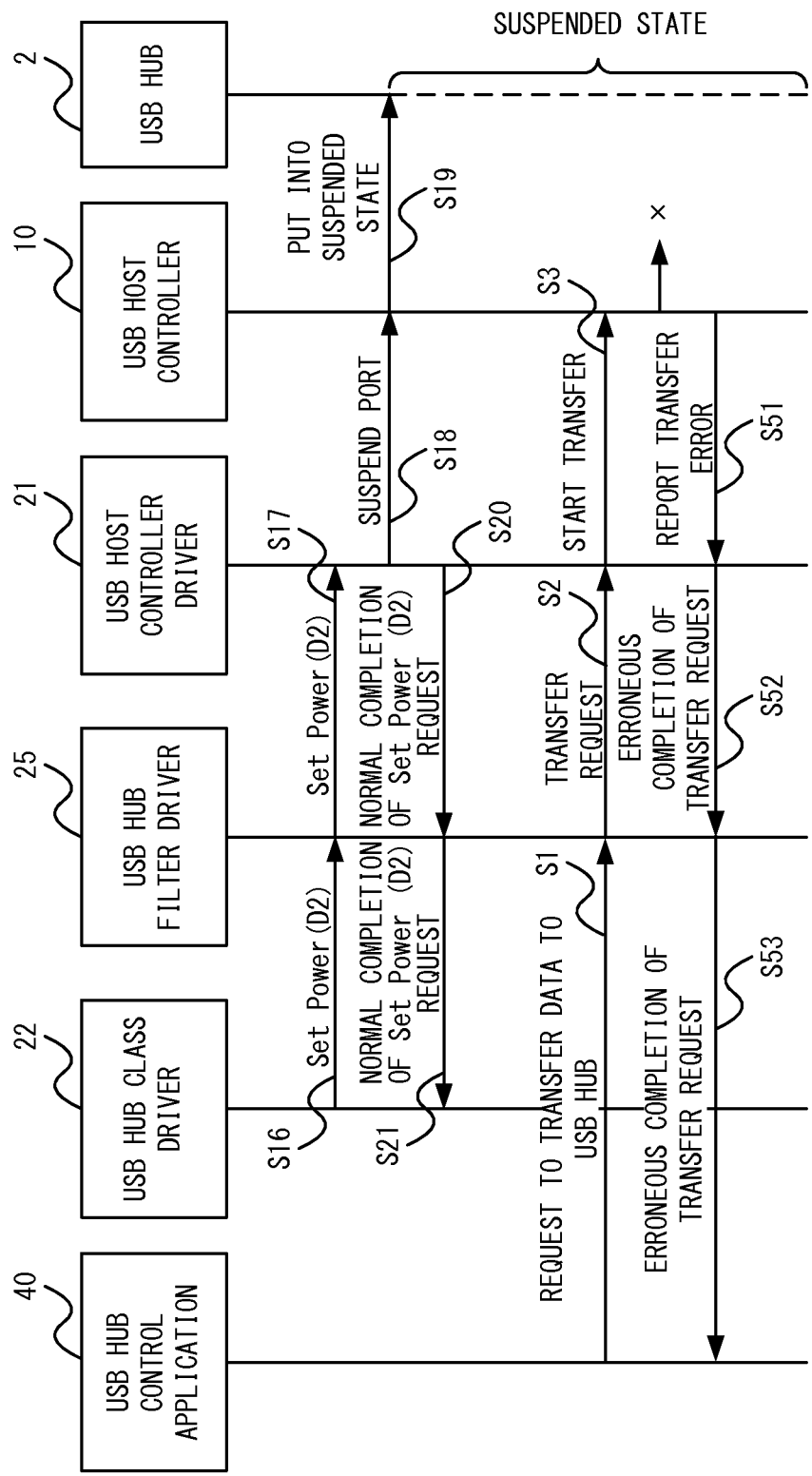
Figure 10:
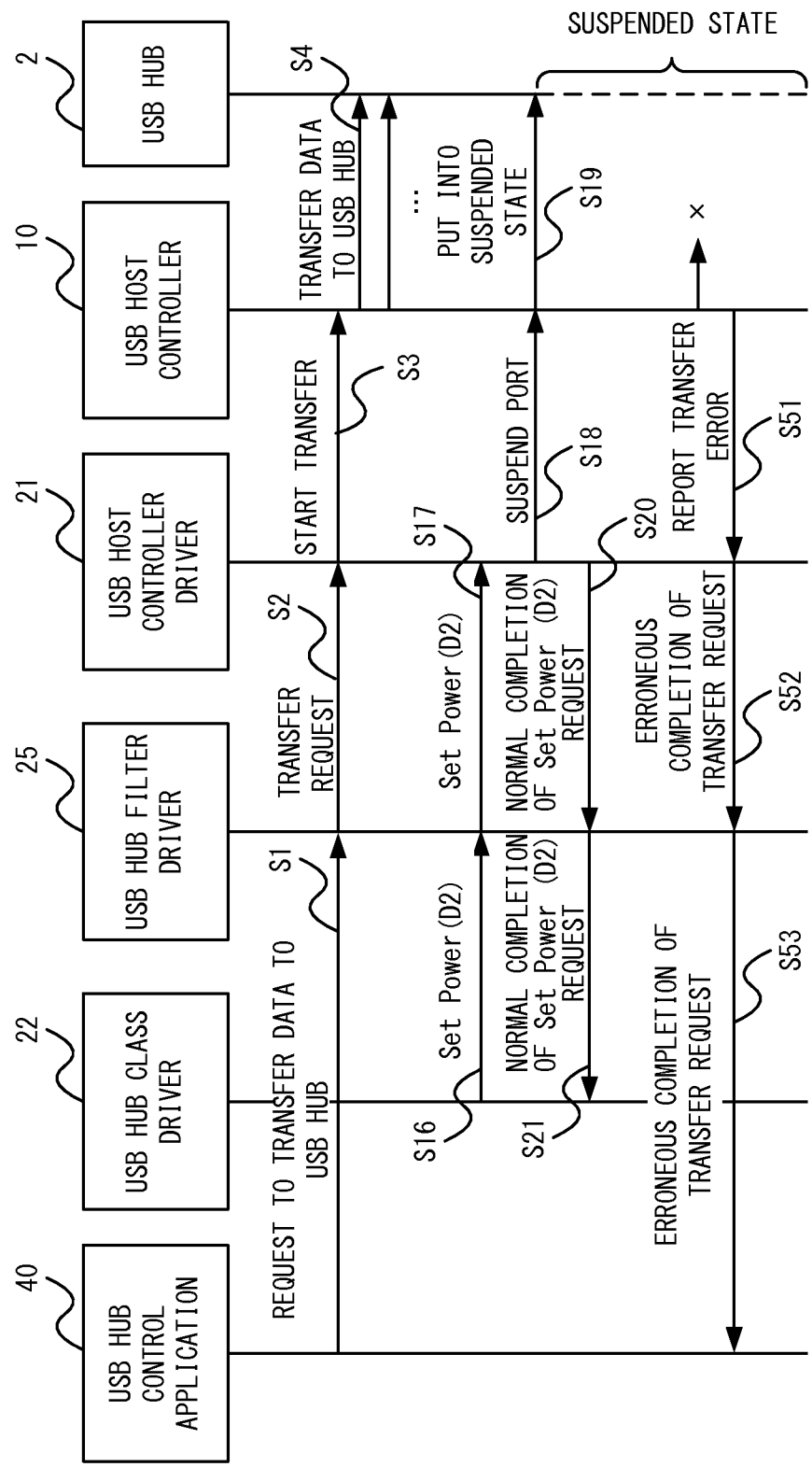
Figure 11:
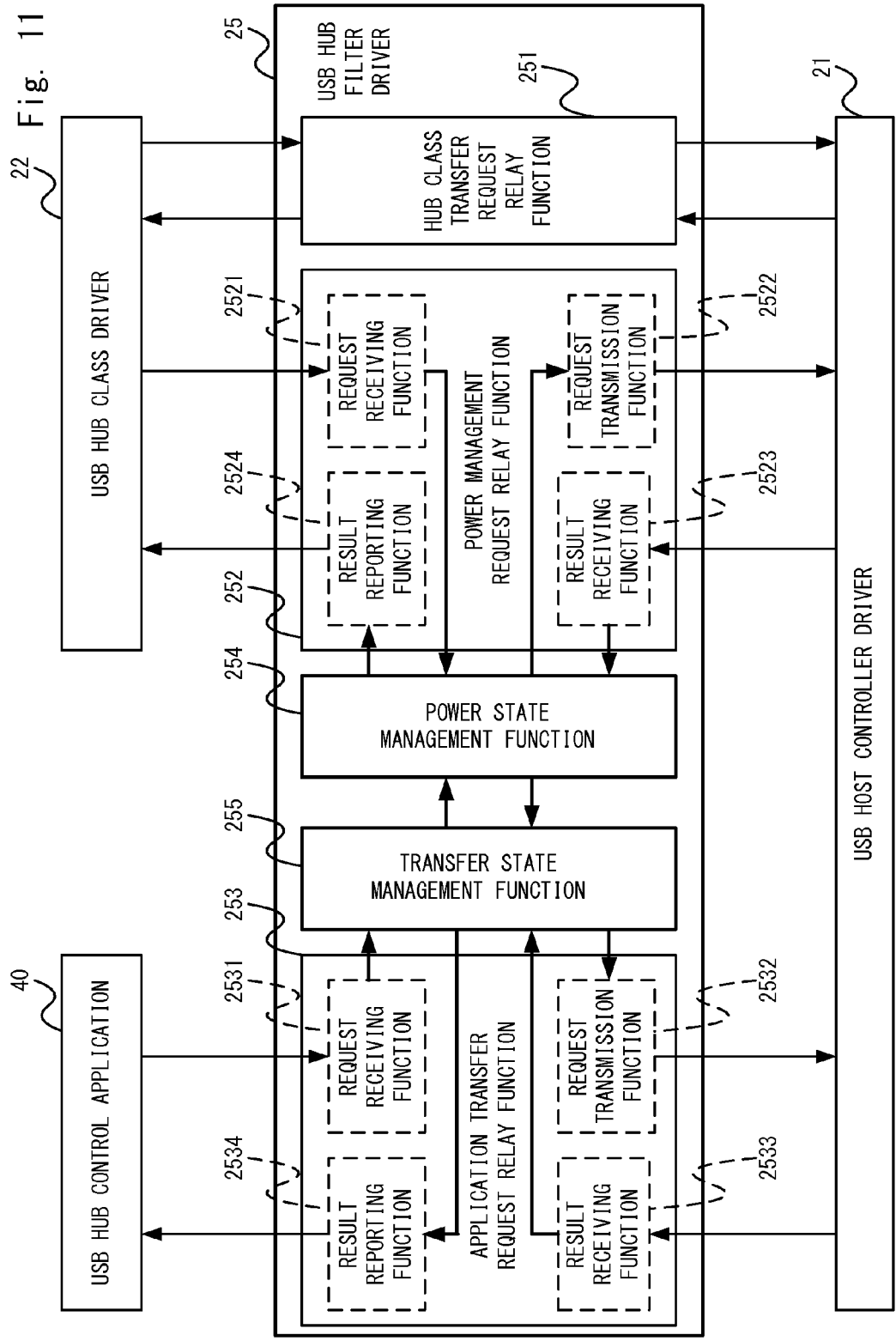
Figure 12:
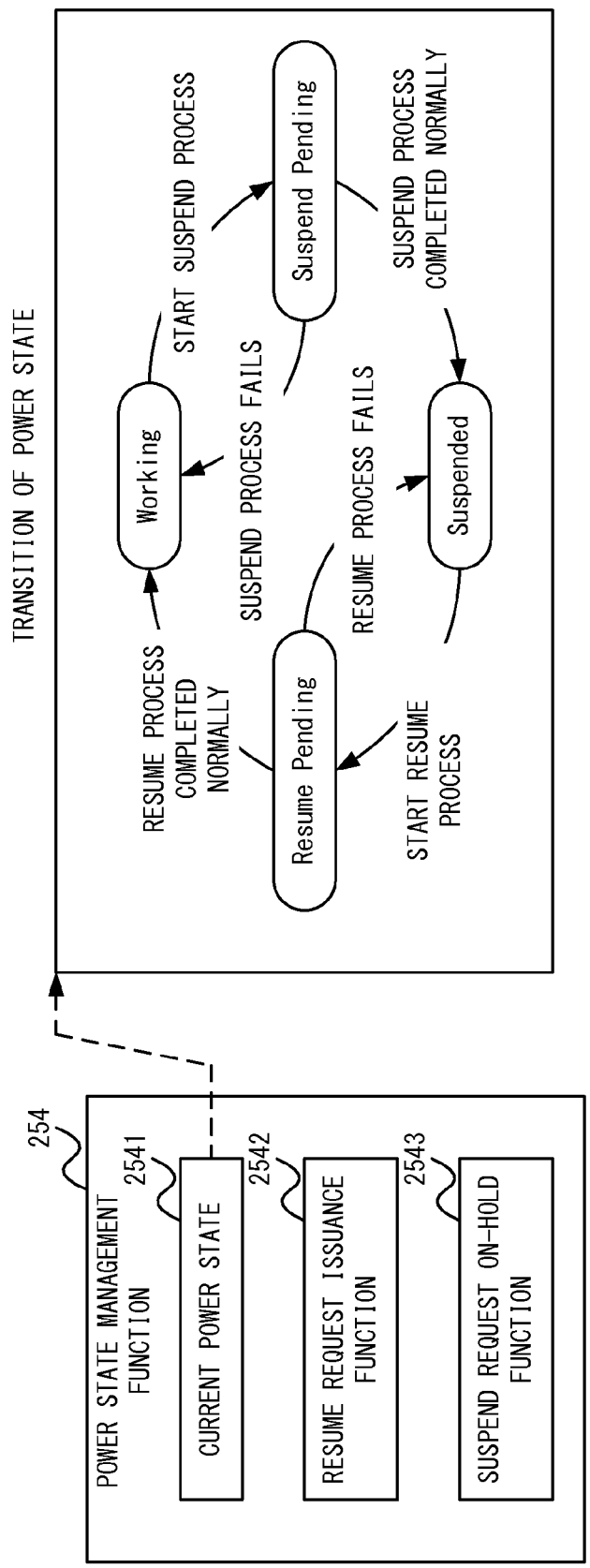
Figure 13:
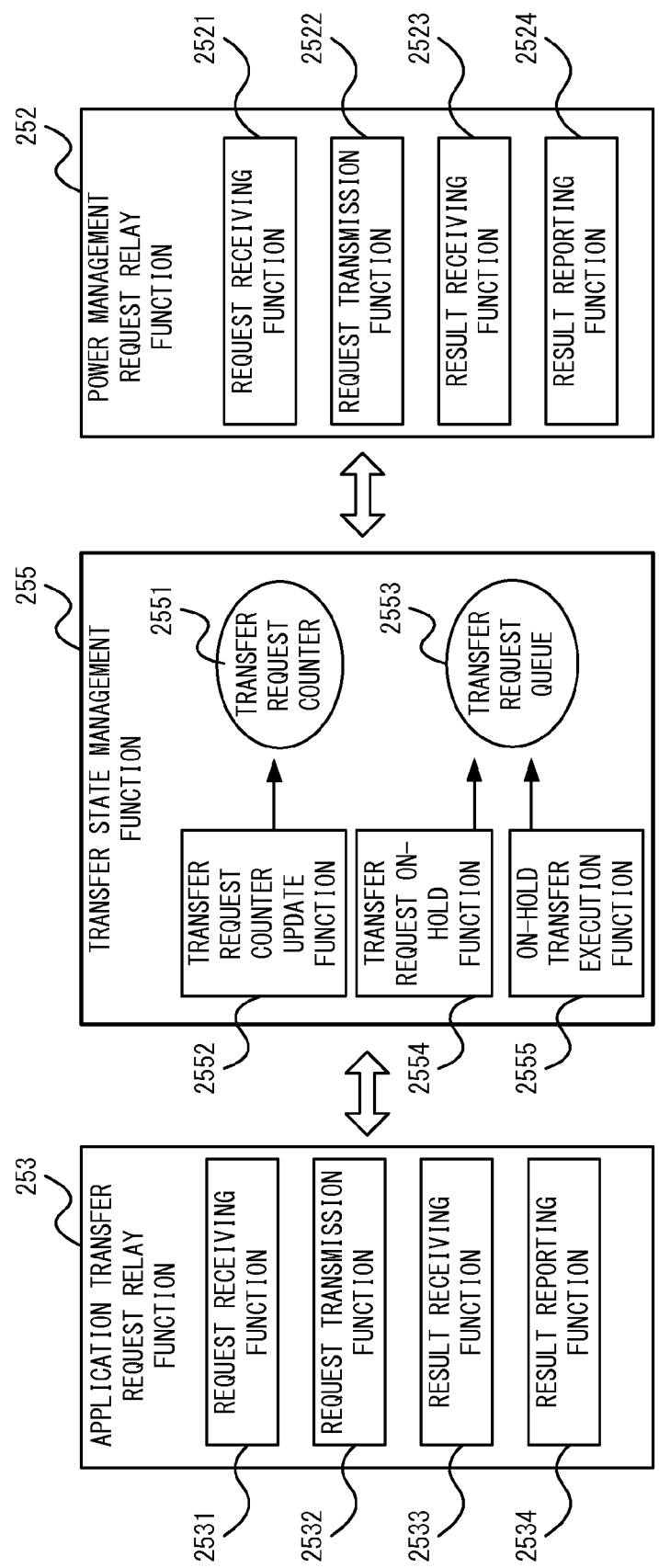
Figure 14:
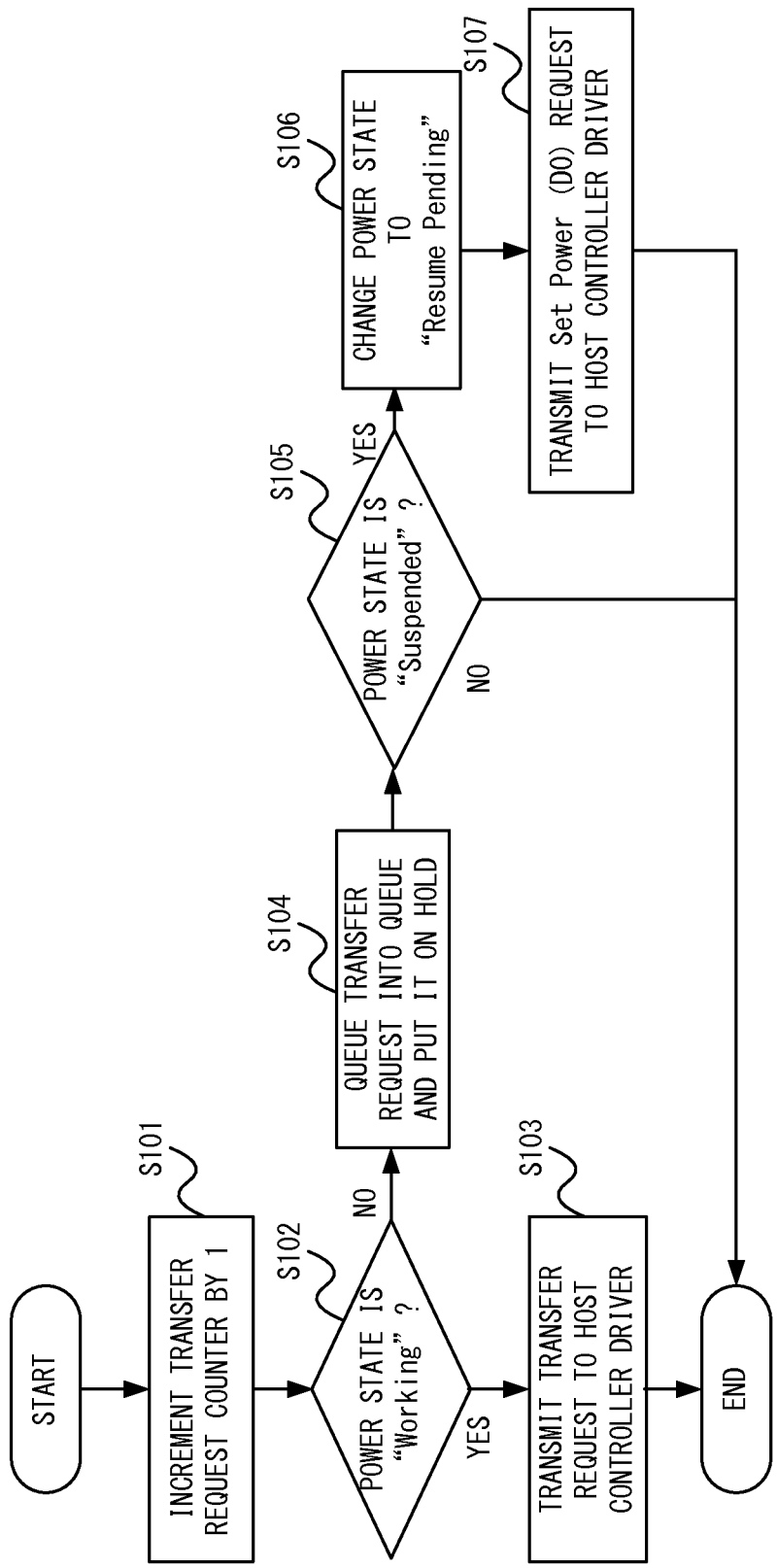
Figure 15:
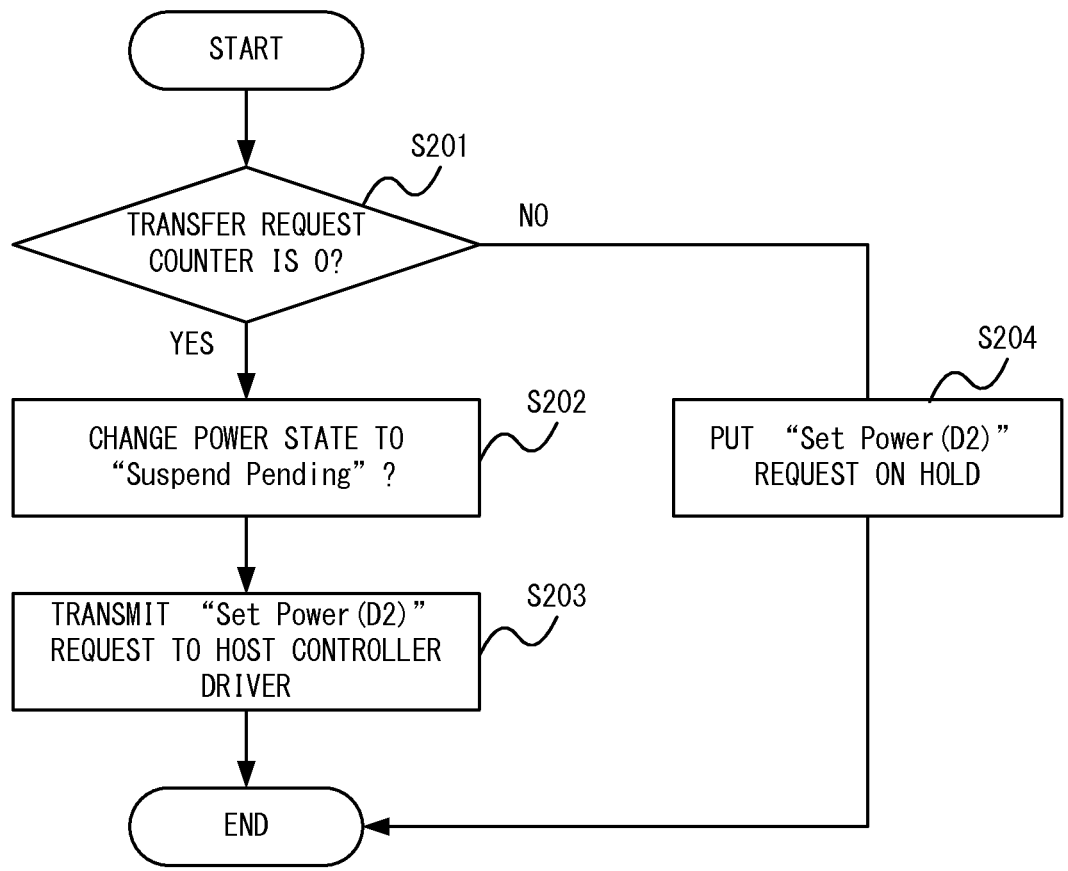
Figure 16:
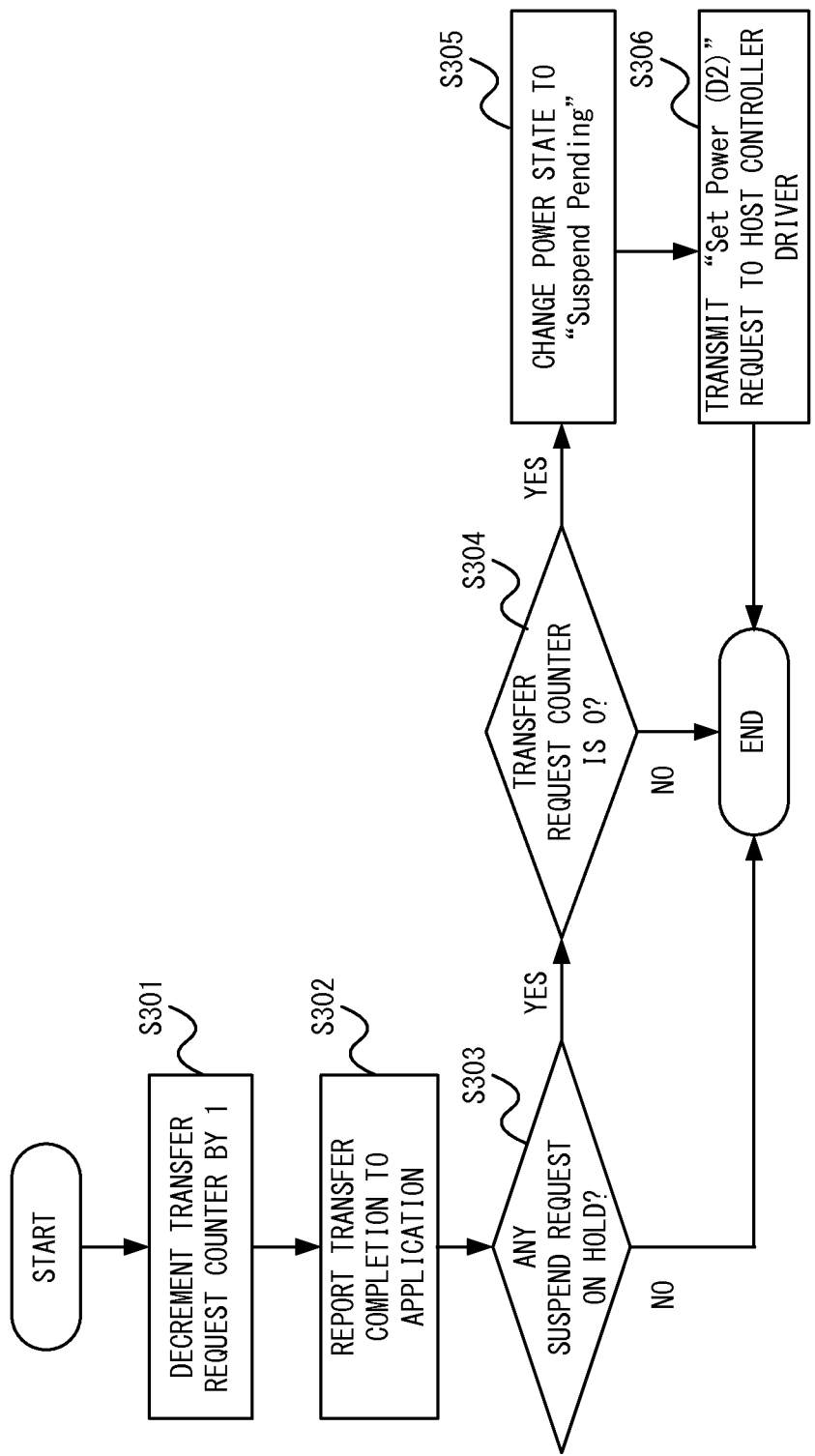
Figure 17:
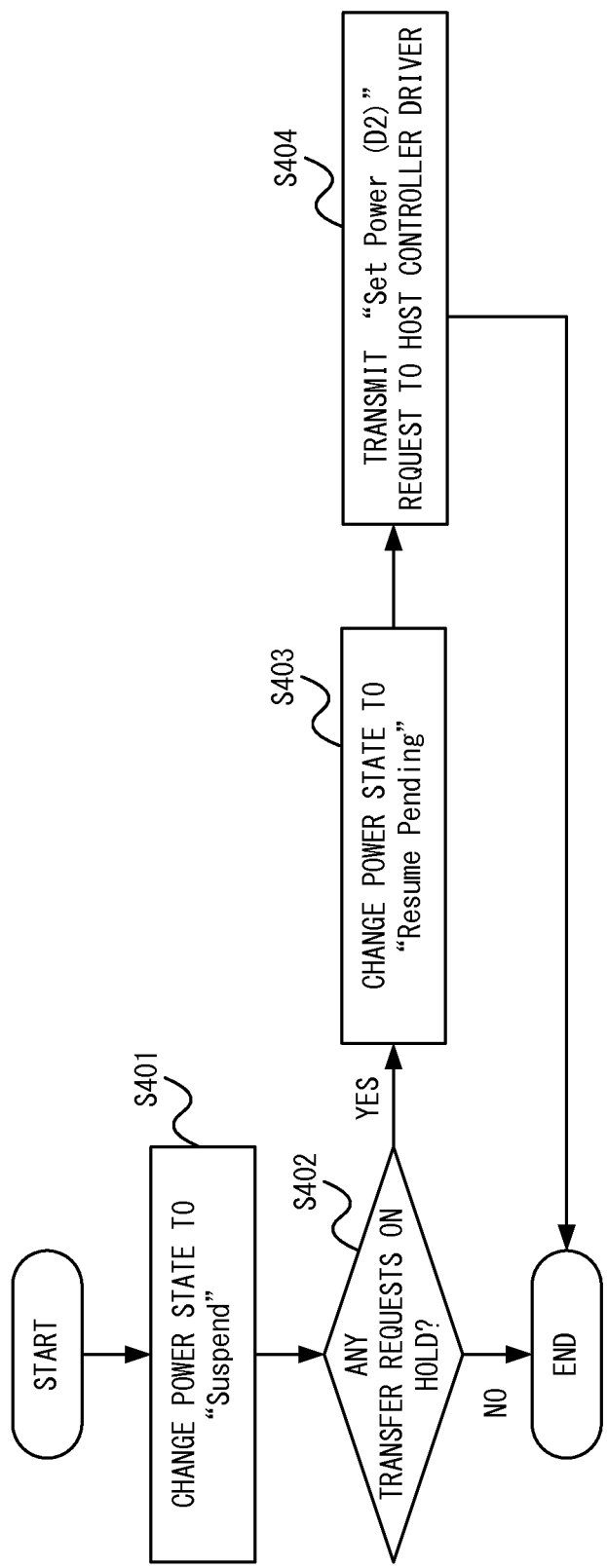
Figure 18:
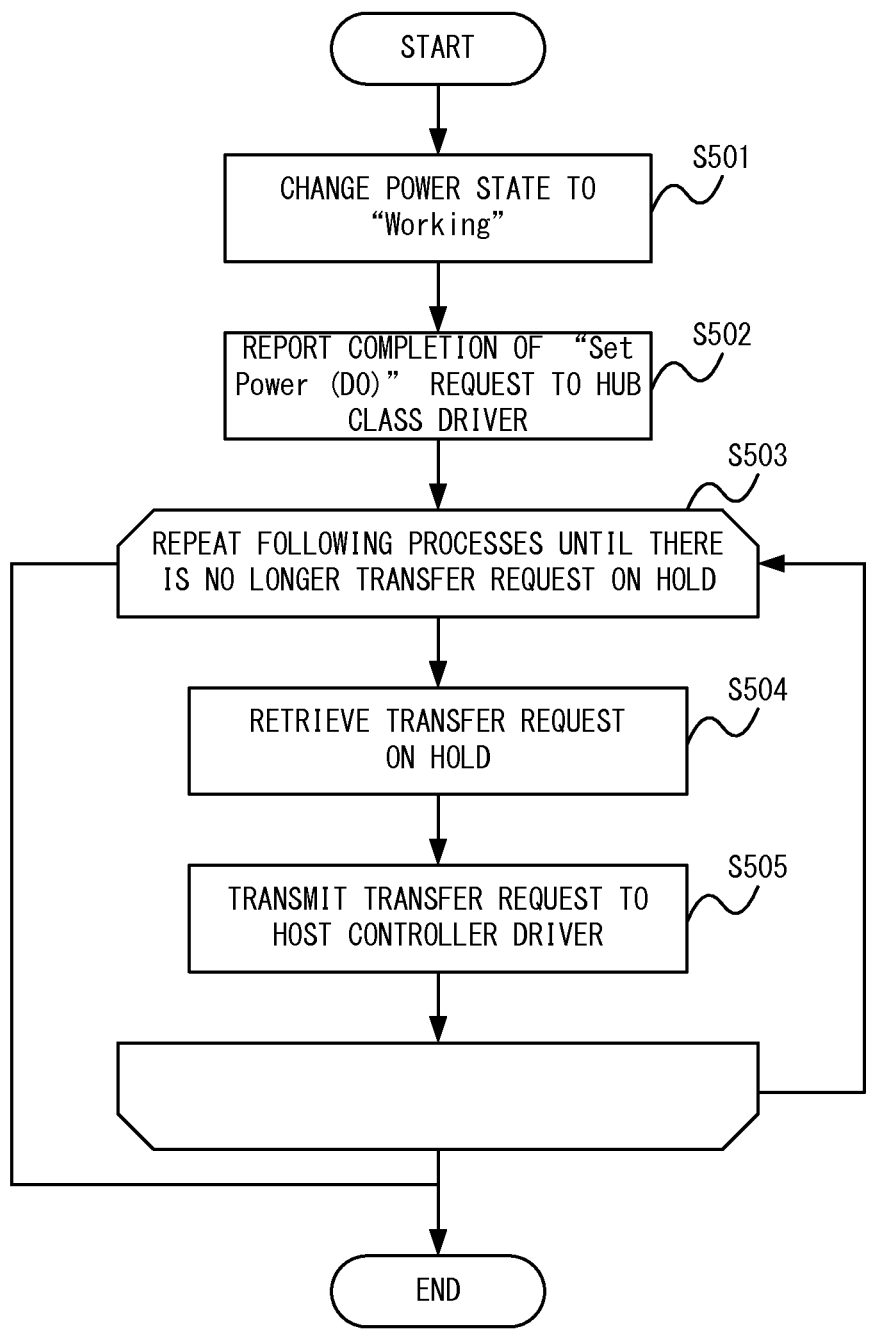
Figure 19:
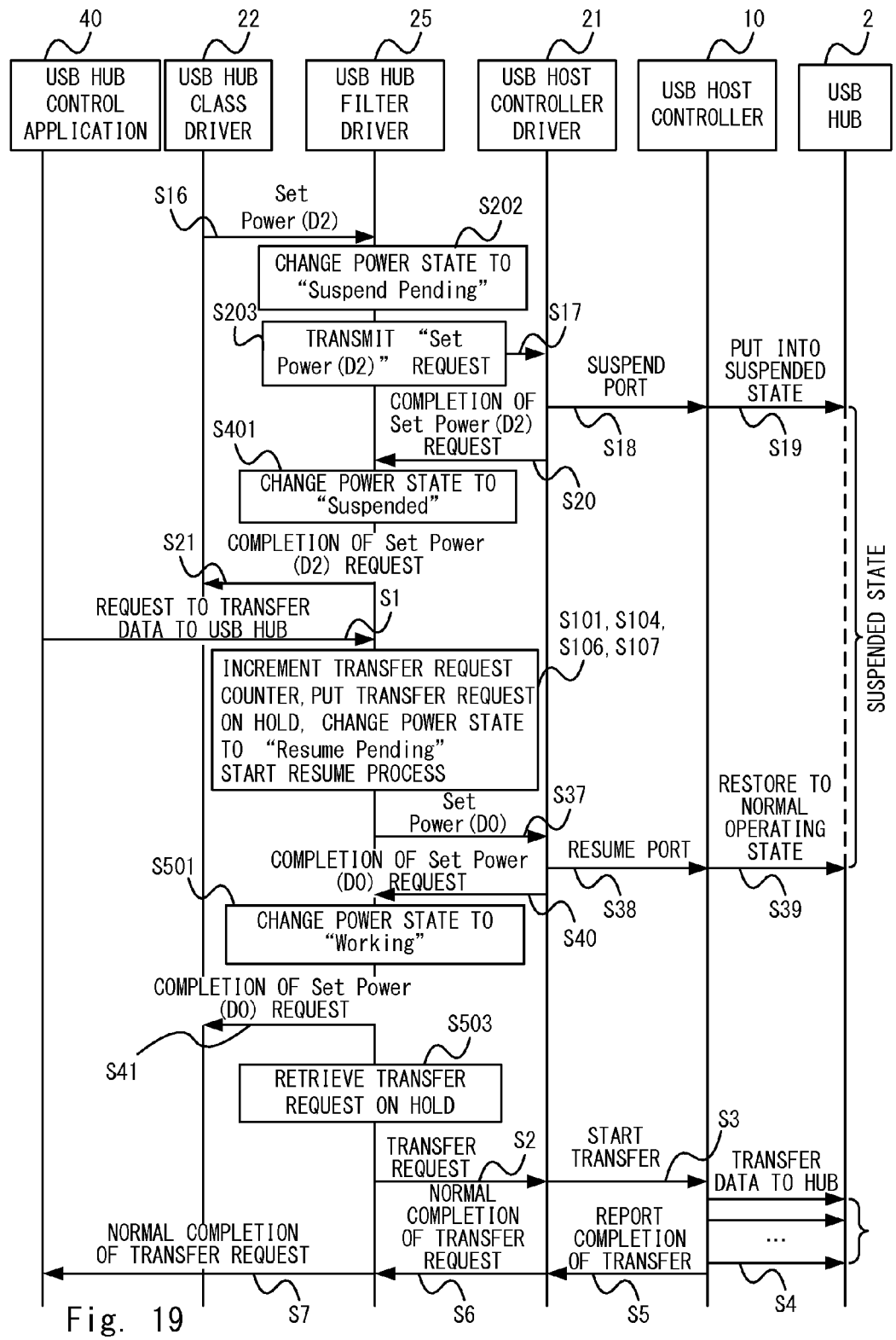
Figure 20:
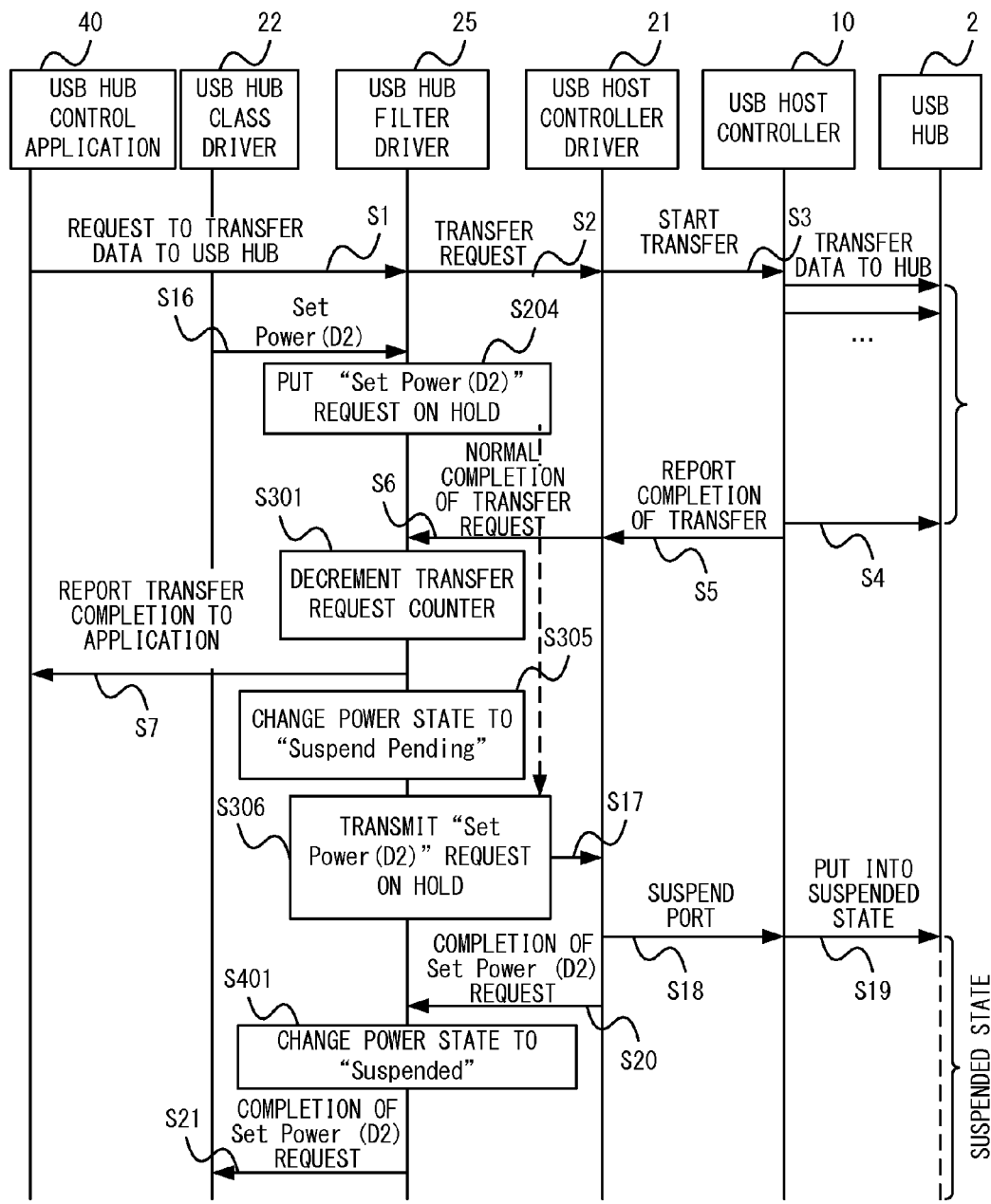
Figure 21:
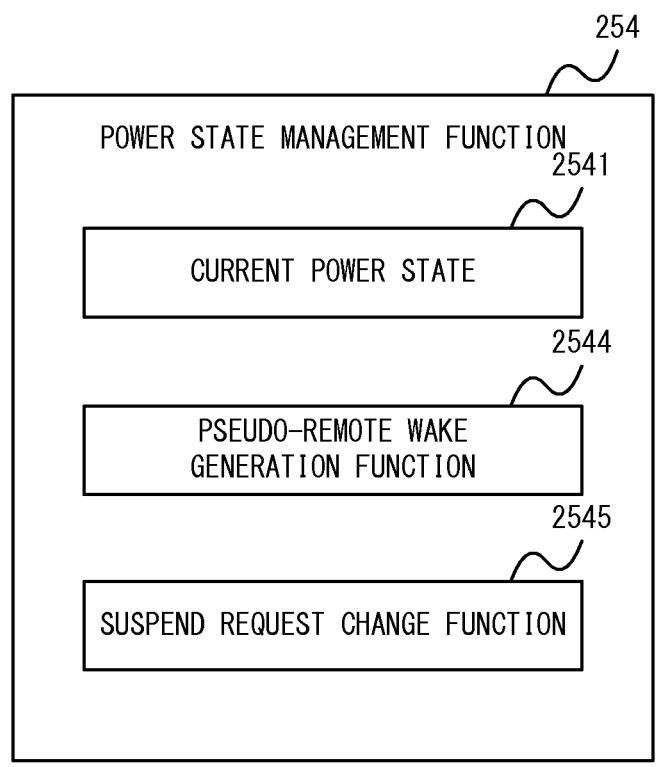
Figure 22:
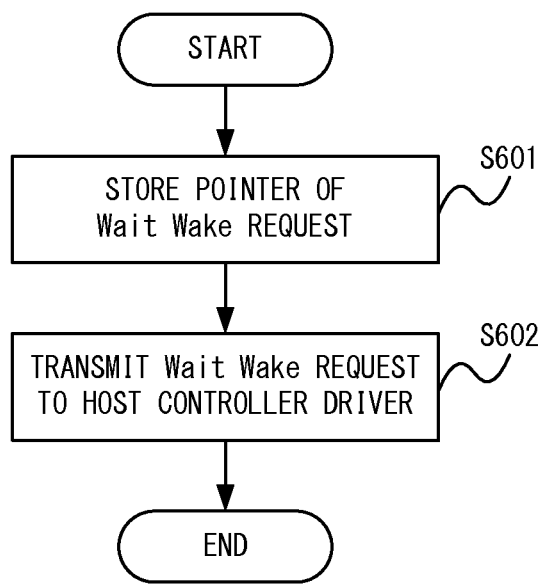
Figure 23:
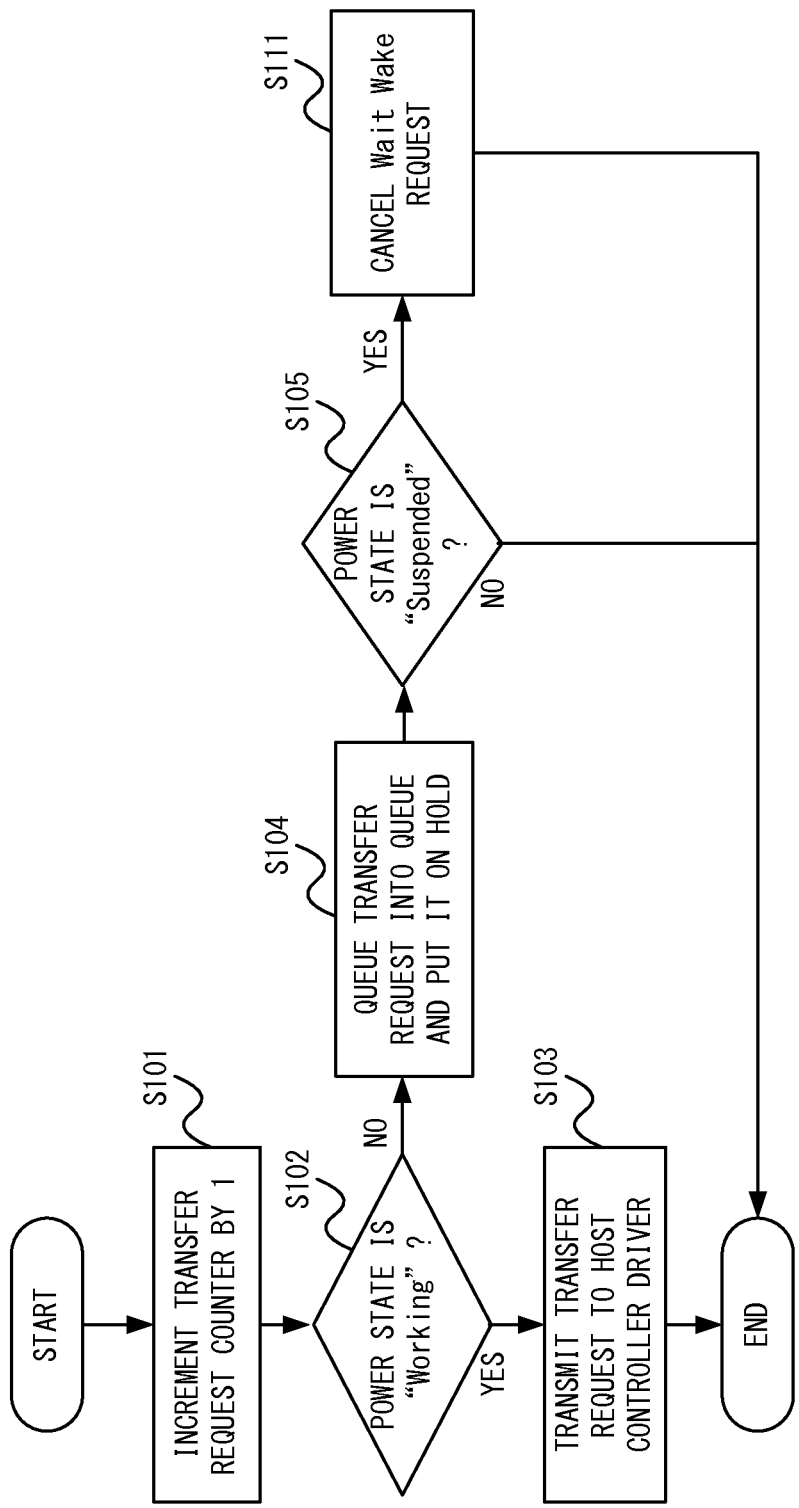
Figure 24:
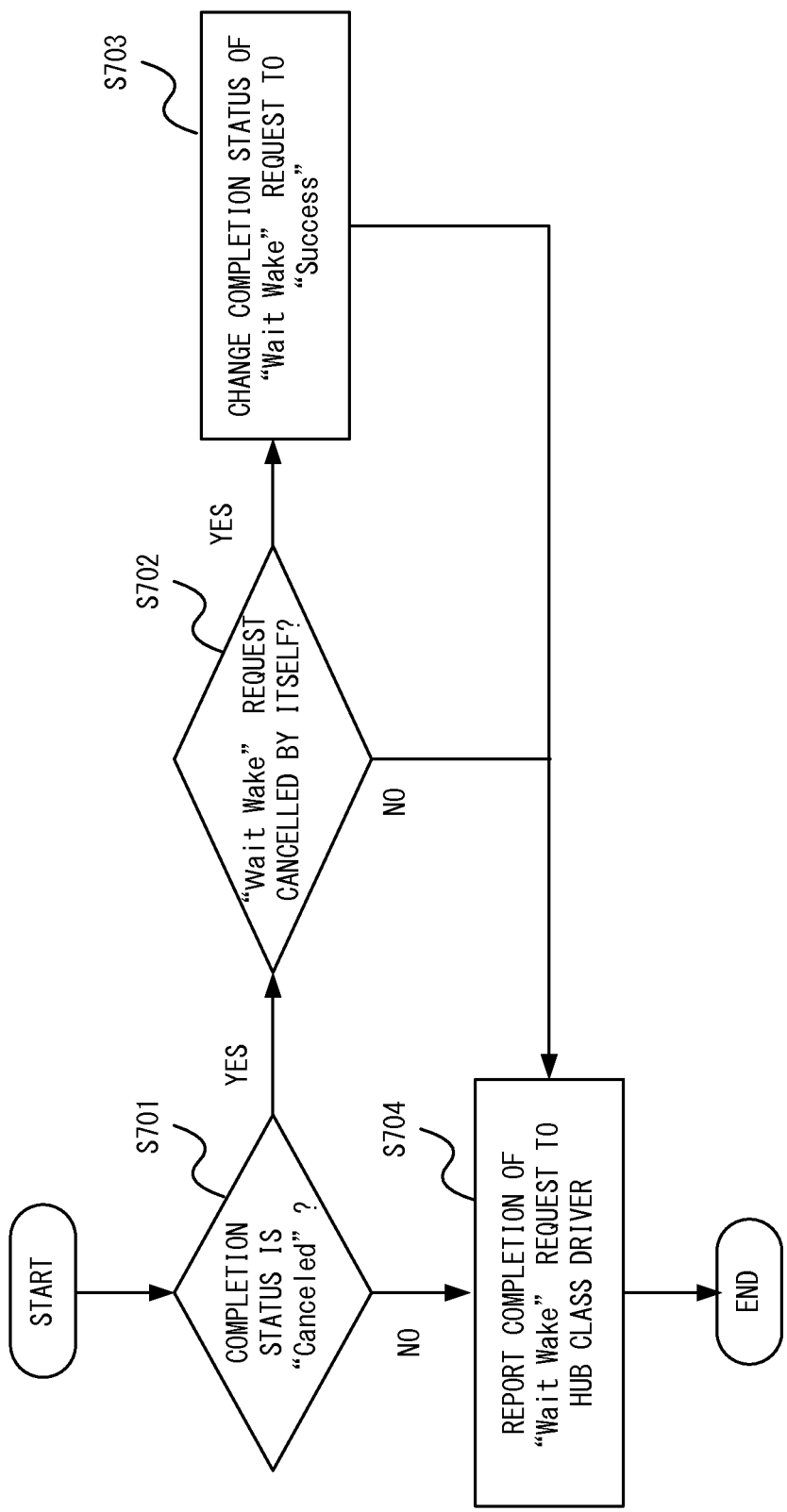
Figure 25:
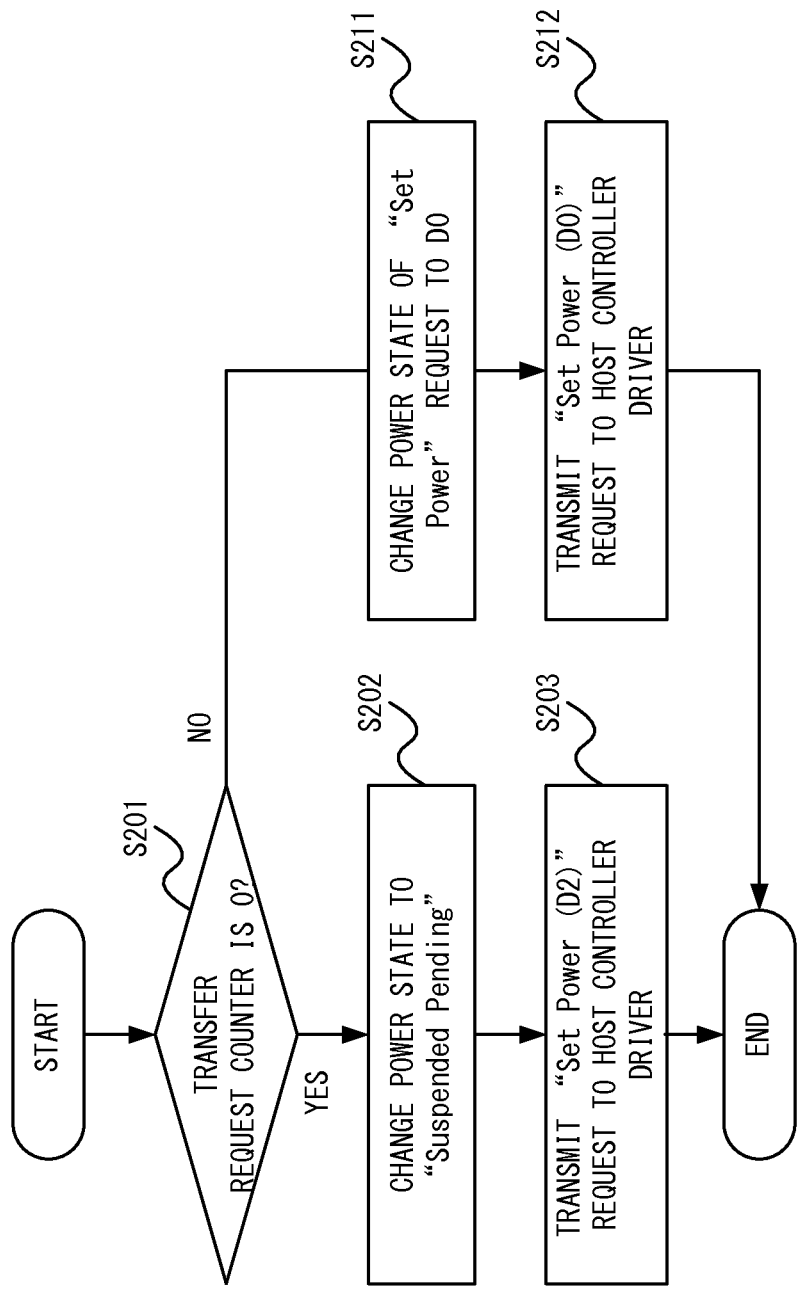
Figure 26:
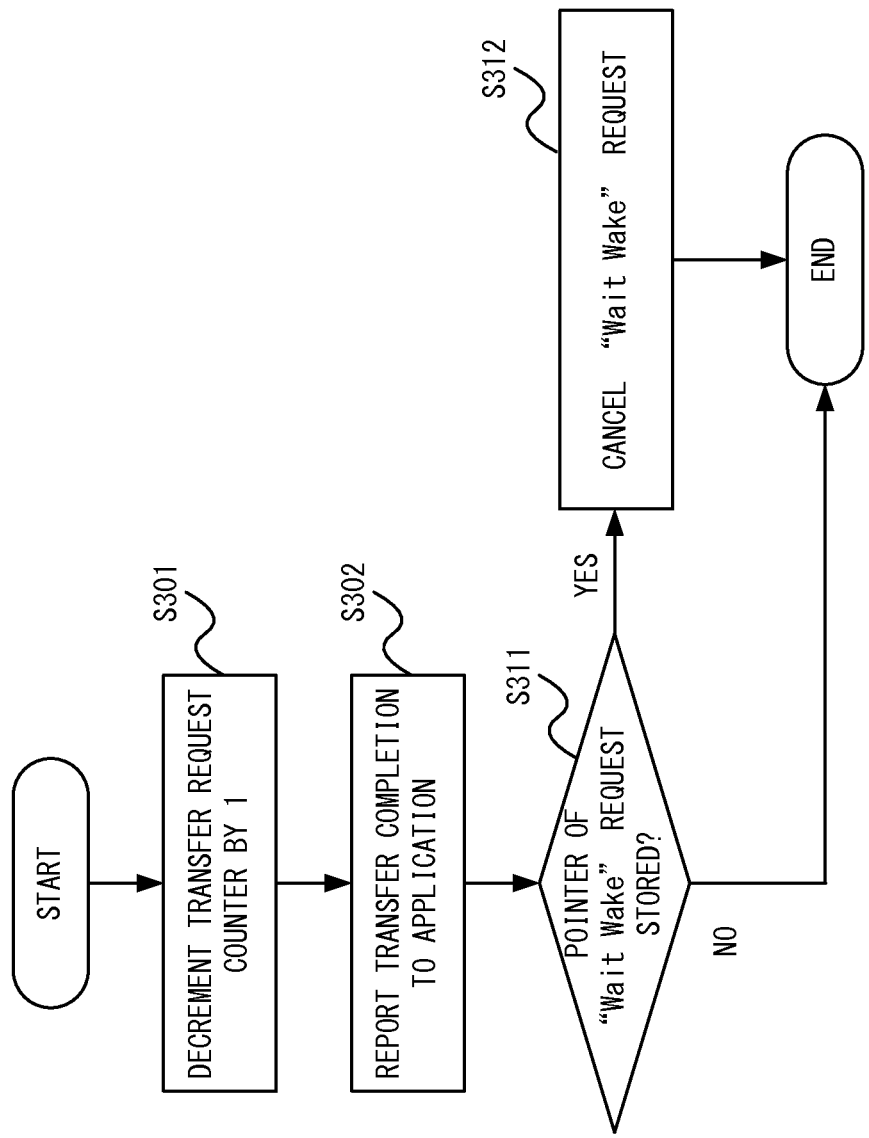
Figure 27:
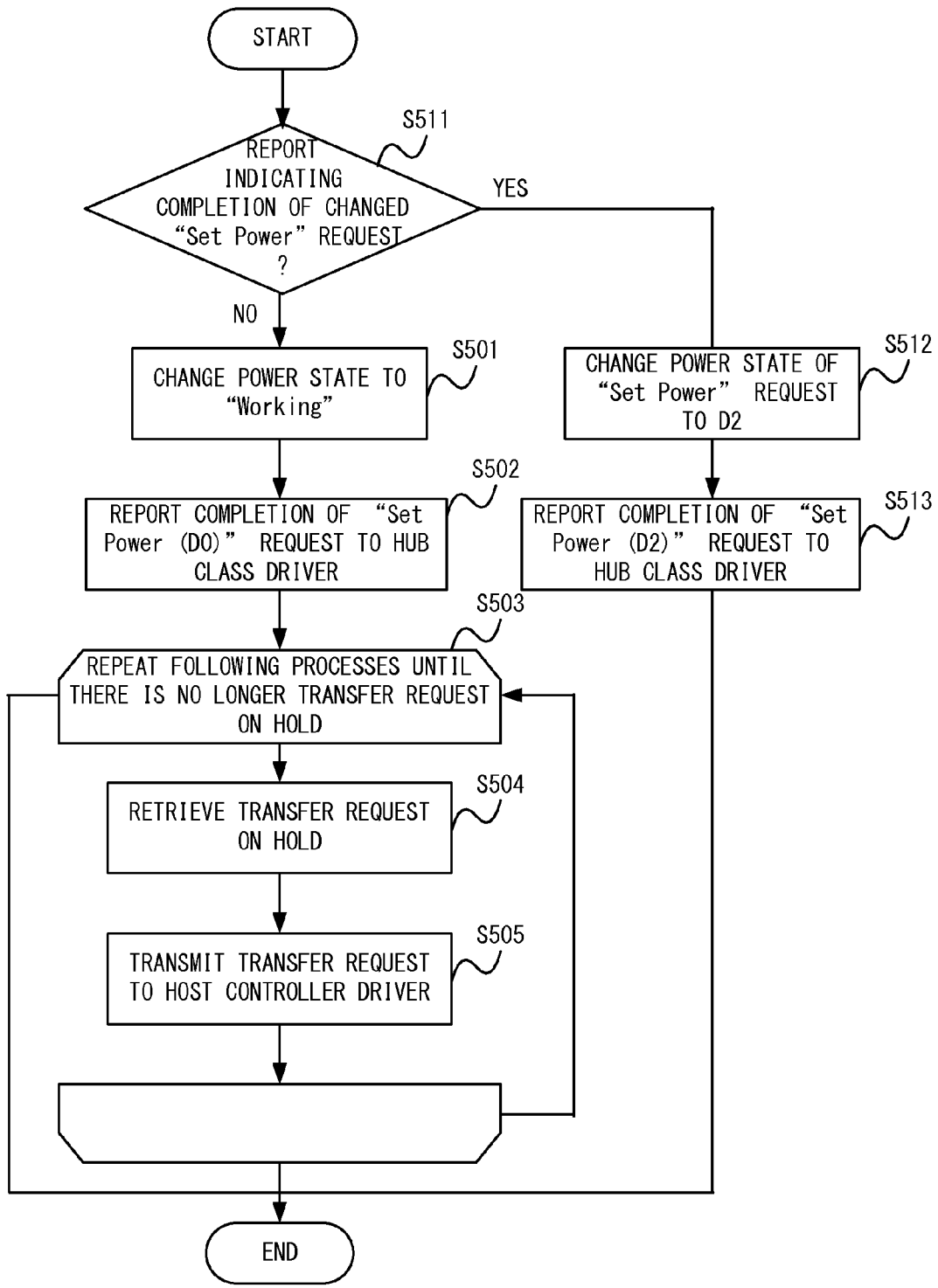
Figure 28:
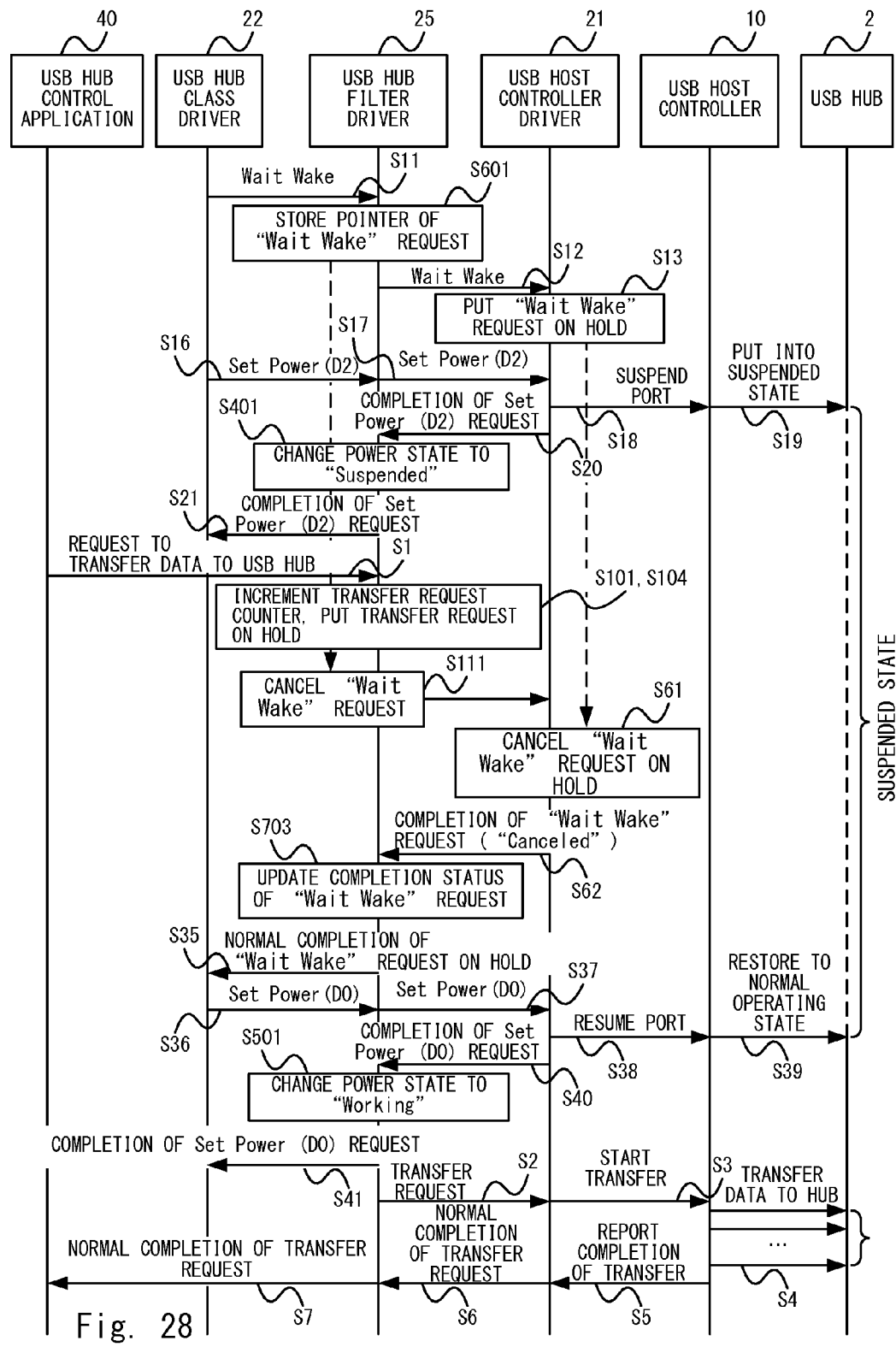
Figure 29:
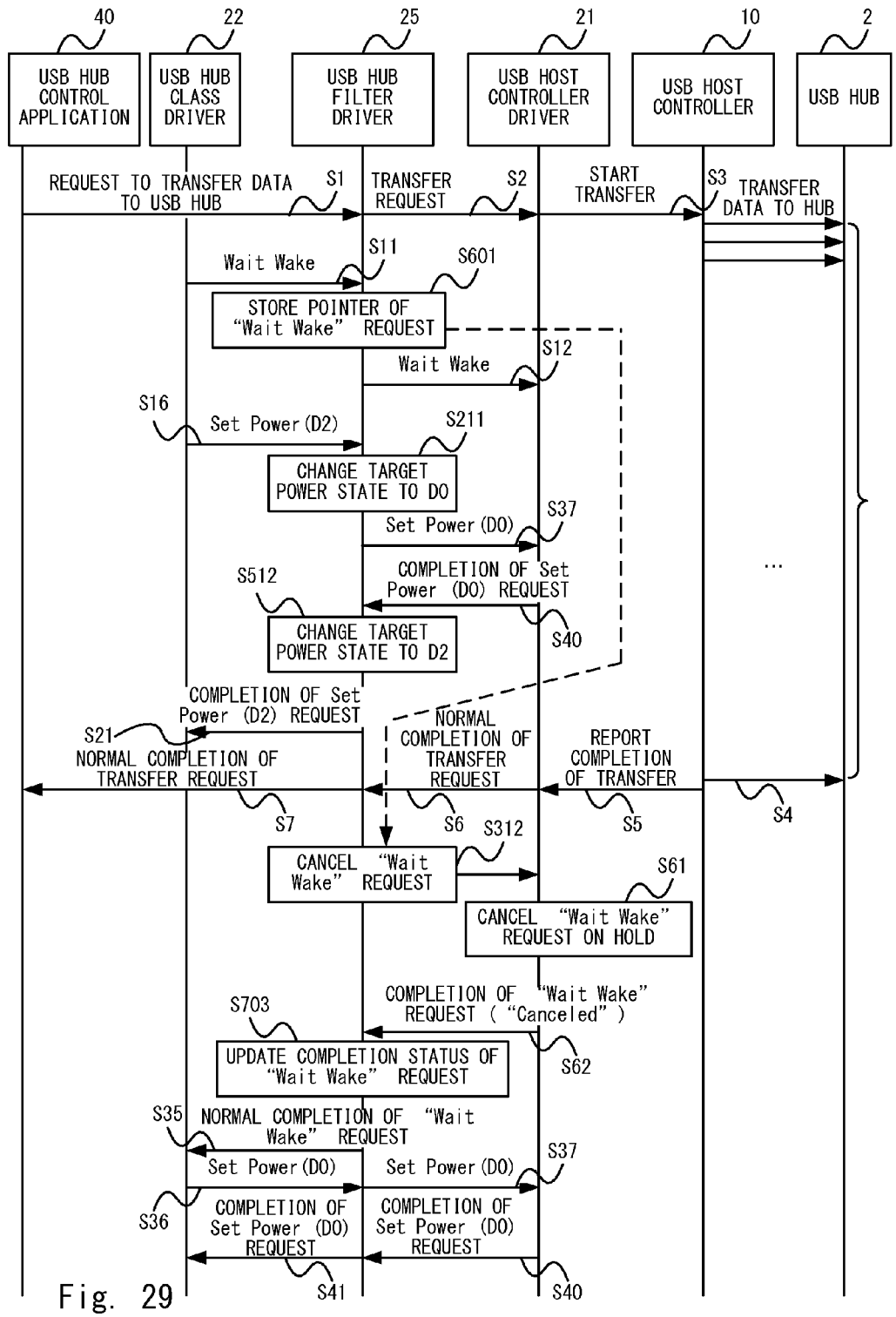
Figure 30:
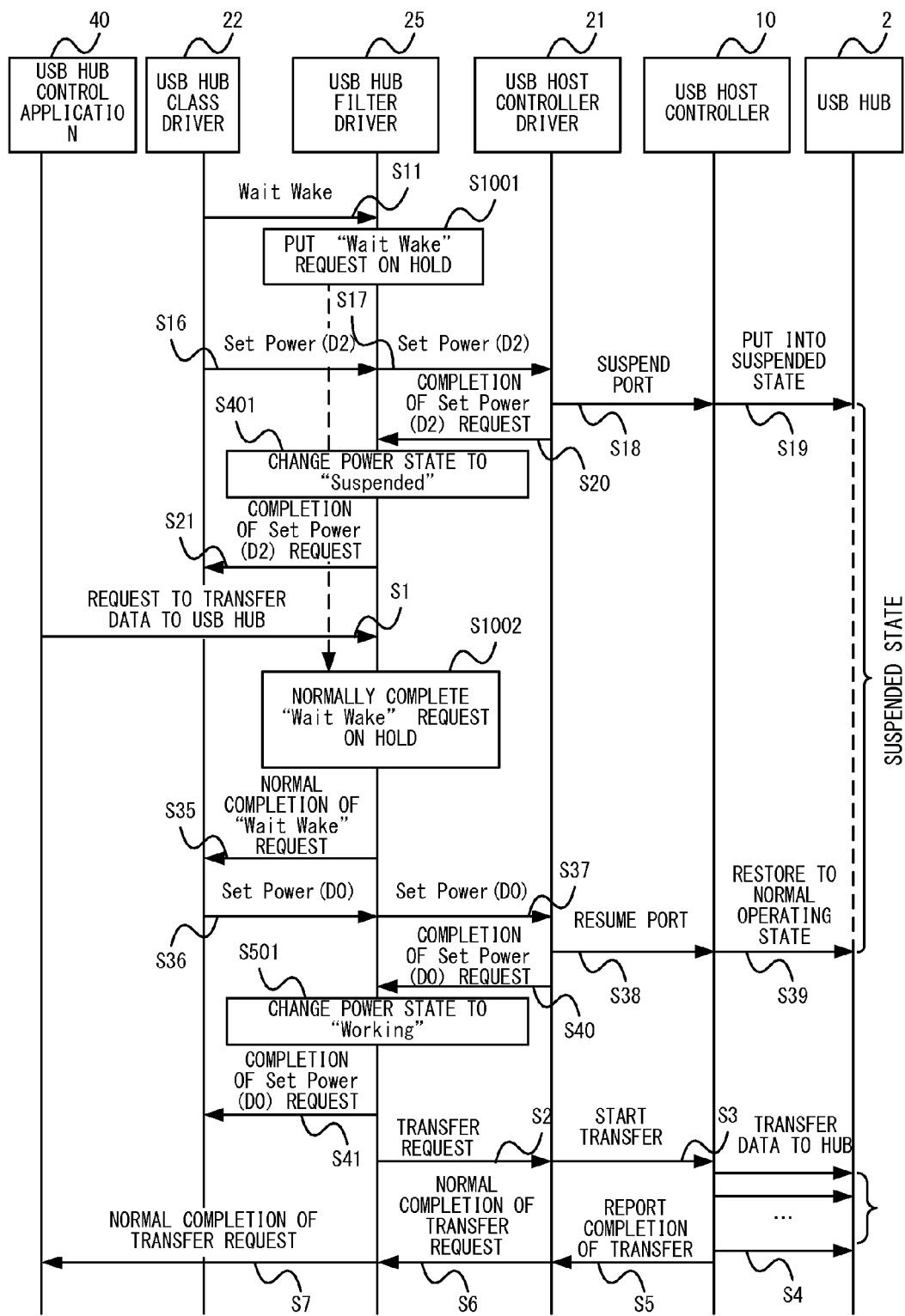
Figure 31:
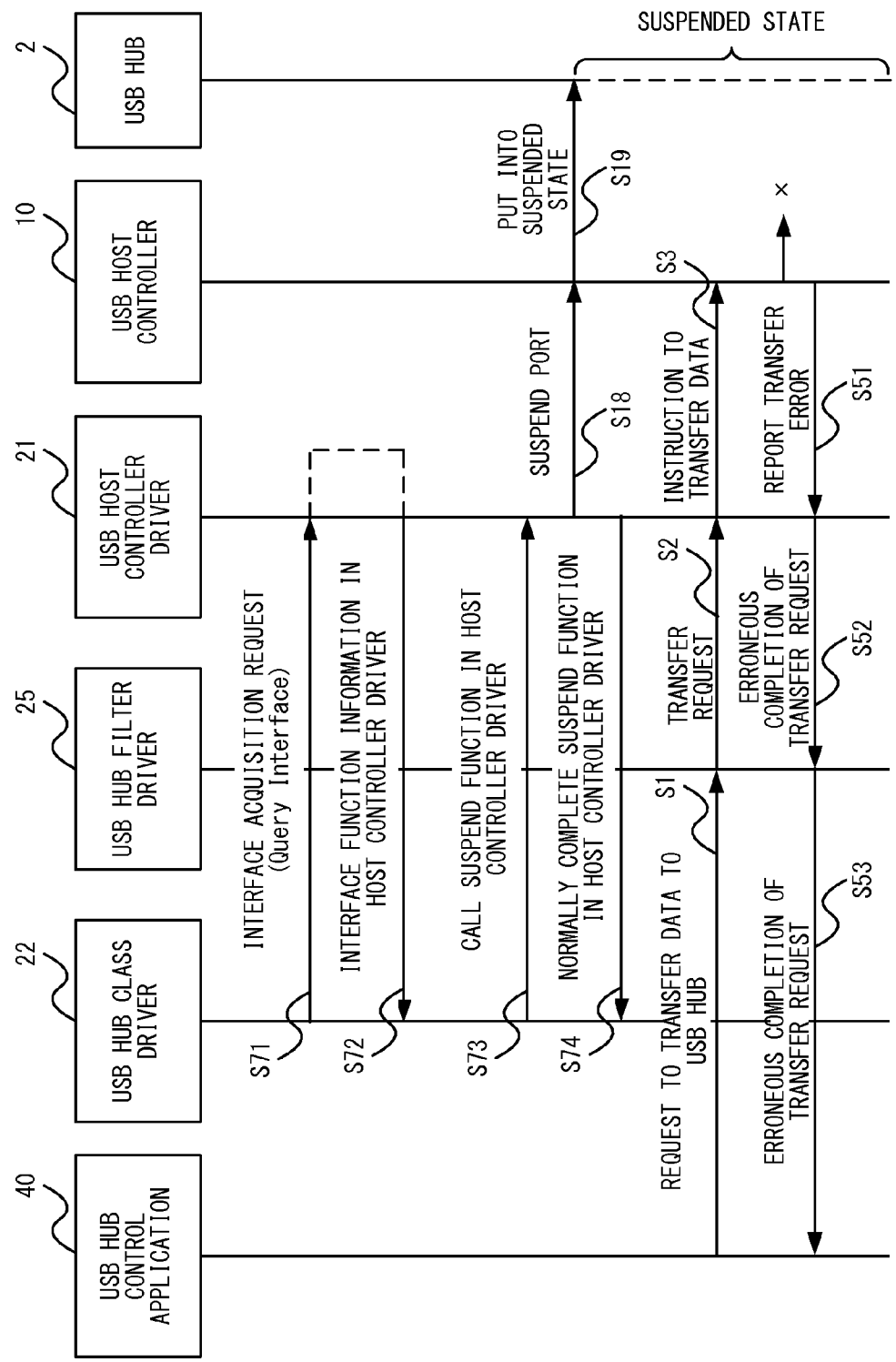
Figure 32:
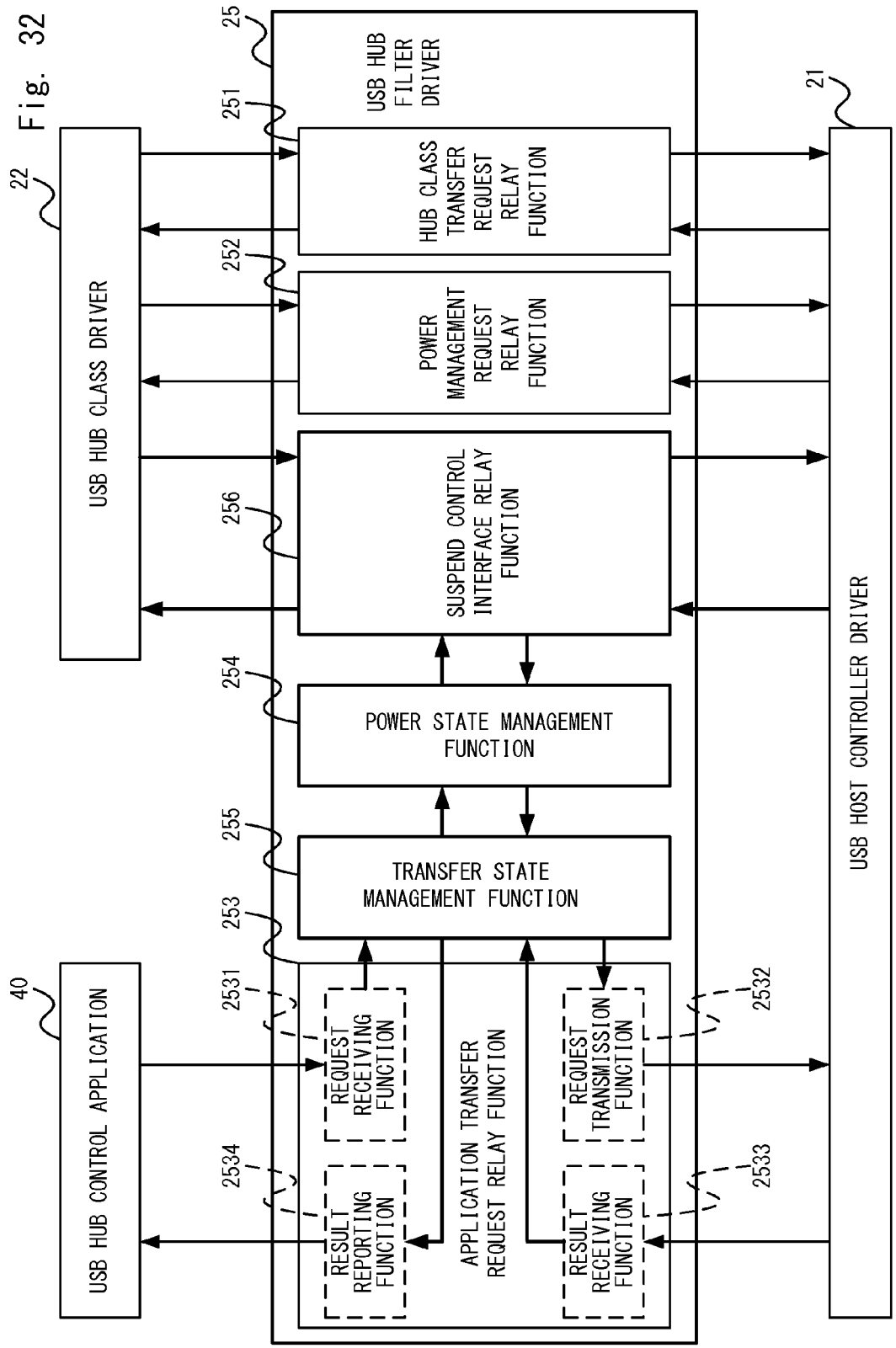
Figure 33:
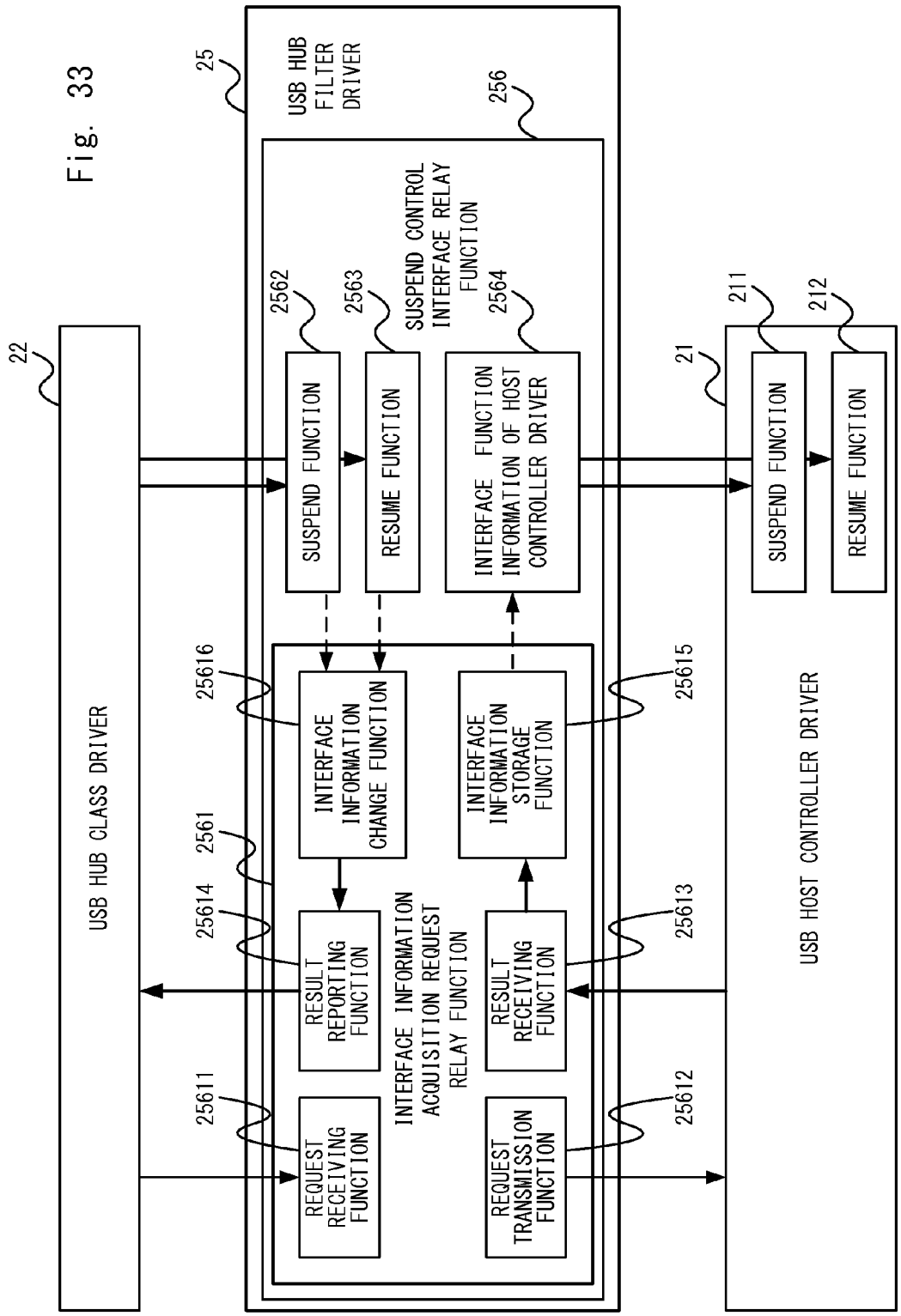
Figure 34:
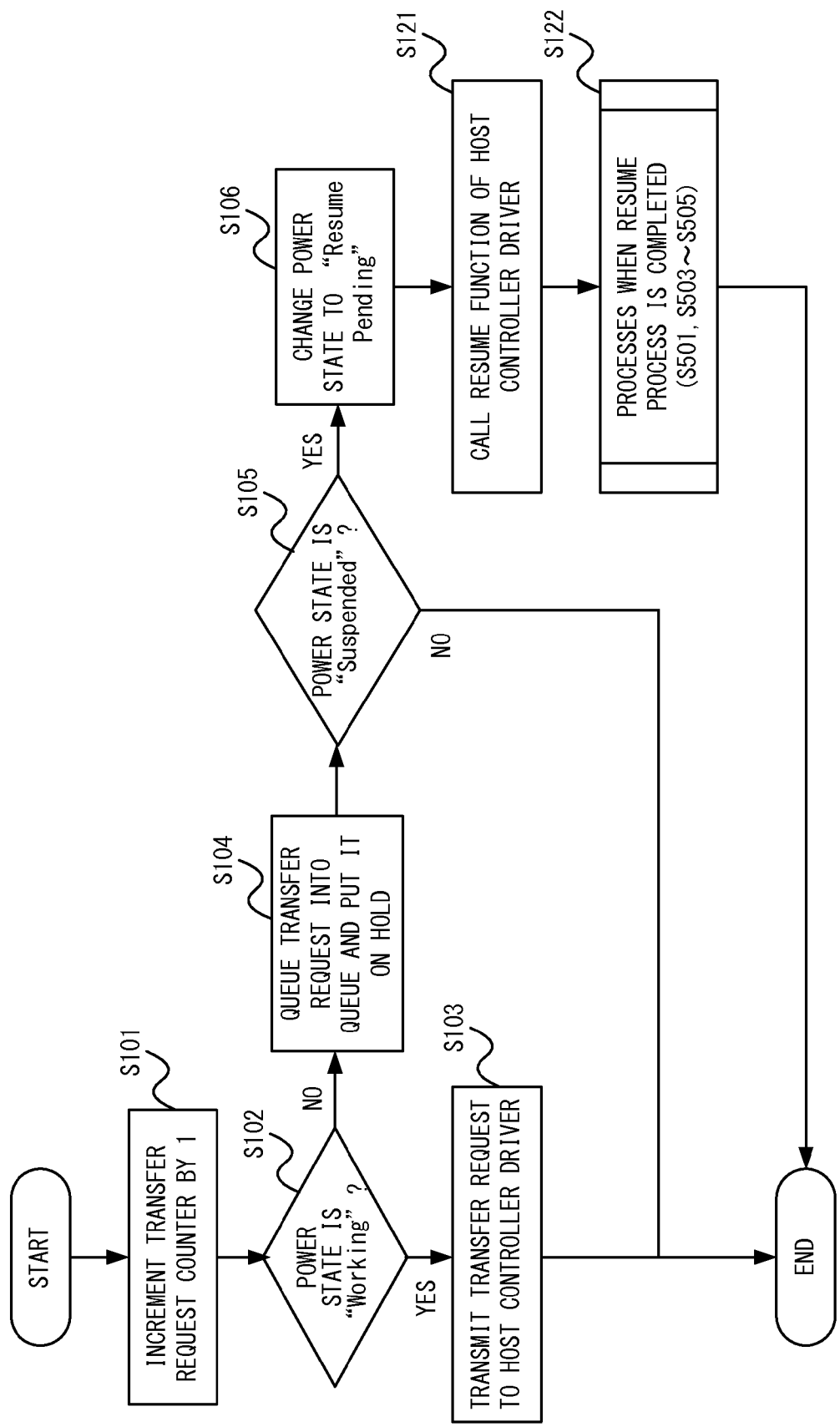
Figure 35:
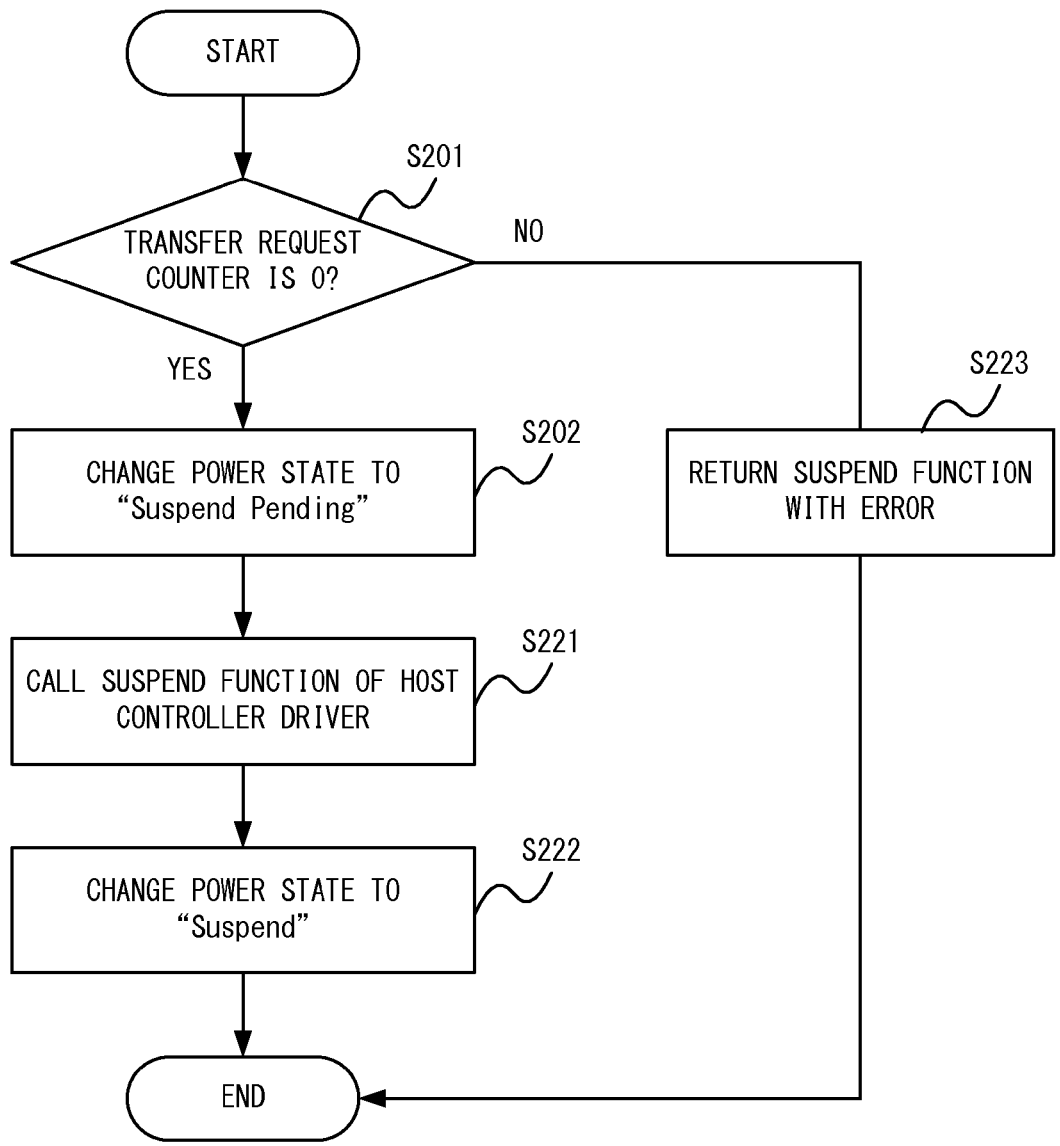
Figure 36:
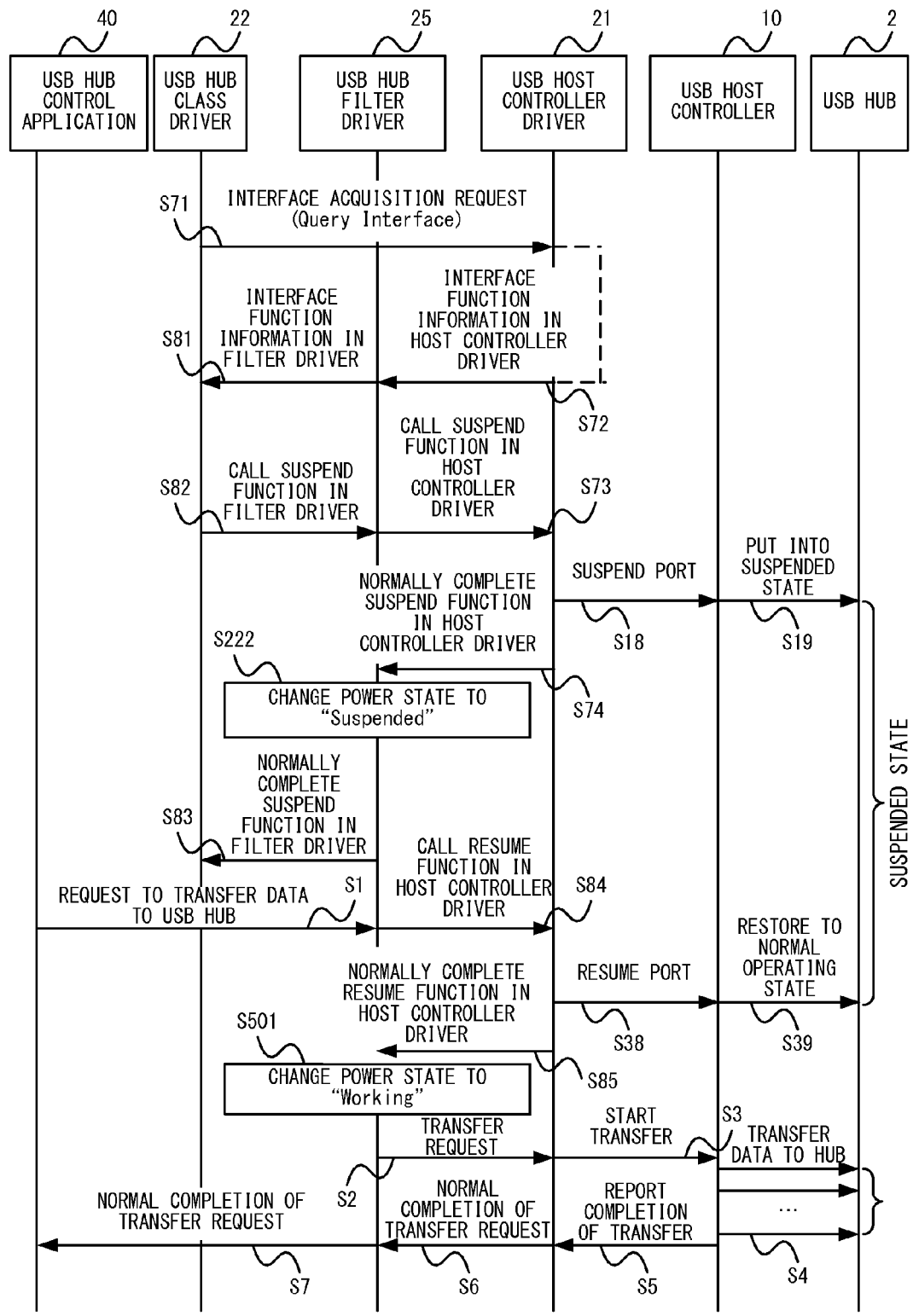
Figure 37:
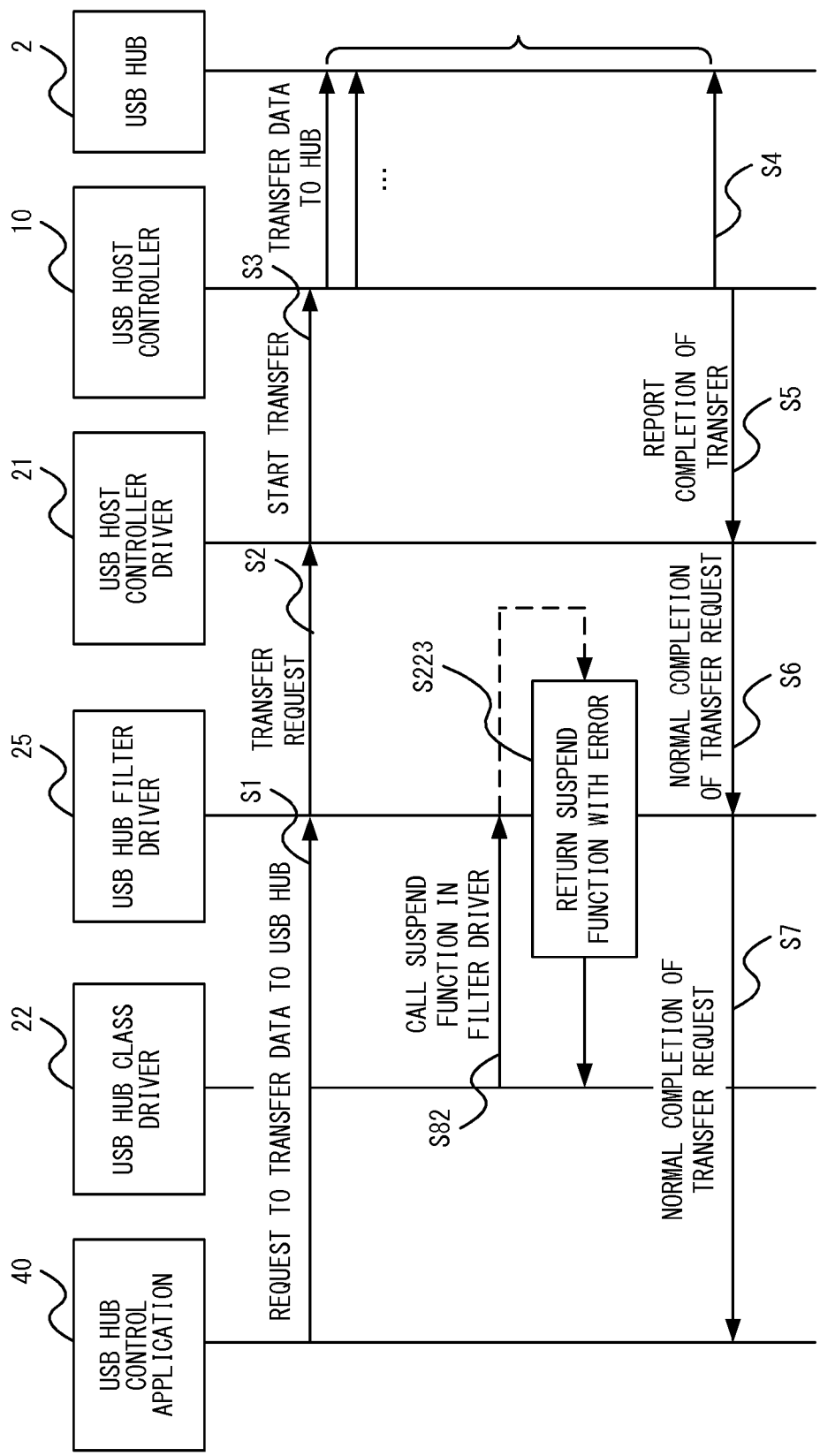
Figure 38:
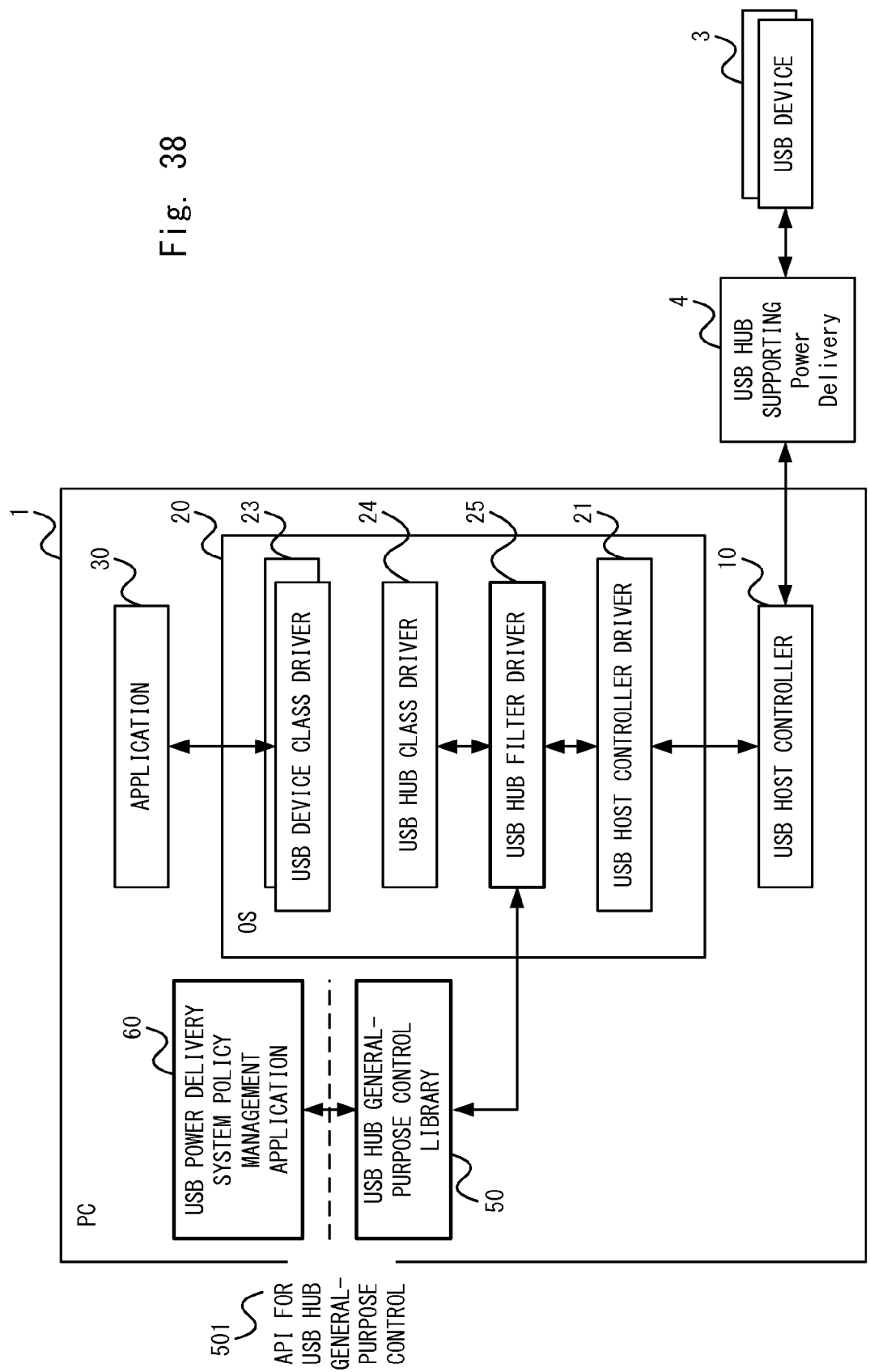
Figure 39:
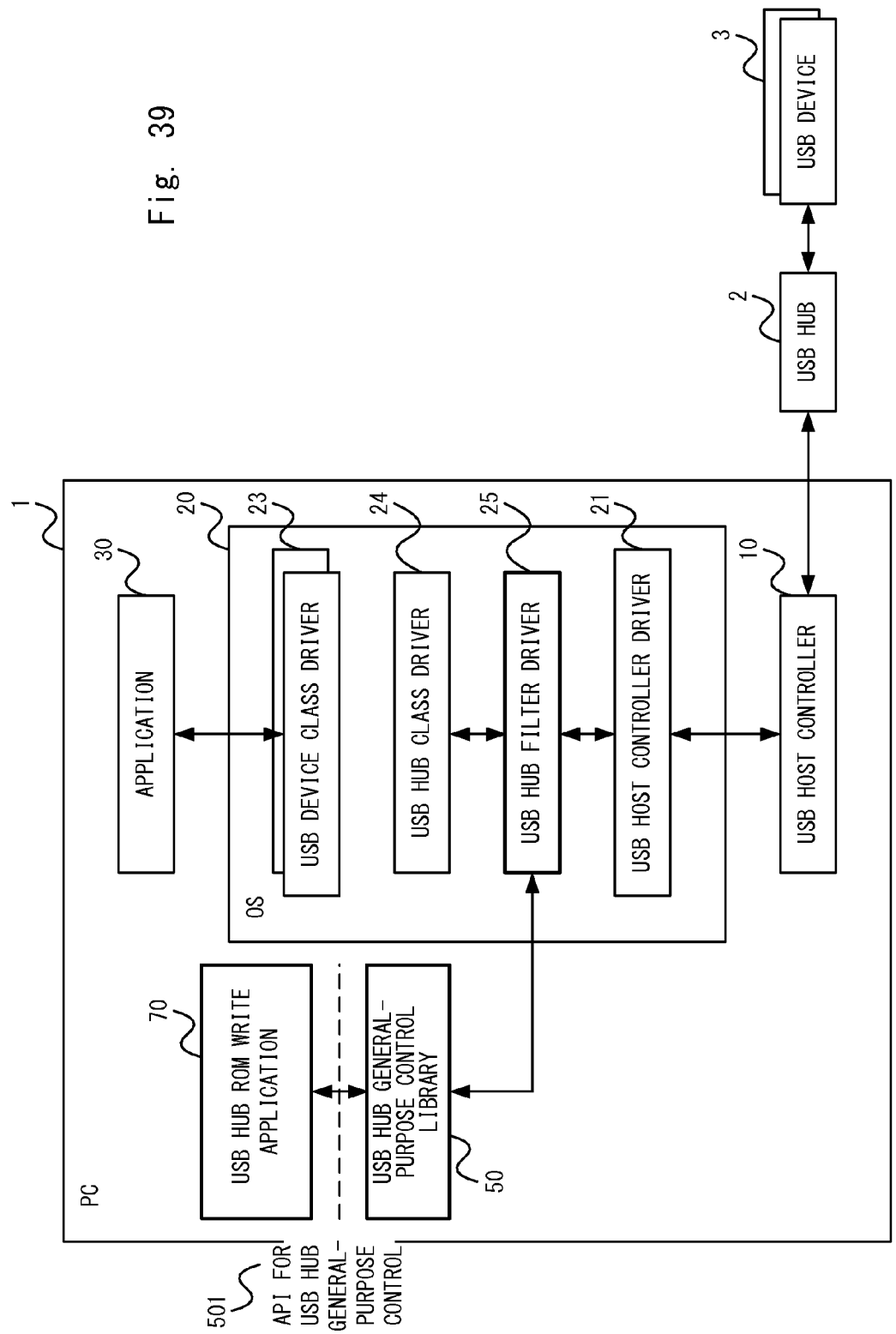
Figure 40:
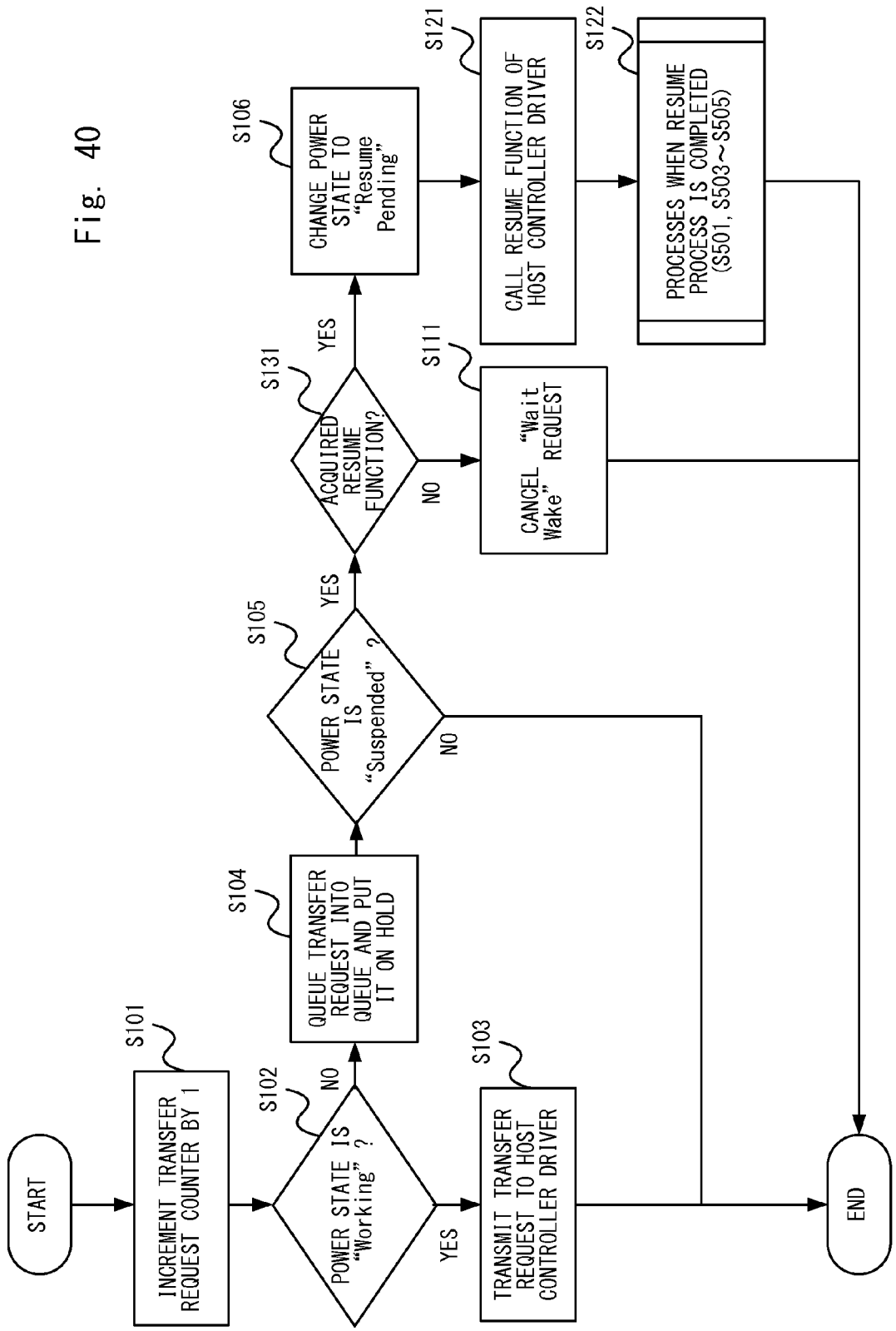

FIG. 1 is a configuration diagram of a personal computer according to a first comparative example;

FIG. 2 is a configuration diagram of a personal computer according to a second comparative example;

FIG. 3 is a configuration diagram of a personal computer according to a third comparative example;

FIG. 4 is a configuration diagram of a filter driver according to the third comparative example;

FIG. 5 is a sequence diagram showing a transfer process performed by the personal computer according to the third comparative example;

FIG. 6 is a drawing showing Selective Suspend;

FIG. 7 is a sequence diagram showing a Selective Suspend process according to the third comparative example;

FIG. 8 is a sequence diagram showing a resume process according to the third comparative example;

FIG. 9 is a sequence diagram showing a problem with the personal computer according to the third comparative example;

FIG. 10 is a sequence diagram showing a problem with the personal computer according to the third comparative example;

FIG. 11 is a function block diagram of a filter driver according to a first embodiment;

FIG. 12 is a function block configuration diagram of a power state management function according to the first embodiment;

FIG. 13 is a function block configuration diagram of a transfer state management function according to the first embodiment;

FIG. 14 is a flowchart showing a process that the filter driver according to the first embodiment performs when receiving a transfer request;

FIG. 15 is a flowchart showing a process that the filter driver according to the first embodiment performs when receiving a Set Power (D2) request;

FIG. 16 is a flowchart showing a process that the filter driver according to the first embodiment performs when receiving a transfer request result from a USB hub control application;

FIG. 17 is a flowchart showing a process that the filter driver according to the first embodiment performs when receiving the result of a Set Power (D2) request;

FIG. 18 is a flowchart showing a process that the filter driver according to the first embodiment performs when receiving the result of a Set Power (D0) request;

FIG. 19 is a sequence diagram of a process performed by the personal computer according to the first embodiment;

FIG. 20 is a sequence diagram of a process performed by the personal computer according to the first embodiment;

FIG. 21 is a function block configuration diagram of a power state management function according to a second embodiment;

FIG. 22 is a flowchart showing a process that a filter driver according to the second embodiment performs when receiving a Wait Wake request;

FIG. 23 is a flowchart showing a process that the filter driver according to the second embodiment performs when receiving a transfer request;

FIG. 24 is a flowchart showing a process that a filter driver according to the second embodiment performs when receiving the result of a Wait Wake request;

FIG. 25 is a flowchart showing a process that the filter driver according to the second embodiment performs when receiving the result of a Set Power (D2) request;

FIG. 26 is a flowchart showing a process that the filter driver according to the second embodiment performs when receiving the result of a transfer request;

FIG. 27 is a flowchart showing a process that the filter driver according to the second embodiment performs when receiving the result of a Set Power (D0) request;

FIG. 28 is a sequence diagram showing a process performed by a personal computer according to the second embodiment;

FIG. 29 is a sequence diagram showing a process performed by the personal computer according to the second embodiment;

FIG. 30 is a sequence diagram showing a process performed by a personal computer according to a modification of the second embodiment;

FIG. 31 is a sequence diagram showing a problem with the personal computer according to the comparative example;

FIG. 32 is a function block diagram of a filter driver according to a third embodiment;

FIG. 33 is a function block diagram of a suspend control interface relay function according to the third embodiment;

FIG. 34 is a flowchart showing a process that the filter driver according to the third embodiment performs when receiving a transfer request;

FIG. 35 is a flowchart showing a process that the filter driver according to the third embodiment performs when calling a suspend function;

FIG. 36 is a sequence diagram showing a process performed by the personal computer according to the third embodiment;

FIG. 37 is a sequence diagram showing a process performed by the personal computer according to the third embodiment;

FIG. 38 is a configuration diagram of a personal computer according to a fourth embodiment;

FIG. 39 is a configuration diagram of a personal computer according to a fifth embodiment;

FIG. 40 is a flowchart showing a process that a filter driver according to a sixth embodiment performs when receiving the result of a transfer request; and FIG. 41 is a configuration diagram of an information processing device according to one embodiment.

DETAILED DESCRIPTION

Now, preferred embodiments of the present invention will be described with reference to the accompanying drawings. Specific numbers and the like described in the embodiments below are only examples for facilitating the understanding of the present invention and are not limiting unless otherwise specified. Further, matters and the like obvious for those skilled in the art in the following description and accompanying drawings are omitted or simplified as appropriate to clarify the description.

COMPARATIVE EXAMPLES

Configuration of Personal Computer According to First Comparative Example

First, referring to FIG. 1, there will be described the configuration of a personal computer 1 according to a first comparative example. As shown in FIG. 1, the personal computer (PC) 1 includes a USB host controller 10, an operating system (OS) 20, and an application program (or simply referred to as application) 30.

USB devices, a USB hub 2 and multiple USB devices 3, are connected to the PC 1. While the PC 1 is connected to the USB devices 3 through the USB hub 2 in the example shown in FIG. 1, the PC 1 may be connected to the USB devices 3 directly, that is, not through the USB hub 2. The PC 1 transmits and receives various types of data to and from the USB devices 3 through the USB hub 2. The PC 1 may transmit and receive various types of data to and from not the USB devices 3 but the USB hub 2.

The USB hub 2 relays data between the PC 1 and USB devices 3. One USB device 3 may be connected to the USB hub 2 or multiple USB devices 3 may be connected to the USB hub 2.

Examples of the USB devices 3 include a human interface device, a document-related device, a video device, an audio device, an external storage device, and a communication device. Examples of the human interface device include a keyboard, a mouse, and a liquid crystal display. Examples of the document-related device include a printer and a multi-function printer. Examples of the video device include a digital camera and a webcam. Examples of the audio device include a speaker and a headphone. Examples of the external storage device include a USB memory, a hard disk drive, an optical drive, and a Floppy® disk drive. Examples of the communication device include a modem and a Bluetooth® adapter.

The USB host controller 10 is a semiconductor chip that controls the USB hub 2 and USB devices 3 in accordance with requests from the OS 20. The USB host controller 10 transmits and receives various types of data to and from the USB hub 2 and USB devices 3 under the control of the OS 20.

The OS 20 schedules and executes multiple applications. The multiple applications include the application 30. The OS 20 includes a USB host controller driver 21, a USB hub class driver 22, and multiple USB device class drivers 23. By using the drivers 21 to 23, the OS 20 provides a function of controlling the USB devices 2 and 3 to the higher-level program, the application 30.

The USB host controller driver 21 controls the USB host controller 10 in accordance with a request from the USB hub class driver 22. To control the USB devices 2 and 3, the USB host controller driver 21 requests the USB host controller 10 to control the USB devices 2 and 3. That is, the USB host controller driver 21 is a program below the USB hub class driver 22.

The USB hub class driver 22 controls the USB hub 2, as well as controls the USB devices 3 in accordance with requests from the USB device class drivers 23. To control the USB devices 2 and 3, the USB hub class driver 22 requests the USB host controller driver 21 to control the USB devices 2 and 3. That is, the USB hub class driver 22 is a program below the USB device class drivers 23.

The USB hub class driver 22 also has a function of accommodating the differences among the USB device class drivers 23. Accordingly, even when the different types of USB device class drivers 23 issue requests to control the USB devices 3, the USB hub class driver 22 can issue, to the USB host controller driver 21, control requests according to a unified interface.

The USB device class drivers 23 control the USB devices 3 in accordance with requests from the application 30. To control the USB devices 3, the USB device class drivers 23 issues requests to control the USB devices 3 to the USB hub class driver 22. That is, the USB device class drivers 23 are programs below the application 30, which is running on the OS 20.

The application 30 is a program (software) that performs any processes. The processes performed by the application 30 include a process of controlling the USB devices 3. The application 30 controls the USB devices 3 using the USB device class drivers 23. Specifically, to control the USB devices 3, the application 30 issues requests to control the USB devices 3 to the USB device class drivers 23.

The respective USB device class drivers 23 are prepared for the respective types of the USB devices 3. The types of the USB devices 3 are also called device classes and are defined in the USB standard. Each USB device class driver 23 provides an interface for controlling a corresponding type of USB device 3 to the application 30, which is running on the OS 20. Accordingly, the application 30 controls a USB device 3 by using a USB device class driver 23 corresponding to the type of the USB device 3.

As seen above, the OS 20 includes the drivers 21 to 23 for implementing the functions defined in the USB standard in regard to the USB devices 2 and 3. Thus, simply connecting the USB devices 2 and 3 to the PC1 allows them to be controlled. However, additional functions, which differ from the functions defined in the USB standard, cannot be implemented by only the drivers 21 to 23, which are included in the OS 20 as standard. The same also applies to functions that have been newly added to the USB standard but which are not supported by the drivers 21 to 23, which are included in the OS 20 as standard. There are two conceivable methods for implementing these functions.

Configuration of Personal Computer According to Second Comparative Example

Referring to FIG. 2, the configuration of a PC 1 according to a first method will be described. Any description similar to that described with reference to FIG. 1 will be omitted as appropriate. Compared to the PC 1 shown in FIG. 1, a PC 1 shown in FIG. 2 includes a unique USB hub driver 24 in place of the USB hub class driver 22. Also, compared to the PC 1 shown in FIG. 1, the PC 1 shown in FIG. 2 further includes a USB hub control application 40.

The USB hub control application 40 is a program (software) that performs any processes. The processes performed by the USB hub control application 40 include a process of controlling a USB hub 2. Note that, the processes performed by the USB hub control application 40, unlike the application 30, includes a process of controlling the USB hub 2 for the additional functions as described above. When the USB hub control application 40 controls the USB hub 2 for the additional functions, the USB hub control application 40 directly uses the unique USB hub driver 24 to control the USB hub 2.

Compared to the USB hub class driver 22, the unique USB hub driver 24 further provides the USB hub control application 40, which sits thereabove, with a function of controlling the USB hub 2 for the additional functions. Thus, the unique USB hub driver 24 can also request a USB host controller driver 21 to control the USB hub 2 for the additional functions.

According to this configuration, the USB hub control application 40 can control the USB hub 2 for the additional functions by directly using unique USB hub driver 24.

Configuration of Personal Computer According to Third Comparative Example

Next, referring to FIG. 3, the configuration of a PC 1 according to a second method will be described. Any description similar to that described with reference to FIGS. 1 and 2 will be omitted as appropriate. Compared to the PC 1 shown in FIG. 1, the PC 1 shown in FIG. 3 further includes a USB hub control application 40 and a USB hub filter driver 25. The USB hub filter driver 25 is additionally inserted between a USB host controller driver 21 and a USB hub class driver 22. That is, the PC 1 shown in FIG. 3 additionally includes the USB hub filter driver 25 as a filter driver.

The USB hub control application 40 shown in FIG. 3 differs from that shown in FIG. 2 in that it uses not the unique USB hub driver 24 but the USB hub filter driver 25. Specifically, when the USB hub control application 40 shown in FIG. 3 controls the USB hub 2 based on the additional functions, the USB hub control application 40 controls the USB hub 2 by directly using the USB hub filter driver 25 without using the USB hub class driver 22.

Further, the USB hub class driver 22 shown in FIG. 3 differs from that shown in FIG. 1 in that it requests, not directly but through the USB hub filter driver 25, the USB host controller driver 21 to control the USB devices 2 and 3.

The USB hub filter driver 25 controls the USB device 2 and 3 in accordance with requests from the USB hub class driver 22. To control the USB device 2 and 3, the USB hub filter driver 25 requests the USB host controller driver 21 to control the USB device 2 and 3. As seen above, the USB hub filter driver 25 is a program below the USB hub class driver 22.

The USB hub filter driver 25 also has a function of controlling the USB hub 2 to provide the additional functions on the basis of the USB hub control application 40. That is, the USB hub filter driver 25 can also request the USB host controller driver 21 to control the USB hub 2 for the additional functions.

As seen above, the USB host controller driver 21 shown in FIG. 3 differs from that shown in FIG. 1 in that it controls the USB host controller 10 in accordance with not a direct request from the USB hub class driver 22 but a request from the USB hub filter driver 25.

According to this configuration, the USB hub control application 40 can control the USB hub 2 for the additional functions using the USB hub filter driver 25.

Configuration of Filter Driver According to Third Comparative Example

Next, referring to FIG. 4, the function block configuration of the USB hub filter driver 25 will be described. As shown in FIG. 4, the USB hub filter driver 25 includes a hub class transfer request relay function 251, a power management request relay function 252, and an application transfer request relay function 253.

In the types of requests to control the USB hub 2, there are a transfer request requesting the transfer of data to the USB hub 2, and a power management request requesting the change of the power state of the USB hub 2 or the like. Further, in the types of power management requests, there are a Wait Wake request, a Set Power (D2) request, and a Set Power (D0) request. A Set Power (D2) request is a request to make the transition of the USB hub 2 from its normal operating state to its low-power state (a request to suspend the USB hub 2). A Wait Wake request is a request to enable the Remote Wake of the USB hub 2. A Set Power (D0) request is a request to make the transition of the USB hub 2 from the low-power state to the normal operating state (a request to resume the USB hub 2). The low-power state is a state in which the USB hub 2 consumes less power than in the normal operating state and its operation is limited. Both of a transfer request and a power management request are information in a form which can be transmitted and received in the PC 1.

The hub class transfer request relay function 251 relays a transfer request between the USB hub class driver 22 and the USB host controller driver 21. The power management request relay function 252 relays a power management request between the USB hub class driver 22 and the USB host controller driver 21.

The hub class transfer request relay function 251 has a request receiving function 2511, a request transmission function 2512, a result receiving function 2513, and a result reporting function 2514.

The request receiving function 2511 receives a transfer request from the USB hub class driver 22. The request transmission function 2512 transmits the transfer request received by the request receiving function 2511 to the USB host controller driver 21. The result receiving function 2513 receives, from the USB host controller driver 21, a transfer result, which is information indicating the result of a process corresponding to the transfer request. The result reporting function 2514 reports the transfer result received by the result receiving function 2513 to the USB hub class driver 22.

The power management request relay function 252 has a request receiving function 2521, a request transmission function 2522, a result receiving function 2523, and a result reporting function 2524.

The request receiving function 2521 receives a power management request from the USB hub class driver 22. The request transmission function 2522 transmits the power management request received by the request receiving function 2521 to the USB host controller driver 21. The result receiving function 2523 receives, from the USB host controller driver 21, a power management result, which is information indicating the result of a process corresponding to the power management request. The result reporting function 2524 reports the power management result received by the result receiving function 2523 to the USB hub class driver 22.

In the requests issued from the USB hub control application 40 to the USB hub filter driver 25, there is a transfer request requesting the transfer of data to the USB hub 2. The application transfer request relay function 253 relays the transfer request between the USB hub control application 40 and the USB host controller driver 21.

The application transfer request relay function 253 includes a request receiving function 2531, a request transmission function 2532, a result receiving function 2533, and a result reporting function 2534.

The request receiving function 2531 receives a transfer request from the USB hub control application 40. The request transmission function 2532 transmits the transfer request received by the request receiving function 2531 to the USB host controller driver 21. The result receiving function 2533 receives, from the USB host controller driver 21, a transfer result indicating the result of a process corresponding to the transfer request. The result reporting function 2534 reports the transfer result received by the result receiving function 2533 to the USB hub control application 40.

Data Transfer Process by Personal Computer according to Third Comparative Example Next, referring to FIG. 5, a transfer process performed by the PC 1 according to the third comparative example will be described. In this comparative example, there will be described a process in which the USB hub filter driver 25 transfers data to the USB hub 2 in accordance with a request from the USB hub control application 40.

First, when the USB hub control application 40 transmits data to the USB hub 2, the USB hub control application 40 transmits, to the USB hub filter driver 25, a transfer request to transfer data to the USB hub 2 (S1). The request receiving function 2531 of the USB hub filter driver 25 receives the transfer request from the USB hub control application 40. The request transmission function 2532 thereof transmits the transfer request to the USB host controller driver 21 (S2). In accordance with the transfer request from the USB hub filter driver 25, the USB host controller driver 21 instructs the USB host controller 10 to start to transfer the data to the USB hub 2 (S3).

The USB host controller 10 starts to transfer the data to the USB hub 2 in accordance with the instruction from the USB host controller driver 21 (S4). More specifically, the transfer request includes the data to be transferred to the USB hub 2. The USB host controller driver 21 transmits the data to be transferred to the USB hub 2 to the USB host controller 10. The USB host controller 10 transmits the data from the USB host controller driver 21 to the USB host controller 10. In this way, the data requested to transfer by the USB hub control application 40 are transmitted to the USB hub 2.

This data includes, for example, information in which the USB hub control application 40 requests the USB hub 2 to perform a desired operation. Examples of such a request include a request to report the state of the USB hub 2 and a request to set the operation of the USB hub 2. For example, if the USB hub 2 is requested to report the states of the ports thereof, the USB hub 2 transmits information indicating the states of each of the ports to the USB host controller 10. The USB host controller 10 transfers the information received from the USB hub 2 to the USB hub control application 40 through the USB host controller driver 21 and USB hub filter driver 25.

Upon completion of the transfer of all the data to the USB hub 2, the USB host controller 10 reports the completion of the transfer to the USB host controller driver 21 using an interrupt (S5). In response to the interrupt from the USB host controller 10 indicating the completion of the transfer, the USB host controller driver 21 transmits a transfer result indicating the normal completion of the transfer request to the USB hub filter driver 25 (S6). The result receiving function 2533 of the USB hub filter driver 25 receives the transfer result from the USB host controller driver 21. The result reporting function 2534 thereof transmits the transfer result to the USB hub control application (S7).

Selective Suspend

Next, referring to FIG. 6, Selective Suspend of USB device will be described. USB device class drivers and USB hub class drivers have a function of putting the corresponding USB devices (USB hubs and USB devices) into the low-power states (suspended states) in accordance with the operating states of the USB devices even when the PC is running. This function is generally called "Selective Suspend."

For example, if the operation of any USB device 3 has not been detected by the corresponding the USB device class driver 23 over a predetermined period of time, the USB device class driver 23 puts the USB device 3 into the low-power state.

Further, if no USB device 3 is connected to any downstream port of the USB hub 2 or if any USB device 3 or another USB hub 2 is connected to any downstream port of the USB hub 2 but the USB device is in the low-power state, the USB hub class driver 22 puts the USB hub 2 into the low-power state. When the USB device 3 or USB hub 2 is put into the low-power state, the communication link between the USB device 3 or USB hub 2 and the USB hub 2 or USB host controller 10 located on the upstream side thereof is disabled. The transfer of the data to the low-power-state USB device 3 or USB hub 2 is interrupted.

FIG. 6 shows an example in which two USB hubs, 2a and 2b, and two USB devices, 3a and 3b are connected to the PC 1. The USB hub 2a has one upstream port and four downstream ports, 2001a to 2004a. The USB hub 2b has one upstream port and four downstream ports, 2001b to 2004b. The USB host controller 10 of the PC 1 is connected to the upstream port of the USB hub 2a. For the USB hub 2a, the downstream port 2001a is connected to the upstream port of the USB hub 2b; the downstream ports 2002a and 2003a are unconnected; and the downstream port 2004a is connected to the USB device 3a. For the USB hub 2b, the downstream ports 2001b, 2002b, and 2004b are unconnected, and the downstream port 2003b is connected to the USB device 3b.

The USB device 3b connected to the downstream port 2003b is in the low-power state. Accordingly, the USB hub 2b is also in the low-power state. For the USB hub 2a, although the USB hub 2b connected to the downstream port 2001a is in the low-power state and the downstream ports 2002a and 2003a are unconnected, the USB device 3a connected to the downstream port 2004a is in the normal operating state. Accordingly, the USB hub 2a remains in the normal operating state For the low-power-state USB hub 2b, if new USB devices 3 are connected to the unconnected downstream port 2001b, 2002b, and 2004b, or if the USB device 3b connected to the downstream port 2003b is disconnected, or if the USB hub 2b receives information requesting the restoration to the normal operating state (Remote Wake) from the low-power state USB device 3b connected to the downstream port 2003b, the USB hub 2b reports Remote Wake to the USB host controller 10 through the upstream USB hub 2a in order to restore itself to the normal operating state. For example, assuming that the USB device 3b is a mouse, when the user performs an operation on the mouse, the USB hub 2b reports Remote Wake to the USB host controller 10. As seen above, Remote Wake is issued when a predetermined operation is performed on the USB device 2 or 3.

Selective Suspend Process by Personal Computer according to Third Comparative Example Next, referring to FIG. 7, a Selective Suspend process performed by the PC 1 according to the third comparative example will be described. Specifically, there will be described a process in which the USB hub class driver 22 puts the USB hub 2 into the low-power state.

Before putting the USB hub 2 into the low-power state, the USB hub class driver 22 transmits a Wait Wake request to the USB hub filter driver 25 in order to enable the Remote Wake function of the USB hub 2 (S11). The request receiving function 2521 of the USB hub filter driver 25 receives the Wait Wake request from the USB hub class driver 22. The request transmission function 2522 thereof transmits the Wait Wake request to the USB host controller driver 21 (S12).

The USB host controller driver 21 does not immediately complete the Wait Wake request but rather puts it on hold (S13). The USB host controller driver 21 also transmits a Set Feature (DEVICE_REMOTE_WAKEUP) request to the USB hub 2 through the USB host controller 10 (S14). A Set Feature (DEVICE_REMOTE_WAKEUP) request is information requesting the USB hub 2 to enable the Remote Wake reporting function. The USB hub 2 enables the Remote Wake reporting function in accordance with the Set Feature (DEVICE_REMOTE_WAKEUP) request from the USB host controller driver (S15).

Subsequently, the USB hub class driver 22 transmits a Set Power (D2) request to the USB hub filter driver 25 (S16). The request receiving function 2521 of the USB hub filter driver 25 receives the Set Power (D2) request from the USB hub class driver 22. The request transmission function 2522 thereof transmits the Set Power (D2) request to the USB host controller driver 21 (S17). In accordance with the Set Power (D2) request from the USB hub filter driver 25, the USB host controller driver 21 instructs the USB host controller 10 to suspend the port having the USB hub 2 connected thereto (S18). The USB host controller 10 puts the port having the USB hub 2 connected thereto into the low-power state in accordance with the instruction from the USB host controller driver 21 (S19).

When the port suspending process is completed, the USB host controller driver 21 transmits a power management result indicating the normal completion of the Set Power (D2) request to the USB hub filter driver 25 (S20). The result receiving function 2523 of the USB hub filter driver 25 receives the power management result from the USB host controller driver 21. The result reporting function 2524 thereof transmits the power management result to the USB hub class driver 22 (S21).

Resume Process by Personal Computer According to Third Comparative Example

Next, referring to FIG. 8, a resume process performed by the PC 1 according to the third comparative example will be described. Specifically, there will be described a process in which when, after the process described with reference to FIG. 7, any USB device 3 is connected to any downstream port of the selectively suspended USB hub 2, the PC 1 receives Remote Wake from the USB hub 2 and restores the USB hub 2 to the normal operating state.

When the USB hub 2 detects that the USB device 3 has been connected thereto (S31), the USB hub 2 transmits Remote Wake to the USB host controller 10 (S32). In accordance with Remote Wake from the USB hub 2, the USB host controller 10 reports Remote Wake to the USB host controller driver 21 using an interrupt (S33). Upon receipt of Remote Wake from the USB host controller 10, the USB host controller driver 21 transmits, to the USB hub filter driver 25, the power management result put on hold in step S13 and indicating the normal completion of the Wait Wake request (S34). The result receiving function 2523 of the USB hub filter driver 25 receives the power management result from the USB host controller driver 21. The result reporting function 2524 thereof transmits the power management result to the USB hub class driver 22 (S35).

In general, the transfer request and the power management request are called I/O request packets (IRPs). If the OS 20 supports I/O request packets, each driver can register, in the OS 20, a completion routine that the driver executes when receiving a report indicating the normal completion of a request in an I/O request packet. For this reason, the USB host controller driver 21 puts the Wait Wake request on hold as described above and, upon receipt of Remote Wake from the USB hub 2, reports the normal completion of the Wait Wake request to the USB hub class driver 22. Thus, the USB hub class driver 22 can execute a completion routine that it has registered in the OS 20 when issuing the Wait Wake request. In this case, the completion routine registered by the USB hub class driver 22 with respect to the Wait Wake request is a process of transmitting a Set Power (D0) request described below.

The USB hub class driver 22 transmits a Set Power (D0) request to the USB hub filter driver 25 in accordance with the power management result from the USB host controller driver 21 (S36). The request receiving function 2521 of the USB hub filter driver 25 receives the Set Power (D0) request from the USB hub class driver 22. The request transmission function 2522 thereof transmits the Set Power (D0) request to the USB host controller driver 21 (S37). In accordance with the Set Power (D0) request from the USB hub filter driver 25, the USB host controller driver 21 instructs the USB host controller 10 to resume the port having the USB hub 2 connected thereto (S38). The USB host controller 10 resumes the port and restores the USB hub 2 to the normal operating state in accordance with the instruction from the USB host controller driver 21 (S39).

After the port is resumed, the USB host controller driver 21 transmits, to the USB hub filter driver 25, a power management result indicating the normal completion of the Set Power (D0) request (S40). The result receiving function 2523 of the USB hub filter driver 25 receives the power management result from the USB host controller driver 21. The result reporting function 2524 thereof transmits the power management result to the USB hub class driver 22 (S41).

Subsequently, the USB hub class driver 22 accesses the USB hub 2 through the USB hub filter driver 25, USB host controller driver 21, and USB host controller 10 and then detects the USB device 3 connected to the downstream port of the USB hub 2 and starts to initialize it (S42). Specifically, when the USB hub class driver 22 detects that the USB device 3 is connected to the USB hub 2, it performs the acquisition of the configuration information of the USB device 3, the assignment of a device address, and the like.

Problem with Third Comparative Example

However, the USB hub filter driver 25 according to the third comparative example does not consider satisfying both the control of the power state of the USB hub 2 by the USB hub class driver 22 and the access to the USB hub 2 from the USB hub control application 40 through the USB hub filter driver 25. That is, in the USB hub filter driver 25 according to the third comparative example, the application transfer request relay function 253 works independently of the hub class transfer request relay function 251 and power management request relay function 252. For this reason, the USB hub class driver 22 and USB hub control application 40 independently issue the power management request and the transfer request data for the USB hub 2, respectively. As a result, these two processes may compete against each other. Hereafter, examples in which the two processes compete against each other will be described in detail.

First, referring to FIG. 9, a first example will be described. To simplify the description, processes similar to those described with reference to FIGS. 5 and 7 are given the same reference signs, and the description thereof is omitted as appropriate.

This example is a case in which, first, the USB hub class driver 22 puts the USB hub 2 to the low-power state (S16 to S21) and then the USB hub filter driver 25 starts to transfer data to the USB hub 2 in accordance with a transfer request from the USB hub control application 40 (S1 to S3). In this case, although the USB host controller driver 21 instructs the USB host controller 10 to start to transfer the data in step S3, the USB host controller 10 cannot transfer the data normally. This is because the USB hub 2 has already been put into the low-power state. For this reason, the USB host controller 10 reports the transfer error to the USB host controller driver 21 using an interrupt (S51). Upon receipt of the interrupt from the USB host controller 10 indicating the transfer error, the USB host controller driver 21 transmits a transfer result indicating the erroneous completion of the transfer request to the USB hub filter driver 25 (S52). The result receiving function 2533 of the USB hub filter driver 25 receives the transfer result from the USB host controller driver 21. The result reporting function 2534 thereof transmits the transfer result to the USB hub control application 40 (S53). In this way, the transfer request for the USB hub 2 from the USB hub control application 40 completes with an error.

Next, referring to FIG. 10, a second example will be described. To simplify the description, processes similar to those described with reference to FIGS. 5, 7, and 9 are given the same reference signs, and the description thereof is omitted as appropriate.

This example is a case in which, first, the USB hub filter driver 25 starts to transfer data to the USB hub 2 upon receipt of a transfer request from the USB hub control application 40 (S1 to S4) and then the USB hub class driver 22 puts the USB hub 2 into the low-power state before the transfer of the data is completed (S16 to S21). In this case, although the transfer of the data to the USB hub 2 has yet to be completed, the USB host controller driver 21 puts the port into the low-power state in accordance with a Set Power (D2) request received from the USB hub class driver 22. Thus, the USB host controller 10 is prevented from transferring the remaining data normally. Accordingly, the USB host controller 10 reports the transfer error to the USB host controller driver 21 (S51). As a result, the USB host controller driver 21 completes the transfer request from the USB hub filter driver 25 with an error (S52). The USB hub filter driver 25 also completes the transfer request from the USB hub control application 40 with an error (S53).

As seen above, the PC 1 according to the third comparative example has a problem that when the power management request from the USB hub class driver 22 and the transfer request from the USB hub control application 40 without passing through the USB hub class driver 22 compete against each other, the transfer request results in an error. More specifically, the problem is as follows: the USB hub class driver 22 recognizes the power state of the USB hub 2 in order to control the power state of the USB hub 2; the application 30 transmits a transfer request through the USB hub class driver 22; accordingly, when the USB hub 2 is put in the low-power state, the USB hub class driver 22 can block the transfer request; for example, the USB hub class driver 22 can perform control such as putting-on-hold of the transfer request from the application 30 until the power state of the USB hub 2 is restored to the normal operating state; on the other hand, a transfer request from the USB hub control application 40 is not transmitted through the USB hub class driver 22 but rather directly transmitted to the USB hub filter driver 25; and accordingly, even when the USB hub 2 is put in the low-power state, the transfer request from the USB hub control application 40 is not blocked, and the data is transferred to the USB hub 2, resulting in an error. Hereafter, an embodiment for solving this problem will be described.

First Embodiment

Configuration of Personal Computer According to First Embodiment

Next, a PC 1 according to a first embodiment will be described. Elements similar to those described thus far are given the same reference signs, and descriptions thereof are omitted as appropriate. The configuration of the PC 1 according to the first embodiment is similar to that of the PC 1 shown in FIG. 3 and will not be described.

The PC 1 includes a central processing unit (CPU) and a storage unit, and processes described below are performed by executing applications 30 and 40 and an OS 20 (drivers 21 to 23, 25) stored in the storage unit by the CPU. This also applies to programs performed by each PC 1 in later embodiments. The storage unit includes at least one storage device which can store the programs 20, 30, and 40. The storage device is, for example, a memory, hard disk, or the like.

Configuration of USB Hub Filter Driver According to First Embodiment

Referring to FIG. 11, there will be described the function block configuration of a USB hub filter driver 25 according to the first embodiment. Compared to the USB hub filter driver 25 shown in FIG. 4, the USB hub filter driver 25 according to the first embodiment further has a power state management function 254 and a transfer state management function 255. A power management request relay function 252, an application transfer request relay function 253, the power state management function 254, and the transfer state management function 255 work in conjunction with one another.

The power state management function 254 manages the power state of the USB hub 2 while monitoring a power state change request from the USB hub class driver 22. Specifically, the power state management function 254 relays a power management request transferred from the request receiving function 2521 to the request transmission function 2522 in the power management request relay function 252 and a power management result transferred from the result receiving function 2523 to the result reporting function 2524 the power management request relay function 252. The power state management function 254 recognizes the power state of the USB hub 2 on the basis of the power management request and the power management result, when the power state management function 254 relays the power management request and the power management result.

The transfer state management function 255 manages the processing state of a transfer request from the USB hub control application 40. The transfer state management function 255 relays a transfer request transferred from the request receiving function 2531 to the request transmission function 2522 in the application transfer request relay function 253 and a transfer result transferred from the result receiving function 2533 and the result reporting function 2534 in the application transfer request relay function 253. The transfer state management function 255 controls the transfer request and recognizes the execution state of the transfer request on the basis of the transfer request and the transfer result, when the transfer state management function 255 relays the transfer request from the USB hub control application 40 and the transfer result.

Next, referring to FIG. 12, there will be described the function block configuration of the power state management function 254 according to the first embodiment. The power state management function 254 manages the current power state 2541 of the USB hub 2 by recognizing the current power state as one of the following four states.

Working: the normal operating state
Suspend Pending: a state halfway to the low-power state (suspended state)
Suspended: the low-power state (suspended state)
Resume Pending: a state halfway back to the normal operating state The power state management function 254 has a resume request issuance function 2542 and a suspend request on-hold function 2543. When the transfer request is issued from the USB hub control application 40 for the low-power-state USB hub 2, the resume request issuance function 2542 puts the low-power-state USB hub 2 into the normal operating state (resumes the USB hub 2). When a Set Power (D2) request is issued from the USB hub class driver 22 while data is transferred to the USB hub 2, the suspend request on-hold function 2543 puts the Set Power (D2) on hold until the transfer is completed.

When the power state management function 254 receives a power management request (Set Power (D2) request) to make a transition of the USB hub 2 from the normal operating state to the low-power state from the USB hub class driver 22 and transmits the power management request to the USB host controller driver 21, the power state management function 254 changes the power state to "Suspend Pending". Subsequently, if the power state management function 254 receives, from the USB host controller driver 21, a power management result indicating the normal completion of the power management request (Set Power (D2) request), the power state management function 254 updates the power state to "Suspended". In contrast, if the suspension of the USB hub 2 fails and the power state management function 254 receives a power management result indicating the erroneous completion of the power management request (Set Power (D2) request) from the USB host controller driver 21, the power state management function 254 returns the power state to "Working".

When the power state management function 254 receives a power management request to restore the USB hub 2 to the normal operating state (Set Power (D0) request) from the USB hub class driver 22 and transmits the power management request to the USB host controller driver 21, the power state management function 254 changes the power state to "Resume Pending". Subsequently, when the power state management function 254 receives a power management result indicating the normal completion of the power management request (Set Power (D0) request) from the USB host controller driver 21, the power state management function 254 updates the power state to "Working". In contrast, when the resumption of the USB hub 2 fails and the power state management function 254 receives a power management result indicating the erroneous completion of the power management request (Set Power (D0) request) from the USB host controller driver 21, the power state management function 254 returns the power state to "Suspended".

If the power state is "Suspended" at the time point when the USB hub filter driver 25 receives a transfer request from the USB hub control application 40, the USB hub filter driver 25 resumes the USB hub 2 and, after the power state 2541 becomes "Working", starts to transfer data to the USB hub 2. If the power state 2541 is "Resume Pending" at the time point when the USB hub filter driver 25 receives a transfer request from the USB hub control application 40, the USB hub filter driver 25 does nothing at that time point, since the resume process has already started. Subsequently, when the power state 2541 becomes "Working", the USB hub filter driver 25 starts to transfer data the USB hub 2. If the power state is "Suspend Pending" at the time point when the USB hub filter driver 25 receives a transfer request from the USB hub control application 40, the USB hub filter driver 25 does nothing at that time point, since the suspended process is being executed. Subsequently, when the power state becomes "Suspended", the USB hub filter driver 25 resumes the USB hub 2 again. After the power state becomes "Working", the USB hub filter driver 25 starts to transfer data to the USB hub 2.

Next, referring to FIG. 13, there will be described the function block configuration of the transfer state management function 255 according to the first embodiment. As shown in FIG. 13, the transfer state management function 255 has a transfer request counter 2551, a transfer request counter update function 2552, a transfer request queue 2553, a transfer request on-hold function 2554, and an on-hold transfer execution function 2555.

The transfer request counter 2551 indicates the number of transfer requests which have been issued by the USB hub control application 40 and which are being processed but are yet to be completed. The storage unit of the PC 1 is used as the transfer request counter 2551. The transfer request counter update function 2552 updates the transfer request counter 2551. More specifically, when the request receiving function 2531 receives a transfer request, the transfer request counter update function 2552 is called and increments the transfer request counter 2551 by 1. Further, when the result receiving function 2533 receives a transfer result, the transfer request counter update function 2552 is called and decrements the transfer request counter 2551 by 1. Accordingly, when the transfer request counter 2551 is 0, it means that there is no transfer request which has been issued by the USB hub control application 40 and is being processed; when the transfer request counter 2551 indicates a value other than 0, it means that there is/are transfer request(s) which has/have been issued by the USB hub control application 40 and is/are being processed.

The transfer request queue 2553 stores transfer requests to be put on hold. More specifically, the storage unit of the PC 1 is used as the transfer request queue 2553 and stores the pointers of transfer requests issued by the USB hub control application 40. If the USB hub 2 is put in a state in which the transfer of data cannot be started immediately, such as the low-power state, the transfer request on-hold function 2554 queues a transfer request from the USB hub control application 40 into the transfer request queue 2553 to put it on hold. If the USB hub 2 is put into the normal operating state and thus the transfer request is allowed to be processed, the on-hold transfer execution function 2555 retrieves the transfer request on hold from the transfer request queue 2553 and transmits it.

Processes by USB Hub Filter Driver According to First Embodiment

Next, referring to FIGS. 14 to 18, there will be described processes performed by the USB hub filter driver 25 according to the first embodiment. First, referring to FIG. 14, there will be described a process that the USB hub filter driver 25 performs when receiving a transfer request from the USB hub control application 40.

When the request receiving function 2531 receives a transfer request from the USB hub control application 40, the transfer request counter update function 2552 increments the transfer request counter 2551 by 1 (S101). The transfer state management function 255 acquires the current power state 2541 from the power state management function 254 and determines whether the power state is "Working" (S102). If the current power state 2541 is "Working" (S102: Yes), the transfer state management function 255 transmits the transfer request to the USB host controller driver 21 through the request transmission function 2532 (S103). If the current power state 2541 is a state other than "Working" (S102: No), the transfer state management function 255 queues the transfer request into the transfer request queue 2553 through the transfer request on-hold function 2554 to put it on hold (S104).

The transfer state management function 255 then determines whether the current power state 2541 acquired from the power state management function 254 is "Suspended" (S105). If the current power state 2541 is "Suspended" (S105: Yes), the power state management function 254 changes the current power state 2541 to "Resume Pending". Subsequently, the resume request issuance function 2542 transmits a power management request to restore the USB hub 2 to the normal operating state (Set Power (D0) request), to the USB host controller driver 21 through the request transmission function 2522 (S107). If the current power state 2541 is a state other than "Suspended" (S105: No), the current power state 2541 is not changed, nor is the above power management request transmitted.

Next, referring to FIG. 15, there will be described a process that the USB hub filter driver 25 performs when receiving a power management request to put the USB hub 2 into the low-power state (Set Power (D2) request) from the USB hub class driver 22.

When the request receiving function 2521 receives a power management request (Set Power (D2) request) from the USB hub class driver 22, the power state management function 254 acquires the current transfer request counter 2551 from the transfer state management function 255 and determines whether the value is 0 (S201). If the transfer request counter 2551 is 0 (S201: Yes), the power state management function 254 changes the current power state 2541 to "Suspend Pending" (S202). The power state management function 254 then transmits the Set Power (D2) request to the USB host controller driver 21 through the request transmission function 2522 (S203). In contrast, if the transfer request counter 2551 is a value other than 0 (S201: No), the power state management function 254 puts the Set Power (D2) request on hold through the suspend request on-hold function 2543 (S204). This is because there is/are transfer request(s) which has/have been issued by the USB hub control application 40 and is/are being processed.

Next, referring to FIG. 16, there will be described a process that the USB hub filter driver 25 performs when receiving, from the USB host controller driver 21, a transfer result indicating the normal completion of a transfer request from the USB hub control application 40.

When the result receiving function 2533 receives the transfer result from the USB host controller driver 21, the transfer request counter update function 2552 decrements the transfer request counter 2551 by 1 (S301). The result reporting function 2534 transmits, to the USB hub control application 40, a transfer result indicating that the transfer request is completed (S302). Subsequently, the power state management function 254 determines whether there is any power management request to put the USB hub 2 to the low-power state (Set Power (D2) request) which is put on hold by the suspend request on-hold function 2543 (S303). If it is determined in step S204 that there is a power management request (Set Power (D2) request) on hold, the power state management function 254 acquires the value of the transfer request counter 2551 from the transfer state management function 255 and determines whether the value is 0 (S304). If the transfer request counter 2551 is 0 (S304: Yes), it means that all transfer requests issued by the USB hub control application 40 are completed, and therefore processes similar to steps S202 and S203 are performed (S305, S306). Thus, the USB hub 2 is put into the low-power state.

Next, referring to FIG. 17, there will be described a process that the USB hub filter driver 25 performs when receiving, from the USB host controller driver 21, a power management result indicating the normal completion of a Set Power (D2) request.

When the result receiving function 2523 receives the power management result from the USB host controller driver 21, the power state management function 254 changes the current power state 2541 to "Suspended" (S401). The power state management function 254 then determines whether there is/are any transfer request(s) which is/are put on hold in the transfer request queue 2553 through the transfer state management function 255 (S402). If there is/are transfer request(s) on hold (S402: Yes), the current power state is changed to "Resume Pending" (S403). Subsequently, the resume request issuance function 2542 transmits a power management request to restore the USB hub 2 to the normal operating state (Set Power (D0) request), to the USB host controller driver 21 through the request transmission function 2522 (S404).

Next, referring to FIG. 18, there will be described a process that the USB hub filter driver 25 performs when receiving, from the USB host controller driver 21, a power management result indicating the normal completion of a Set Power (D0) request.

When the result receiving function 2523 receives a power management result with respect to a Set Power (D0) request from the USB host controller driver 21, the power state management function 254 changes the current power state 2541 to "Working" (S501). The transfer state management function 255 determines whether there is/are any transfer request(s) which is/are put on hold in the transfer request queue 2553 (S503). If there is/are such transfer request(s), the transfer state management function 255 repeats the following processes (1) and (2) using the on-hold transfer execution function 2555 until there is no longer any transfer request on hold in the transfer request queue 2553 (S503).
(1) A process of retrieving a transfer request on hold from the transfer request queue 2553 (S504)
(2) A process of transmitting the retrieved transfer request to the USB host controller driver 21 through the request transmission function 2532 (S505)

Processed by Personal Computer According to First Embodiment

Next, referring to FIG. 19, there will be described a process performed when the USB hub filter driver 25 receives a transfer request from the USB hub control application 40 with the USB hub 2 put in the low-power state based on Selective Suspend.

When the USB hub filter driver 25 receives a Set Power (D2) request from the USB hub class driver 22 (S16), the USB hub filter driver 25 changes the current power state 2541 to "Suspend Pending" (S202) and then transmits the Set Power (D2) request to the USB host controller driver 21 (S203, S17). Thus, the USB hub 2 is put into the low-power state (S18, S19).

When the USB hub filter driver 25 receives, from the USB host controller driver 21, a power management result indicating the normal completion of the Set Power (D2) request (S20), the USB hub filter driver 25 changes the current power state 2541 of the USB hub 2 to "Suspended" and memorizes that the USB hub 2 is put in the low-power state (S401). The USB hub filter driver 25 then transmits the power management result indicating the normal completion of the Set Power (D2) request, to the USB hub class driver (S21).

Subsequently, when the USB hub filter driver 25 receives a request to transfer data to the USB hub 2 from the USB hub control application 40 (S1), the USB hub filter driver 25 increments the transfer request counter 2551 (S101). Since the current power state 2541 is "Suspended" (that is, the USB hub 2 is put in the low-power state), the USB hub filter driver 25 does not immediately transmit the transfer request to the USB host controller driver 21 but rather performs the following processes. Thus, processes similar to steps S37 to S39 are performed, and the USB hub 2 is restored to the normal operating state.
(1) A process of queuing the transfer request into the transfer request queue 2553 to put it on hold (S104)
(2) A process of changing the current power state 2541 to "Resume Pending" (S106)
(3) A process of transmitting the Set Power (D0) request to the USB host controller driver 21 (S107)

When the USB hub filter driver 25 receives a power management result indicating the normal completion of the Set Power (D0) request from the USB host controller driver 21 (S40), the USB hub filter driver 25 changes the current power state 2541 to "Working" (S501) and transmits the power management result indicating the normal completion of the Set Power (D0) request to the USB hub class driver 22 (S41). The USB hub filter driver 25 then retrieves the transfer request put on hold in the transfer request queue 2553 (S503) and transmits it to the USB host controller driver 21 (S2). Thus, the transfer of the data to the USB hub 2 is started (S3 to S4). Since the USB hub 2 has been already restored to the normal operating state, the transfer of the data to the USB hub 2 is completed normally (S5 to S7).

Next, referring to FIG. 20, there will be described a process performed when the USB hub class driver 22 attempts to selectively suspend the USB hub 2 with data being transferred to the USB hub 2.

When data is being transferred to the USB hub 2 in accordance with a transfer request (S1 to S4), if the USB hub filter driver 25 receives a Set Power (D2) request from the USB hub class driver (S16), the USB hub filter driver 25 temporarily puts the Set Power (D2) request on hold since the current transfer request counter 2551 is a value other than 0 (that is, the transfer request for the USB hub 2 has yet to be completed) (S204).

Subsequently, when the USB hub filter driver 25 receives, from the USB host controller driver 21, a transfer result indicating the normal completion of the request to transfer the data to the USB hub 2 (S5, S6), the USB hub filter driver 25 decrements the transfer request counter 2551 (S301) and then transmits the transfer result to the USB hub control application 40 (S7). Further, since the transfer request counter 2551 is 0, the USB hub filter driver 25 changes the current power state 2541 to "Suspend Pending" (S305) and then transmits the Set Power (D2) request on hold to the USB host controller driver 21 (S306). Thus, a process of suspending the USB hub 2 is started (S17 to S19). When the USB hub filter driver 25 receives a power management result indicating the normal completion of the Set Power (D2) request from the USB host controller driver 21 (S20), the USB hub filter driver 25 changes the current power state 2541 to "Suspended" (S401) and then transmits the power management result to the USB hub class driver 22 (S21).

In this case, the USB hub filter driver 25 may delay the processing of the Set Power (D2) request on hold by a predetermined period of time after receiving the transfer result indicating the completion of the transfer request from the USB host controller driver 21. If the USB hub filter driver 25 receives a new request to transfer data to the USB hub 2 from the USB hub control application 40 during the predetermined period of time, the USB hub filter driver 25 may put the processing of the Set Power (D2) request on hold again and transmit the transfer request to the USB host controller driver 21 to first process the new transfer request. Thus, if the USB hub control application 40 often issues transfer requests, it is possible to avoid unnecessary suspend and resume processes and thus to reduce the time required until the transfer is completed.

As seen above, the USB hub filter driver 25 according to the first embodiment includes the power state management function 254, when relays a power state management request for the USB hub 2 issued to the USB host controller driver 21 by the USB hub class driver 22 (that is, a Set Power (D2) request or Set Power (D0) request), updates the power state of the USB hub 2 on the basis of the power state management request and thus manages the power state 2541 of the USB hub 2. Specifically, when a Set Power (D2) request is completed normally, the power state management function 254 memorizes that the USB hub 2 has been put into the low-power state (Suspended); when a Set Power (D0) request is completed normally, the power state management function 254 memorizes that the USB hub 2 has been restored to the normal operating state (Working).

Further, the USB hub filter driver 25 according to the first embodiment includes the transfer state management function 255, when receives a transfer request for the low-power-state USB hub 2 from the USB hub control application 40, puts the transfer request on hold and manages information on a transfer request being processed.

More specifically, when the transfer state management function 255 receives a transfer request for the USB hub 2 from the USB hub control application 40, the transfer state management function 255 checks the current power state 2541 of the USB hub 2; if the current power state 2541 is the low-power state (Suspended), the transfer state management function 255 puts the transfer request on hold; the power state management function 254 issues a Set Power (D0) request to the USB host controller driver 21 in order to restore the USB hub 2 to the normal operating state; and after the Set Power (D0) request is completed normally and thus the USB hub 2 is restored to the normal operating state (Working), the transfer state management function 255 starts to transfer the data to the USB hub 2.

Further, when the power state management function 254 receives a Set Power (D2) request from the USB hub class driver 22, the power state management function 254 checks whether there is/are any transfer request (s) from the USB hub control application 40 which is/are being processed. If there is/are transfer request(s) being processed, the power state management function 254 puts the Set Power (D2) request on hold. After the processing of all the transfer request(s) is completed, the power state management function 254 transmits the Set Power (D2) request to the USB host controller driver 21 and starts to suspend process for the USB hub 2.

Thus, it is possible to solve the problem that the transfer of data to the low-power state USB hub 2 results in an error. That is, it is possible to satisfy both of the transfer of data to the USB hub 2 requested by the USB hub control application 40 and the Selective Suspend control of the USB hub 2 requested by the USB hub class driver 22. More specifically, even when the USB hub 2 is put in the low-power state at the time point when the USB hub filter driver 25 receives a transfer request from the USB hub control application 40 or even when the USB hub filter driver 25 receives a power management request to put the USB hub 2 into the low-power state from the USB hub class driver 22 while a transfer request from the USB hub control application 40 is being processed, the transfer of the data to the USB hub 2 can be normally completed.

Second Embodiment

Configuration of Personal Computer According to Second Embodiment

Next, a PC 1 according to a second embodiment will be described. Elements similar to those described thus far are given the same reference signs, and descriptions thereof are omitted as appropriate. The configuration of the PC 1 according to the second embodiment is similar to that of the PC 1 according to the first embodiment and therefore will not be described.

Configuration of USB Hub Filter Driver According to Second Embodiment

The function block configuration of a USB hub filter driver 25 according to the second embodiment is similar to that of the USB hub filter driver 25 shown in FIG. 11 and therefore will not be described. Also, the function block configuration of a transfer state management function 255 according to the second embodiment is similar to that of the transfer state management function 255 shown in FIG. 13 and therefore will not be described.

Referring now to FIG. 21, there will be described the function block configuration of a power state management function 254 according to the second embodiment. As shown in FIG. 21, compared to the power state management function 254 shown in FIG. 12, the power state management function 254 according to the second embodiment has a pseudo-Remote Wake generation function 2544 and a suspend request change function 2545 in place of the resume request issuance function 2542 and suspend request on-hold function 2543.

The pseudo-Remote Wake generation function 2544 generates a situation in which Remote Wake has been reported from the USB hub 2 in a pseudo-manner in order to restore the USB hub 2 to the normal operating state. When the suspend request change function 2545 receives a power management request to put the USB hub 2 into the low-power state (Set Power (D2) request) from the USB hub class driver 22 while data is transferred to the USB hub 2, the suspend request change function 2545 makes a change to the content of the power management request to prevent a suspend process from being performed and transmits the resulting power management request to the USB host controller driver 21.

Next, referring to FIG. 22, there will be described a process that the USB hub filter driver 25 performs when receiving a power management request to enable Remote Wake (Wait Wake request) from the USB hub class driver 22.

When the request receiving function 2521 receives a power management request (Wait Wake request) from the USB hub class driver 22, the pseudo-Remote Wake generation function 2544 stores pointer information indicating the point of the received Wait Wake request within itself (S601)

and transmits the Wait Wake request to the USB host controller driver 21 using the request transmission function 2522 (S602).

Typically, when each transfer request and power management request (Wait Wake request, Set Power (D2) request, Set Power (D0) request, or the like) is issued, it is held as information in a reserved region of the storage unit of the PC 1. For this reason, to be exact, the drivers 21 to 23, and 25 transmit and receive the pointer of each of the transfer request and the power management request (the address of the request in the reserved region of the storage unit) to and from one another as transmitting and the receiving each of the transfer request and the power management request. As described above, the transfer request and the power management request are typically called I/O request packets. Accordingly, by storing the pointer information of a Wait Wake request transmitted to another driver, as described above, it is possible to control according to the transmitted Wait Wake request on the basis of the stored pointer information at any timing.

Next, referring to FIG. 23, there will be described a process that the USB hub filter driver 25 performs when receiving a transfer request from the USB hub control application 40.

The process shown in FIG. 23 differs from the process according to the first embodiment described with reference to FIG. 14 in that if the current power state 2541 is "Suspended" (S105: Yes), step S111 is performed in place of steps S106 and S107; and if the current power state 2541 is "Suspended" (S105: Yes), the pseudo-Remote Wake generation function 2544 cancels the Wait Wake request transmitted to the USB host controller driver 21 on the basis of the pointer information of the Wait Wake request stored in step S601 (S111).

Next, referring to FIG. 24, there will be described a process that the USB hub filter driver 25 performs when receiving, from the USB host controller driver 21, a power management result indicating the completion of a Wait Wake request.

When the result receiving function 2523 receives the power management result from the USB host controller driver 21, the pseudo-Remote Wake generation function 2544 determines whether the completion status of the Wait Wake request indicated by the power management result is Canceled (S701). Specifically, if the USB hub filter driver 25 instructs the USB host controller driver 21 to cancel the Wait Wake request by specifying the pointer of the request, the USB host controller driver 21 transmits, to the USB hub filter driver 25, a power management result in which the completion status of the Wait Wake request corresponding to this pointer is set to Canceled.

If the completion status is Canceled (that is, if the Wait Wake request has been cancelled) (S701: Yes), the pseudo-Remote Wake generation function 2544 determines whether this Wait Wake request is the Wait Wake request previously cancelled by itself in step S111 (S702).

Typically, an I/O request packet includes the field of a completion status indicating the processing result of a request packaged within itself. When a higher-level driver transmits an I/O request packet to a lower-level driver, the lower-level driver sets a completion status indicating the processing result of the request in the I/O request packet and then returns the resulting I/O request packet to the request-source higher-level driver. That is, the I/O request packet is information which is held on the PC 1 until the processing of the request is completed and returned to the request source. For this reason, each of the transfer result and the power management result is information that is each of the transfer request and the power management request in which the completion status is set. Accordingly, the pseudo-Remote Wake generation function 2544 determines the Wait Wake request whose completion has been reported is the Wait Wake request previously cancelled by itself, if the pointer stored in step S601 and the pointer of the power management result (the power management request whose completion status is set) are matched.

If the Wait Wake request whose completion has been reported is the Wait Wake request previously cancelled by itself (S702: Yes), the pseudo-Remote Wake generation function 2544 changes the completion status of the Wait Wake request to Success (S703). If the completion status is not Canceled (step S701: No), or if the completion status is not the Wait Wake request cancelled by itself (step S702: No), or after step S703 is performed (the completion status of the Wait Wake request is changed to Success), the pseudo-remote wake generation function 2544 transmits a power management result indicating the completion of the Wait Wake request to the USB hub class driver 22 (S704). Accordingly, if step S701 is No, the completion status of the power management result reported to the USB hub class driver 22 is set by the USB host controller driver 21; if step S702 is No, the completion status is set to Canceled; and if step S703 is performed, the completion status is set to Success.

Next, referring to FIG. 25, there will be described a process that the USB hub filter driver 25 performs when receiving a Set Power (D2) request from the USB hub class driver 22.

The process shown in FIG. 25 differs from the process according to the first embodiment described with reference to FIG. 15 in that if the transfer request counter 2551 is a value other than 0 (S201: No), steps S211 and S212 are performed in place of step S204. If the transfer request counter 2551 is a value other than 0 (S201: No), the suspend request change function 2545 changes the power state designated by the power management request (Set Power request) from D2 to D0 (S211). The suspend request change function 2545 then transmits a power management request to restore the USB hub 2 to the normal operating state (Set Power (D0) request), to the USB host controller driver 21 through the request transmission function 2522 (S212).

Next, referring to FIG. 26, there will be described a process that the USB hub filter driver 25 performs when receiving, from the USB host controller driver 21, a transfer result indicating the completion of a transfer request from the USB hub control application 40.

The process shown in FIG. 26 differs from the process according to the first embodiment described with reference to FIG. 16 in that after step S302 is performed, steps S311 and S312 are performed in place of steps S303 to 306. After step S302 is performed, the pseudo-Remote Wake generation function 2544 determines whether the pointer information of the Wait Wake request is stored (S311). If the pointer information of the Wait Wake request is stored (S311: Yes), the pseudo-Remote Wake generation function 2544 performs a process similar to step S111 (S312). Thus, the Wait Wake request is cancelled.

Next, referring to FIG. 27, there will be described a process that the USB hub filter driver 25 performs when receiving, from the USB host controller driver 21, a power management result indicating that a Set Power (D0) request has been completed normally.

The process shown in FIG. 27 differs from the process according to the first embodiment described with reference to FIG. 18 in that step S511 is further performed; if step S511 is No, steps S501 to S505 are performed; and if step S511 is Yes, steps S512 and S513 are performed. When the result receiving function 2523 receives the power management result from the USB host controller driver 21, the suspend request change function 2545 determines whether the power management result is a power management result indicating the completion of the Set Power request based on which the power state has been changed in step S211 (S511). As with the Wait Wake request described above, this determination may be made by previously storing the pointer information of the Set Power request and comparing the Set Power request with the pointer of the power management result. If the power management request is a power management request indicating the completion of the Set Power request based on which the power state has been changed (S511: Yes), the suspend request change function 2545 changes the power state designated by the power management result (the Set Power request in which the completion status is set) from D0 to D2 (S512). The suspend request change function 2545 then transmits a power management result indicating the normal completion of the power management request to put the USB hub 2 into the low-power state (Set Power (D2) request), to the USB hub class driver 22 through the result reporting function 2524 (S513).

Processes by Personal Computer According to Second Embodiment

Next, referring to FIG. 28, there will be described a process performed when the USB hub filter driver 25 receives a transfer request from the USB hub control application 40 with the USB hub 2 put in the low-power state based on Selective Suspend.

When the USB hub filter driver 25 receives a Wait Wake request from the USB hub class driver 22 (S11), it stores the pointer of the Wait Wake request within itself (S601). The USB hub filter driver 25 then transmits the Wait Wake request to the USB host controller driver 21 (S12). The USB host controller driver 21 does not immediately complete the Wait Wake request but rather puts it on hold within itself (S13). Subsequently, steps S14 and S15 shown in FIG. 7 are performed but not shown in FIG. 28. Subsequently, as described with reference to FIG. 19, the USB hub 2 is put into the low-power state, and the current power state 2541 managed by the USB hub filter driver 25 is changed to "Suspended" (S16 to S21, S401).

When the USB hub filter driver 25 receives a transfer request from the USB hub control application 40 (S1), the USB hub filter driver 25 increments the transfer request counter 2551 (S101). Since the current power state 2541 is "Suspended", the USB hub filter driver 25 queues the transfer request into the transfer request queue 2553 to temporarily put it on hold (S104). Then, by using the pointer information of the Wait Wake request previously stored in step S601, the USB hub filter driver 25 instructs the USB host controller driver 21 to cancel the Wait Wake request (S111). In accordance with the instruction to cancel the Wait Wake request, the USB host controller driver 21 cancels the Wait Wake request on hold (S61). The USB host controller driver 21 then transmits, to the USB hub filter driver 25, a power management result in which the completion status of the Wait Wake request is set to Canceled (S62).

When the USB hub filter driver 25 receives the power management result indicating the completion status of the Wait Wake whose cancellation the USB hub filter driver 25 has requested is set to Canceled, the USB hub filter driver 25 changes the completion status to Success (S703) and transmits a power management result indicating the normal completion of the Wait Wake request to the USB hub class driver 22 (S35). When the USB hub class driver 22 receives the power management result indicating the normal completion of the Wait Wake request, the USB hub class driver 22 determines that the USB hub 2 has actually issued Remote Wake and then issues a Set Power (D0) request to the USB host controller driver 21 through the USB hub filter driver 25 in order to restore the USB hub 2 to the normal operating state (S36). Subsequent processes (S37 to S41, S501, S2 to S7) are similar to those described with reference to FIG. 19 and therefore will not be described. Thus, the USB hub 2 is restored to the normal operating state, and the transfer of data to the USB hub 2 is completed normally. Note that, if the completion status of the Wait Wake request is Canceled, the USB hub class driver 22 issues no Set Power (D0) request in accordance with the power management result. However, in the above process, the USB hub filter driver 25 changes the completion status of the Wait Wake request to Success and then causes the USB hub class driver 22 to issue a Set Power (D0) request. Thus, it can restore the USB hub 2 to the normal operating state so that data is transferred to the USB hub 2.

Next, referring to FIG. 29, there will be described a process performed when the USB hub class driver 22 attempts to selectively suspend the USB hub 2 during data transfers to the USB hub 2.

When the USB hub filter driver 25 is transferring data to the USB hub 2 in accordance with a transfer request (S1 to S4), if it receives a Wait Wake request from the USB hub class driver 22 (S11), the USB hub filter driver 25 stores the pointer of the Wait Wake request within itself (S601). The USB hub filter driver 25 then transmits the Wait Wake request to the USB host controller driver 21 (S12). Subsequently, steps S13 to S15 shown in FIG. 7 are performed but not shown in FIG. 29.

Subsequently, when the USB hub filter driver 25 receives a Set Power (D2) request from the USB hub class driver 22 (S16), the USB hub filter driver 25 changes the change destination power state designated by the Set Power request from D2 to D0 (S211) and transmits it as a Set Power (D0) request to the USB host controller driver 21 (S37). Since the USB hub 2 is originally put in the normal operating state (D0), the USB host controller driver 21 does nothing and transmits a power management result indicating the normal completion of the Set Power (D0) request to the USB hub filter driver 25 (S40). When the USB hub filter driver 25 receives the power management result indicating the normal completion of the Set Power (D0) request from the USB host controller driver 21, the USB hub filter driver 25 changes the change destination power state designated by the Set Power request from D0 to D2 (S512) and transmits a power management result indicating the normal completion of the Set Power (D2) request to the USB hub class driver (S21).

Thus, the USB hub class driver 22 recognizes that the Set Power (D2) request issued by itself has been performed normally and that the USB hub 2 has been put into the low-power state. On the other hand, the USB hub 2 remains in the normal operating state and therefore the transfer of data to the USB hub 2 being performed based on the request from the USB hub control application 40 is continued and then completed normally (S5 to S7). Note that when the USB hub filter driver 25 receives the Set Power (D2) request, the USB hub filter driver 25 may transmit a power management result indicating the normal completion of the Set Power (D2) request to the USB hub class driver 22 rather than changing the Set Power request and transmitting the changed request to the USB host controller driver 21.

In the process thus far, the USB hub class driver 22 recognizes that the USB hub 2 is in the low-power state, whereas the USB hub 2 is actually in the normal operating state. There is a mismatch between both states. For this reason, when the transfer of data to the USB hub 2 based on the request from the USB hub control application 40 is completed, the USB hub filter driver 25 cancels the Wait Wake request previously issued by the USB hub class driver 22 (S312). Subsequent processes (S61, S62, S703, S35) are similar to those described with reference to FIG. 28 and therefore will not be described.

Subsequently, when the USB hub class driver 22 receives a power management result indicating the normal completion of the Wait Wake request, the USB hub class driver 22 transmits a Set Power (D0) request to the USB host controller driver 21 through the USB hub filter driver 25 in order to restore the USB hub 2 to the normal operating state (S36, S37). The USB host controller driver 21 receives the Set Power (D0) request but does nothing, since the USB hub 2 has been already put in the normal operating state, and completes the Set Power (D0) request (S40, S41). In this stage, the power state of the USB hub 2 recognized by the USB hub class driver 22 matches the actual power state.

Subsequently, if the USB hub class driver 22 starts a Selective Suspend process again, the USB hub filter driver 25 transmits a Set Power (D2) request to the USB host controller driver 21 as usual unless there is any transfer request from the USB hub control application 40 at that time point. Thus, the USB hub 2 is put into the low-power state.

In the second embodiment, as in the first embodiment, a transfer request is processed only after the USB hub 2 is restored to the normal operating state. Thus, the problem that a start of the transfer of data to the low-power-state USB hub 2 results in an error can be solved.

In the first embodiment, the USB hub filter driver 25 directly transmits a Set Power (D0) request to the USB host controller driver 21 to start a process of restoring the USB hub 2 to the normal operating state. In the second embodiment, on the other hand, the USB hub filter driver 25 normally completes a Wait Wake request from the USB host controller driver 21 and thus generates, in a pseudo-manner, a state in which the USB hub 2 has issued Remote Wake, and then reports this state to the USB hub class driver 22. Since the USB hub class driver 22 performs a usual operation as if the USB hub class driver 22 had received Remote Wake, the USB hub class driver 22 can restore the USB hub 2 to the normal operating state. That is, since the USB hub class driver 22 issues a Set Power (D0) request by the completion routine registered with respect to the Wait Wake request, the USB hub class driver 22 can restore the USB hub 2 to the normal operating state. Thus, it is possible to construct a simple, low-cost system which utilizes the existing process performed by the USB hub class driver 22.

In the first embodiment, the USB hub filter driver 25 puts a Set Power (D2) request from the USB hub class driver 22 on hold within itself. Accordingly, if it takes time to transfer data to the USB hub 2, it also takes time to complete the Set Power (D2) request. In the second embodiment, on the other hand, a Set Power (D2) request from the USB hub class driver 22 is immediately processed. Thus, the problem that it takes time to perform a Selective Suspend process from the USB hub class driver 22 can be avoided.

Modification of Personal Computer According to Second Embodiment

Next, referring to FIG. 30, a modification of the personal computer according to the second embodiment will be described. FIG. 30 shows a modification of the process performed by the pseudo-Remote Wake generation function 2544. The process shown in FIG. 30 is a process obtained by making a change to the process shown in FIG. 28.

In this modification, instead of temporarily storing the pointer information of a Wait Wake request from the USB hub class driver 22, transferring the Wait Wake request to the USB host controller driver 21, and then cancelling the pointer information, the USB hub filter driver 25 itself puts the Wait Wake request from the USB hub class driver 22 on hold (S11, S1001). That is, the USB hub filter driver 25 does not transmit the Wait Wake request to the USB host controller driver 21. Subsequently, as shown in FIG. 28, steps S16 to 21 and S401 are performed. Subsequently, if the USB hub 2 is put in the low-power state at the time point when the USB hub filter driver 25 receives a transfer request from the USB hub control application 40, the USB hub filter driver 25 directly normally completes the Wait Wake request on hold (S1002). That is, as shown in FIG. 28, steps S35 to S41, S501, and S2 to S7 are performed. As seen above, the USB hub filter driver 25 alone may operate as if the USB hub 2 had issued Remote Wake, without collaborating with the USB host controller driver 21 in a pseudo-manner.

Third Embodiment

Problem with Personal Computer According to Comparative Example to Third Embodiment In the first and second embodiments, a usual power state change request (Set Power) is used as a method by which the USB hub class driver 22 selectively suspends the USB hub 2. In a third embodiment, there will be described a method for solving a problem in a case where the port to which a USB hub 2 connected is changed to the low-power state using another method.

Referring now to FIG. 31, there will be described a problem in a case where a USB hub class driver 22 selectively suspends the USB hub 2 using another method. In this method, the USB hub class driver 22 suspends and resumes the port of the USB host controller 10 to which the USB hub 2 connected by directly calling interface functions provided by a USB host controller driver 21 (that is, a suspend function and a resume function).

The USB hub class driver 22 transmits an interface acquisition request (Query Interface) to the USB host controller driver 21 during initialization (S71). In response to this request, the USB host controller driver 21 transmits interface function information in itself (reference information of the suspend and resume functions) to the USB hub class driver 22 (S72). More specifically, this interface function information is information indicating the pointers (addresses) of the functions (the suspend and resume functions) of the USB host controller driver 21.

Subsequently, to selectively suspend the USB hub 2, the USB hub class driver 22 calls the suspend function on the basis of the interface function information from the USB host controller driver 21 (S73). In the suspend function of the USB host controller driver 21, a process to put the port of the USB host controller 10 to which the USB hub 2 to be suspended is connected into the low-power state is performed (S18). Thus, the USB hub 2 is put into the low-power state. After the process is performed, the suspend function is normally completed and the process being performed by the personal computer is restored to the USB hub class driver 22, which has called this function (S74).

In this case also, if the USB hub filter driver 25 receives a transfer request for the low-power-state USB hub 2 from the USB hub control application 40 and then attempts to transfer the data to the USB hub 2, the transfer would result in an error (S51 to S53). An embodiment for solving this problem will be described below.

Configuration of Personal Computer According to Third Embodiment

Next, a PC 1 according to the third embodiment will be described. Elements similar to those described thus far are given the same reference signs, and descriptions thereof are omitted as appropriate. Further, the configuration of the PC 1 according to the third embodiment is similar to that of the PC 1 according to the first embodiment and therefore will not be described.

Configuration of USB Hub Filter Driver According to Third Embodiment

First, referring to FIG. 32, there will be described the function block configuration of a USB hub filter driver 25 according to the third embodiment. As shown in FIG. 32, compared to the USB hub filter driver 25 according to the first embodiment described with reference to FIG. 11, the USB hub filter driver 25 according to the third embodiment further has a suspend control interface relay function 256.

The suspend control interface relay function 256 relays an interface acquisition request (Query Interface) and interface functions (suspend and resume functions) from a USB hub class driver 22. The suspend control interface relay function 256 also manages the power state of a USB hub 2 in conjunction with a power state management function 254.

Next, referring to FIG. 33, the function block configuration of the suspend control interface relay function 256 will be described. As shown in FIG. 33, the suspend control interface relay function 256 has an interface information acquisition request relay function 2561.

The interface information acquisition request relay function 2561 relays an interface acquisition request (Query Interface) transmitted from the USB hub class driver 22 to a USB host controller driver 21.

The suspend control interface relay function 256 also has a suspend function 2562 and a resume function 2563 to be provided to the USB hub class driver 22 by the USB hub filter driver 25. The suspend control interface relay function 256 is also storing reference information 2564 of a suspend function 211 and a resume function 212 in the USB host controller driver 21 in itself. More specifically, the reference information 2564 is stored in the storage unit of the PC 1.

The interface information acquisition request relay function 2561 has a request receiving function 25611, a request transmission function 25612, a result receiving function 25613, a result reporting function 25614, an interface information storage function 25615, and an interface information change function 25616.

The request receiving function 25611 receives an interface acquisition request from the USB hub class driver 22. The request transmission function 25612 transmits the interface acquisition request to the USB host controller driver 21. The result receiving function 25613 receives an interface acquisition result from the USB host controller driver 21. The result reporting function 25614 transmits the interface acquisition result to the USB hub class driver 22. The interface acquisition request and interface acquisition result are information in a form which can be transmitted and received in the PC 1.

When the result receiving function 25613 receives an interface acquisition result from the USB host controller driver 21, the interface information storage function 25615 stores reference information 2564 of the suspend function 211 and resume function 212 returned from the USB host controller driver 21 as the interface acquisition result. That is, the interface acquisition result includes the reference information 2564 of the suspend function 211 and resume function 212. The interface information change function 25616 changes the reference information of the suspend function 211 and resume function 212 indicated by the interface acquisition result to the reference information of the suspend function 2562 and resume function 2563 in the USB hub filter driver 25, and then transmits the resulting interface acquisition result to the USB hub class driver 22 using the result reporting function 25614.

Processes by USB Hub Filter Driver According to Third Embodiment

Next, referring to FIGS. 34 and 35, there will be described processes performed by the USB hub filter driver 25 according to the third embodiment. First, referring to FIG. 34, there will be described a process that the USB hub filter driver 25 performs when receiving a transfer request from a USB hub control application 40.

The process shown in FIG. 34 differs from the process according to the first embodiment described with reference to FIG. 14 in that after step S106 is performed, steps S121 and S122 are performed in place of step S107. If the current power state 2541 is "Suspended" (S105: Yes), the current power state 2541 is changed to "Resume Pending" (S106). Subsequently, the suspend control interface relay function 256 calls the resume function 212 of the USB host controller driver 21 on the basis of the stored reference information 2564 (S121). Thus, the USB hub 2 is restored to the normal operating state. Subsequently, the on-hold transfer execution function 2555 of the transfer state management function 255 performs processes (S501, S503 to S505) to be performed when the resume process is completed (S122).

Next, referring to FIG. 35, there will be described a process in which the USB hub filter driver 25 performs when the USB hub class driver 22 calls the suspend function 2562 of the USB hub filter driver 25.

The process shown in FIG. 35 differs from the process according to the first embodiment described with reference to FIG. 15 in that steps S221 and S222 are performed in place of step S203; and step S223 is performed in place of step S204. If the transfer request counter 2551 is 0 (S201: Yes), the suspend control interface relay function 256 changes the current power state 2541 to "Suspend Pending" (S202) and then calls the suspend function 211 of the USB host controller driver 21 (S221). Thus, the USB hub 2 is put into the low-power state. The suspend control interface relay function 256 then changes the current power state 2541 to "Suspended" (S222). In contrast, if the transfer request counter 2551 is a value other than 0 (S201: No), the suspend function 2562 returns an error (S223).

Processes by Personal Computer According to Third Embodiment

Next, referring to FIG. 36, there will be described a process performed when the USB hub filter driver 25 receives a transfer request from the USB hub control application 40 while the USB hub 2 put in the low-power state based on Selective Suspend.

The USB hub filter driver 25 relays an interface acquisition request from the USB hub class driver 22 to the USB host controller driver 21 (S71). When the USB hub filter driver 25 receives an interface acquisition result from the USB host controller driver 21 (S72), the USB hub filter driver 25 stores interface function information (reference information of the suspend function 211 and resume function 212) returned from the USB host controller driver 21 as the interface acquisition result. Further, the USB hub filter driver 25 replaces the interface function information with the interface function information (reference information of the suspend function 2562 and resume function 2563) in the USB hub filter driver 25 and then transmits it as the interface acquisition result to the USB hub class driver 22 (S81).

To selectively suspend the USB hub 2, the USB hub class driver 22 calls the suspend function returned in response to the interface acquisition request previously transmitted thereby (that is, the suspend function 2562 provided by the USB hub filter driver 25) (S82). When the suspend function 2562 of the USB hub filter driver 25 is called, the USB hub filter driver 25 calls the suspend function 211 of the USB host controller driver 21 previously stored within itself (S73). Thus, the USB hub 2 is put into the low-power state (S18, S19), and the suspend function 211 is completed normally (S74). The USB hub filter driver 25 then changes the current power state 2541 of the USB hub 2 to "Suspended" (S222). Thus, the suspend function 2562 is completed normally (S83).

If the USB hub filter driver 25 receives a transfer request from the USB hub control application 40 in this state (S1), the USB hub filter driver 25 calls the resume function 212 of the USB host controller driver 21 (S84). Thus, the USB hub 2 is restored to the normal operating state (S38, S39). The USB hub filter driver 25 then changes the current power state 2541 to "Working" (S501) and starts to transfer data to the USB hub 2 (S2 to S4). Since the USB hub 2 has been already restored to the normal operating state, the transfer of data to the USB hub 2 is completed normally (S5 to S7).

Next, referring to FIG. 37, there will be described a process performed when the USB hub class driver 22 calls the suspend function 2562 while data is transferred to the USB hub 2.

If the suspend function 2562 in the USB hub filter driver 25 is called (S82) when data is being transferred to the USB hub 2 in accordance with a transfer request (S1 to S4), the USB hub filter driver 25 causes the suspend function 2562 to return an error and refuses the suspend request, since the current transfer request counter 2551 is a value other than 0 (S223). Thus, the USB hub 2, to which data is being transferred, is no longer suspended, and the transfer to the USB hub 2 is completed normally (S5 to S7).

Subsequently, if the USB hub class driver 22 calls the suspend function 2562 again when the USB hub filter driver 25 is not requested to transfer, the USB hub filter driver 25 calls the suspend function 211 of the USB host controller driver 21 to suspend the USB hub 2.

As seen above, even in the case in which the USB hub class driver 22 calls the interface functions (the suspend and resume functions) to control Selective Suspend of the USB hub 2, it is possible to solve the problem that the transfer of data to the low-power-state USB hub 2 results in an error.

Fourth Embodiment

Next, a PC 1 according to a fourth embodiment will be described. In the fourth embodiment, a first specific example of the above USB hub control application program 40 will be described.

Referring to FIG. 38, the configuration of the PC 1 according to the fourth embodiment will be described. As shown in FIG. 38, the PC 1 includes a USB Power Delivery system policy management application program 60 (also referred to as a system policy management application 60) as the USB hub control application program 40. Further, instead of the USB hub 2, a USB hub 4 supporting the USB Power Delivery standard is connected to the PC 1.

The PC 1 also includes a USB hub general-purpose control library 50. The USB hub general-purpose control library 50 provides the system policy management application 60 with a general-purpose application programming interface (API) 501 for transferring data to the USB hub 4 through a USB hub filter driver 25. According to this configuration, the USB Power Delivery system policy management application program 60 does not transmit a transfer request to the USB hub filter driver 25 by directly calling the system call function of the OS 20 but rather transmits a transfer request to the USB hub filter driver 25 by calling the USB hub general-purpose control library 50 by specifying details of the transfer request. By using the USB hub general-purpose control library 50, it is possible to easily control the USB hub 4 with respect to additional functions even on another application without having to directly control the USB hub filter driver 25 or prepare a separate dedicated filter driver.

As an additional function, the system policy management application 60 controls the USB hub 4 with respect to the functions defined in the USB Power Delivery standard. The USB Power Delivery is a new USB standard about the power supply between the USB devices 3 and 4 through a USB cable. The USB hub 4 supporting the USB Power Delivery has a function of adjusting power supplied from a downstream port thereof in accordance with a request from a device connected to the downstream port. The USB Power Delivery additionally defines details of a transfer request to acquire information about the power supply state and to control the power supply state between the system policy management application 60 and USB hub 4. Thus, the USB hub 4 not only can singly determine whether the USB hub 4 can supply power but also can control the system-level power supply state by the system policy management application 60 on the PC 1 and the user As described above, data to be transferred to the USB hub 4 may include information requiring a desired operation. In the fourth embodiment, the data may include the following requests.

(1) A request to acquire information about the power supply capability of each port of the USB hub 4, that is, power that can be supplied from each port and to report acquired information to the system policy management application 60

(2) A request to report power supply request received from USB devices 3 connected to the respective ports of the USB hub 4 to the system policy management application 60

(3) A request to give the USB hub 4 an instruction as to whether the USB hub 4 should accept or refuse power supply request received from the USB devices 3 connected to the respective ports of the USB hub 4

Thus, for example, the system policy management application 60 can change power supplied to the USB devices 3 from the USB hub 4 or display power supplied to the USB devices 3 reported from the USB hub 4 on a display device (e.g., a liquid crystal display) connected to the PC 1 to present the power to the user.

Fifth Embodiment

Next, a PC 1 according to a fifth embodiment will be described. In the fifth embodiment, a second specific example of the above USB hub control application program 40 will be described.

Referring to FIG. 39, the configuration of a PC 1 according to the fifth embodiment will be described. The PC 1 shown in FIG. 39 includes a USB hub ROM write application program 70 as the USB hub control application program 40.

As an additional function, the USB hub ROM write application program 70 controls a USB hub 2 so that data stored in a ROM (e.g., a flash ROM) included in the USB hub 2 is rewritten. Typically, the data stored in this ROM is firmware executed by a CPU included in the USB hub 2. As described above, data to be transferred to the USB hub 2 may include information requesting a desired operation. In the fifth embodiment, the included data may include a request to rewrite data in the ROM and the data to be used for rewrite as the information.

Thus, the USB hub ROM write application program 70 can update the firmware in the USB hub 2.

Sixth Embodiment

Next, a sixth embodiment will be described. A PC 1 according to the sixth embodiment can perform a process described below by combining the second and third embodiments. Referring to FIG. 40, there will be described a process that a USB hub filter driver 25 performs when receiving a transfer request from a USB hub control application 40 in a combination of the second and third embodiments.

The process shown in FIG. 40 differs from the process according to the second embodiment described with reference to FIG. 23 and the process according to the third embodiment described with reference to FIG. 34 in that step S131 is further performed; if step S131 is No, step S111 is performed; and if step S131 is Yes, steps S106, S121, and S122 are performed.

Specifically, if the current power state 2541 is "Suspended" (S105), the USB hub filter driver 25 performs different operations on the basis of whether the USB hub filter driver 25 has previously acquired reference information 2564 of a resume function 212 of a USB host controller driver 21 in accordance with an interface acquisition request from a USB hub class driver 22.

If the USB hub filter driver 25 has previously acquired the reference information 2564 of the resume function 212 of the USB host controller driver 21, the USB hub filter driver 25 changes the power state 2541 to "Resume Pending" (S106) and then calls a resume function 212 of the USB host controller driver 21 to resume a USB hub 2 (S121), in accordance with the process of the third embodiment. Subsequently, the USB hub filter driver 25 changes the power state 2541 to "Working" and then transmits all the transfer requests on hold to the USB host controller driver 21 (S501, S502 to S505).

In contrast, if the USB hub filter driver 25 has not acquired the reference information 2564 of the resume function 212 of the USB host controller driver 21, the USB hub filter driver 25 cancels the Wait Wake request using a pseudo-Remote Wake generation function 2544 to resume the USB hub 2 (S111), in accordance with the process of the second embodiment.

The USB hub filter driver 25 described above can singly accommodate both a USB hub class driver 22 which does not control the power state of the USB hub 2 by calling the function, as described in the second embodiment, and a USB hub class driver 22 which controls the power state of the USB hub 2 by calling the function, as described in the third embodiment. Thus, the above USB hub filter driver 25 can solve the problem that a transfer request results in an error, in both the USB hub class drivers 22.

Summary of Embodiments

Referring to FIG. 41, there will be described an information processing device according to one embodiment extracted from the first to sixth embodiments. As shown in FIG. 41, an information processing device 91 includes a first application program 911, a second application program 912, a class driver 913, and a filter driver 914.

The first application program 911 transmits a request to control a peripheral device 92. The first application program 911 corresponds to the application program 30. The second application program 912 runs on an operation system on which the first application program 911 runs, and transmits a request to control the peripheral device 92. The second application program 912 corresponds to the USB hub control application 40, USB Power Delivery system policy management application program 60, and USB hub ROM write application program 70.

The class driver 913 relays a control request from the first application program 911. The class driver 913 corresponds to the USB hub class driver.

The filter driver 914 sits below the class driver 913 and controls the peripheral device 92 in accordance with a control request from the first application program 911 through the class driver 913, as well as controls the peripheral device 92 in accordance with a control request from the second application program 912 without passing through the class driver 913. The filter driver 914 corresponds to the USB hub filter driver 25.

The filter driver 914 includes a power state management unit 9141 and a control unit 9142. The power state management unit 9141 changes the power state of the peripheral device 92 in accordance with a request to change the power state of the peripheral device 92 from the class driver 913 and recognizes the changed power state of the peripheral device 92. The power state management unit 9141 corresponds to the power state management function 254. The control unit 9142 controls the peripheral device 92 in accordance with control requests from the first application program 911 and second application program 912. The control unit 9142 corresponds to the transfer state management function 255.

If the power state of the peripheral device 92 recognized by the power state management unit 9141 is the low-power state, the control unit 9142 suspends controlling the peripheral device 92 in accordance with a control request from the second application program 912 until the power state of the peripheral device 92 returns to the normal state.

In the configuration described above, the filter driver 914 recognizes the power state of the peripheral device 92. If the recognized power state is the low-power state, the filter driver 914 puts a transfer request from the second application program 912 on hold. Thus, even when the second application program 912 directly issues a request to control the peripheral device 92 to the filter driver 914 without passing through the class driver 913, which controls the power state of the peripheral device 92, it is possible to prevent the filter driver 914 from accessing the low-power-state peripheral device 92 and thus causing an error.

Any of the programs 21 to 25, 30, 40, 50, 60, and 70 described above can be stored in various types of non-transitory computer-readable media and then provided to the computer (PC 1). Examples of the non-transitory computer-readable media include various types of tangible storage media. Examples of the non-transitory computer-readable medium include magnetic storage media, (e.g., flexible disks, magnetic tapes, hard disk drives), optico-magneto storage media (e.g., optico-magneto disks), compact disk read-only memory (CD-ROM), compact disc recordable (CD-R), CD-R/W, semiconductor memory [e.g., mask ROM, programmable ROM (PROM), erasable PROM (EPROM), flash ROM, and random access memory (RAM)]. Any program may be provided to the computer by various types of transitory computer-readable media. Examples of the transitory computer-readable media include electric signals, optical signals, and electromagnetic waves. The transitory computer-readable media can provide any program for the computer via a wire communication path such as an electric line or optical fiber, or a wireless communication path.

While the present invention has been described in detail based on the embodiments, the invention is not limited thereto. As a matter of course, various changes can be made to the embodiments without departing from the spirit and scope of the invention.

While the configurations of the embodiments are implemented in personal computers in the above descriptions, the configurations may be implemented in other types of devices. The configurations may be implemented in various types of information processing devices to which USB devices can be connected, including personal computers, servers, televisions, and game machines.

While the information processing device controls USB devices as the target peripheral devices in the above embodiments, the information processing device may control peripheral devices supporting standards other than the USB.

While the USB hub 2 is controlled in the above embodiments, the USB device 3 connected to the PC 1 without interposing through the USB hub 2 may be controlled in a similar manner.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first to sixth embodiments can be combined as desirable by one of ordinary skill in the art.

What is claimed is:

1. An information processing device comprising:
   a first application program configured to transmit a control request for a peripheral device;
   a second application program configured to run on an operating system on which the first application program runs and to transmit a control request for the peripheral device;
   a class driver configured to relay the control request from the first application program; and
   a filter driver sitting below the class driver and configured to control the peripheral device in accordance with the control request from the first application program through the class driver and to control the peripheral device in accordance with the control request from the second application program without passing through the class driver, wherein
   the filter driver comprises:
   a power state management unit configured to change a power state of the peripheral device in accordance with a change request of the power state of the peripheral device from the class driver and to recognize the changed power state of the peripheral device; and
   a control unit configured to control the peripheral device in accordance with the control request from the first application program and second application program, and
   if the power state of the peripheral device recognized by the power state management unit is a low-power state, the control unit suspends controlling the peripheral device in accordance with the control request from the second application program until the power state of the peripheral device returns to a normal state.

2. The information processing device according to claim 1,
   wherein if the filter driver receives the control request from the second application program when the power state of the peripheral device indicated by the power state management unit is the low-power state, the filter driver changes the power state of the peripheral device.

3. The information processing device according to claim 1, wherein if the filter driver receives, from the class driver, the change request requesting to change the power state of the peripheral device to the low-power state when the filter driver is controlling the peripheral device in accordance with the control request from the second application program, the filter driver suspends changing the power state to the low-power state until the control of the peripheral device is completed.

4. The information processing device according to claim 2, further comprising a host controller driver sitting below the filter driver and configured to, in response to a predetermined operation being performed on the peripheral device, transmit a restore request requesting to restore the peripheral device to the normal state, to the class driver through the filter driver, wherein
   in accordance with the restore request from the host controller driver, the class driver transmits, to the filter driver, the change request to change the power state of the peripheral device to the normal state, and
   if the filter driver receives the control request from the second application program when the power state of the peripheral device indicated by the power state management unit is the low-power state, the filter driver changes the power state of the peripheral device to the normal state by transmitting the restore request to the class driver in a pseudo-manner.

5. The information processing device according to claim 4, wherein
   when the predetermined operation is performed, the host controller driver generates the restore request indicating completion and transmits the generated restore request to the class driver,
   if the class driver instructs the host controller driver to cancel transmission of the restore request in response to the predetermined operation, the host controller driver generates the restore request indicating cancellation and transmits the generated restore request to the class driver,
   if the restore request indicates success, the class driver transmits the change request to change the power state to the normal state,
   if the filter driver receives the control request from the second application program when the power state of the peripheral device indicated by the power state management unit is the low-power state, the filter driver instructs the host controller driver to cancel transmission of the restore request in response to the predetermined operation, as well as transmits the restore request to the class driver in a pseudo-manner by changing the restore request to be transmitted from the host controller driver to the class driver so that the restore request indicates success.

6. The information processing device according to claim 4, wherein if the filter driver receives the change request to change the power state of the peripheral device to the low-power state from the class driver when the filter driver is controlling the peripheral device put in the normal state in accordance with the control request from the second application program, the filter driver does not change the power state to the low-power state but rather reports that the power state has been changed to the low-power state to the class driver, and after the control of the peripheral device is completed, the filter driver changes the power state to the normal state and reports that the power state has been changed to the normal state to the class driver, by transmitting the restore request to the class driver in a pseudo-manner.

7. The information processing device according to claim 2, wherein the control unit transmits the control request from the first application program and the second application program as the control of the peripheral device, the information processing device further comprising a host controller driver sitting below the filter driver and configured to control the peripheral device in accordance with the control request from the filter driver, wherein the host controller driver has a first host controller function for changing the power state of the peripheral device to the normal state and a second host controller function for changing the power state of the peripheral device to the low-power state, the filter driver has a first filter function for calling the first host controller function and a second filter function for calling the second host controller function, the class driver calls the first filter function and the second filter function as the change request of the power state of the peripheral device, and if the power state management unit receives the control request from the second application program, the power state management unit changes the power state of the peripheral device to the normal state by calling the first host controller function.

8. The information processing device according to claim 7, wherein if the class driver calls the second filter function while the peripheral device is controlled, the power state management unit causes the second filter function to return an error.

9. The information processing device according to claim 7, wherein the class driver transmits an address request requesting for addresses of the first host controller function and the second host controller function to the host controller driver through the filter driver, the host controller driver transmits the addresses of the first host controller function and the second controller function to the class driver through the filter driver in accordance with the address request, and the filter driver further comprises an interface relay control unit configured to acquire the addresses transmitted from the host controller driver in order to call the first host controller function and the second host controller function in the first filter function and the second filter function and to transmit addresses of the first second filter function and second filter function to the class driver in place of the addresses of the first host controller function and the second host controller function.

10. The information processing device according to claim 1, wherein the peripheral device is a USB device, and the second application program transmits the control request conforming to the USB Power Delivery.

11. The information processing device according to claim 1, wherein the peripheral device comprises a non-volatile storage device storing a program executed by the peripheral device, and the second application program transmits the control request to rewrite the program stored in the non-on volatile storage device.

12. A method for controlling a peripheral device comprising:

a first control step of controlling a peripheral device in accordance with a control request from a first application program through a class driver;

a power state management step of changing a power state of the peripheral device in accordance with a change request of the power state of the peripheral device from the class driver and recognizing the changed power state of the peripheral device; and a second control step of controlling the peripheral device in accordance with a control request from a second application program without passing through the class driver, the second application program running on an operating system on which the first application program is running, wherein the second control step comprises, if the recognized power state of the peripheral device is a low-power state, suspending controlling the peripheral device in accordance with to the control request from the second application program until the power state of the peripheral device returns to a normal state.

13. A non-transitory computer-readable medium storing a filter driver, wherein the filter driver sits below a class driver for relaying a control request for a peripheral device from a first application program, controls the peripheral device in accordance with the control request from the first application program through the class driver, and controls the peripheral device in accordance with a control request from a second application program without passing through the class driver, the second application program running on an operating system on which the first application program is running, the filter driver causing a computer to perform:

a power state management process of changing a power state of the peripheral device in accordance with a change request of the power state of the peripheral device from the class driver and recognizing the changed power state of the peripheral device; and a control process of controlling the peripheral device in accordance with the control request from the first second application program and the second application program, wherein the control process comprises, if the recognized power state of the peripheral device is a low-power state, suspending controlling the peripheral device in accordance with the control request from the second application program until the power state of the peripheral device returns to a normal state.

* * * * *